United States Patent [19]
Christian et al.

[11] 4,120,629
[45] Oct. 17, 1978

[54] PRODUCTION CONTROL APPARATUS

[75] Inventors: John Hunt Christian, Tucson, Ariz.; James Leroy Overacker, Morgan Hill, Calif.

[73] Assignee: International Business Machines Corporation, Armonk, N.Y.

[21] Appl. No.: 702,638

[22] Filed: Jul. 6, 1976

[51] Int. Cl.² .................. B29C 3/00; B65G 47/48
[52] U.S. Cl. ................ 425/135; 425/317; 425/385; 425/403.1; 101/27; 214/16.4 C; 214/11 C
[58] Field of Search ............ 214/16.4 A, 16.4 C, 214/11 C; 425/137, 403.1, 385, 317; 101/27

[56] References Cited
U.S. PATENT DOCUMENTS

| | | | |
|---|---|---|---|
| 3,659,974 | 5/1972 | Neugroschl | 425/317 X |
| 3,716,128 | 2/1973 | Edge et al. | 214/11 C |
| 3,753,237 | 8/1973 | Koontz et al. | 214/11 C X |
| 3,909,171 | 9/1975 | Weber et al. | 425/385 X |
| 3,945,790 | 3/1976 | Puech | 425/385 |

*Primary Examiner*—Robert L. Spicer, Jr.
*Attorney, Agent, or Firm*—Herbert F. Somermeyer

[57] ABSTRACT

Utilization of production equipment with diverse throughput rates is optimized by a central random access article storage apparatus disposed centrally of peripherally positioned production equipment. Computer controls enable fully automatic sequencing of production flow. The storage apparatus provide transient storage and article queuing during intermediate successive production steps. The computer control enables automatic article tracking for quality control as well as diagnosis of automatic production equipment problems.

3 Claims, 3 Drawing Figures

PRODUCTION CONTROL APPARATUS

U.S. PATENTS INCORPORATED BY REFERENCE

U.S. Pat. No. 3,825,208 shows an article to be advantageously processed by apparatus and methods of the present invention.

U.S. Pat. No. 3,833,280 shows a random access article storage and retrieval apparatus employable as the article random access storage apparatus for practicing the present invention.

U.S. Pat. No. 3,584,284 shows an article transport control apparatus usable with the U.S. Pat. No. 3,833,280 illustrated apparatus.

U.S. Pat. No. 3,854,605 shows an article autoloader and associated recorder usable in connection with the U.S. Pat. No. 3,833,280 illustrated apparatus.

U.S. Pat. No. 3,854,604 shows an article transporter usable with the U.S. Pat. No. 3,833,280 illustrated apparatus.

BACKGROUND OF THE INVENTION

The present invention relates to production apparatus particularly, to computerized control of such apparatus.

The production and quality control of large numbers of product or articles incurs substantial cost in labor and capital equipment. For controlling such cost, it is imperative that a certain amount of automation be employed. Depending upon the manufacturing process, as well as the product being produced, such automation can be achieved with various degrees of success. As an example, the assemblage of two diverse parts having close tolerance requirements can result in very expensive production costs. A prior solution to such a problem was to measure each of the parts and separately store same in two different random access article storage units. Storage would be in accordance with the measurements made such that all parts having like tolerances are stored together. Then, under computer control, parts having matching tolerances would be supplied from the random access storage unit to an automatic assembler, wherein the parts would be mated based upon their tolerance measurements.

In other automatic production equipment such as in semi-conductor manufacturer, classification of components produced in accordance with predetermined electrical test criteria, was a major portion of a production process. The produced electrical components were categorized in accordance with a plurality of tests and sorted, all under computer control. The testing operations were such that all of the components could be tested in seriatim, i.e., the test procedures for one component required the same amount of time as for any other component. Accordingly, with such simplified test procedures, a seriatim approach to the automation of testing for the satisfactory solution. However, not all components are subject to such easy and predictable test times. As an example, magnetic tape cartridges have a plurality of characteristics, all of which can be tested. The degrees of magnetic recording and high-quality control considerations require that various parameters be tested. Such parameters may interact such that retesting or more extensive testing may be called for. For example, if a particular area of a magnetic medium was scanned by a test transducer, lack of a successful test may be due to debris disposed intermediate the test transducer and the medium. Accordingly, a retest is called for ensuring that the appropriate yield of the magnetic material is achieved. Such retesting results in variable test times for tape containing cartridges being automatically produced. Accordingly, seriatim testing is not a viable production solution.

In an attempt to solve variable production and test rates, production lines have placed slow operating machines in parallel such that a single-flow production line may have a plurality of parallel paths through the slow machines, and a single serial path through a high production machine. Such solutions appear to be expensive and exhibit a limited degree of flexibility. A better solution for high-speed production of articles, particularly magnetic tape and related articles, is desired.

SUMMARY OF THE INVENTION

It is an object of the invention to provide a highly flexible, fully computerized production apparatus having a maximal degree of production rate flexibility, while enhancing monitoring capabilities.

An apparatus incorporating the present invention is characterized by a random access article storage and retrieval unit with various diverse production units including test units, disposed about the periphery of such random access storage unit. A programmed computer controls the transfer of articles within the storage apparatus and between the diverse manufacturing apparatus in a manner that quality control is facilitated while maintaining each of the diverse manufacturing and test apparatus, utilization to a maximal extent. Queues for the various diverse manufacturing and test apparatus consists of article storage cell locations within the storage apparatus, each article having but one storage cell location for facilitating article tracing.

In another aspect of the invention, the computerized control of such apparatus, includes a simple program driver loop for selectively invoking one of a plurality of control computer programs which not only control and monitor operation of the central random access article storage and retrieval unit, but also the diverse manufacturing and test apparatus, as well as generating a trace record for each article being processed through the manufacturing apparatus. Quality control of the diverse apparatus is also provided by computer program control.

The foregoing and other objects, features and advantages of the invention will be apparent from the following more particular description of preferred embodiments of the invention, as illustrated in the accompanying drawings.

THE DRAWINGS

DETAILED DESCRIPTION

Figure 1:
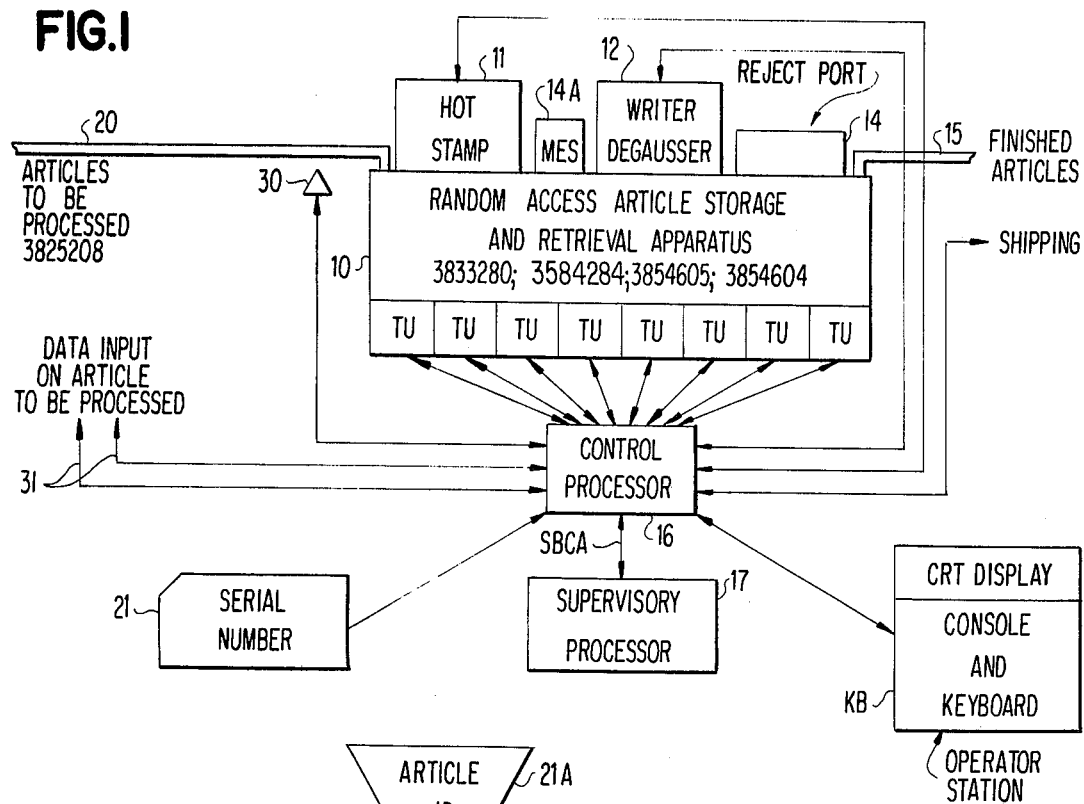
FIG. 1 is a block diagram of an article production facility employing the present invention.

Referring now more particularly to the attended drawings, like numerals indicate like parts and structural features in the various views and diagrams. FIG. 1 illustrates a typical apparatus incorporating the present invention. It includes a centrally controlled and located random access article storage and retrieval apparatus 10 surrounded by a plurality of manufacturing and test apparatus. The present apparatus is designed to produce an article as shown in U.S. Pat. No. 3,825,208, which shows the physical construction of the article and as shown in U.S. Pat. No. 3,932,894, which shows the format on the magnetic medium in the article of U.S. Pat. No. 3,825,208, which is advantageously produced and tested by the FIG. 1 illustrated apparatus. A first of the peripheral manufacturing apparatus is a hot stamp unit 11 which receives under program control, articles to be produced. After hot stamping which will be later described, the article may be placed in a queue within apparatus 10 for transfer to servo writer degausser 12. Servo writer degausser 12 adds a format to the magnetic media in the article of U.S. Pat. No. 3,825,208, as shown in U.S. Pat. No. 3,932,894. Subsequently thereto, the article is transferred from the writer degausser 12 to apparatus 10, or to one of the many test units (TU) for verifying that the appropriate format has been recorded on the magnetic medium. If the test is unsuccessful, the article is supplied to reject port 14 for further analysis beyond the scope of the present invention. If the test was successful, the article is returned to apparatus 10 awaiting transfer via conveyor 15 as a finished article to be shipped. All of the above described apparatus is sequenced, operated and monitored by control processor 16 which contains microcode as will be described, for effectuating the manufacture of the articles. Control processor 16 is connected to a supervisory processor, such as an IBM 370 Model 155 or 168, (manufactured and sold by International Business Machines Corporation, Armonk, N.Y.), which serves as a factory control computer. The supervisory processor 17 is connected to other apparatus (not shown) for manufacturing diverse products.

Figure 2:
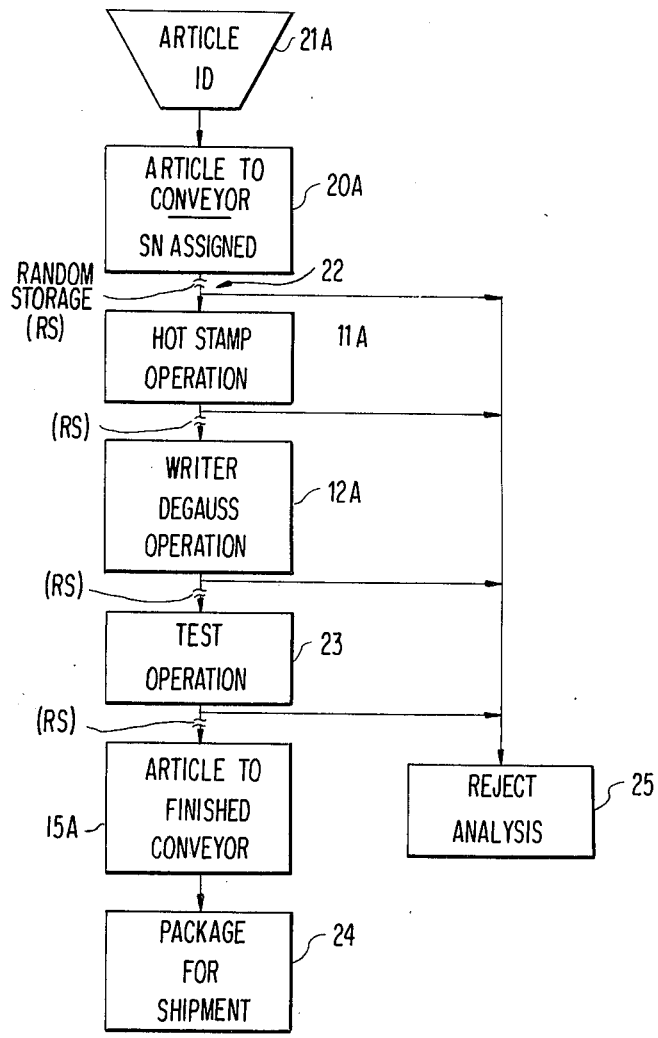
FIG. 2 is a flow diagram illustrating operation of the FIG. 1 illustrated apparatus.

The description assumes that the magnetic medium in the form of an elongated tape and the various portions of the article, have been assembled by apparatus (not shown) and supplied to a suitable conveyor line 20 for transfer to apparatus 10. Upon the completion of the initial assembly of the physical parts, the article is delivered to conveyor 20 and a serial number is assigned to each of the articles. This is achieved in the illustrated apparatus via a punched card or unit record reader represented by symbol 21. The serial number is internally recorded by the control processor which, at that time, assigns a storage location within apparatus 10, to the article to be processed. In FIG. 2, the flow-chart showing the flow of articles through the FIG. 1 illustrated apparatus, shows the assignment of serial number at 21A, whereupon the article is placed on conveyor 20 at 20A, and the serial number recorded by the control processor 16. The control processor 16 then determines whether or not hot stamp unit 11 is available. If it is not available, the article is received by apparatus 10 and transferred to the assigned storage location, as represented by the spaced lines at 22. Such stored articles are a queue of work to be performed by hot stamp unit 11. If the queue is empty, the article is immediately transferred to the hot stamp unit 11. Normally, the queue is not empty, requiring the article to reside in apparatus 10 for a short time.

The cartridge is hot stamped to visually record the assigned serial number at the free end of the tape as shown in U.S. Pat. No. 3,932,894. Hot stamping is achieved by a heated die pressed against the polyester based magnetic medium. Such an operation is well known and not described for that reason. Transfer of the article from the storage apparatus to the hot stamp unit 11, is as shown in the referenced patents, for apparatus 10.

Subsequently, servo writer 12 receives the article. Servo writer 12 consists of a multiple head magnetic tape recorder for recording signals along the length of the medium. The article is received with the signals recorded thereon using known magnetic recording techniques. It is preferred that the tape may be degaussed prior to the recording. This is achieved by passing the article physically through a magnetic field such as that provided by a permanent magnet or AC magnetic field. Subsequent to the writer 12 operation as at 12A, the cartridge is returned to apparatus 10 for enqueuing to a test unit (TU). Upon entry into a test unit (TU) the test operation at 23 is performed. Such test operation verifies the continuity of the magnetic coding of the magnetic medium of the data cartridge. Also, the ability of the magnetic medium to be unspooled and spooled is vertified. In the event a certain percentage of the coating is unsatisfactory for magnetic recording purposes, particularly of the data processing type, the article is rejected and sent to reject port 14. Control processor 16 tallies the number of articles being rejected for input to quality control (QC). Following the test operation 23, the article is returned to storage, awaiting transfer to a packing machine (not shown) via conveyor 15. Upon accumulation of a predetermined number of articles within apparatus 10, all of the articles to be packaged are transferred over conveyor 15 at step 15A, and packaged for shipment at 24. The packaging apparatus is not shown.

To assist in quality control, manual entry station 14A receives articles to enable analyzing random samples of articles received by apparatus 10 at various stages of the above described manufacturing operation. As shown in FIG. 2, raw received articles can be analyzed, as well as articles at any stage of the operation.

Control processor 16 is responsive to an input sensing switch 30 for verifying that an article has been received, in accordance with the serial number assigned at 21, for transfer to the assigned storage location within apparatus 10. The addressing and identification of such storage locations can be as shown in the referenced patents and as indicated later in the microcode listings.

Further, reject port 14 is adapted to receive articles after reject analysis as at 25. In such a situation, control processor 16 maintains a serial number from 21, and assigned storage location, until a console (not shown) entry orders control processor 16 to erase the serial number from the manufacturing operation. In this manner, integrity of the entire manufacturing operation is maintained through diverse forms of tests and functions. It is to be understood that additional diverse testing and control may be achieved by adding additional units to the FIG. 1 illustrated apparatus. Further, in a practical embodiment, control processor 16 monitors operations of the parts assembly apparatus (not shown) as indicated by lines 31. Such apparatus takes all of the parts of the cartridge and assembles them together. Additionally, magnetic medium is slit to the appropriate width and automatically wound on a spool of the cartridge by a winder (not shown) before being transferred to input conveyor 20.

Figure 3:
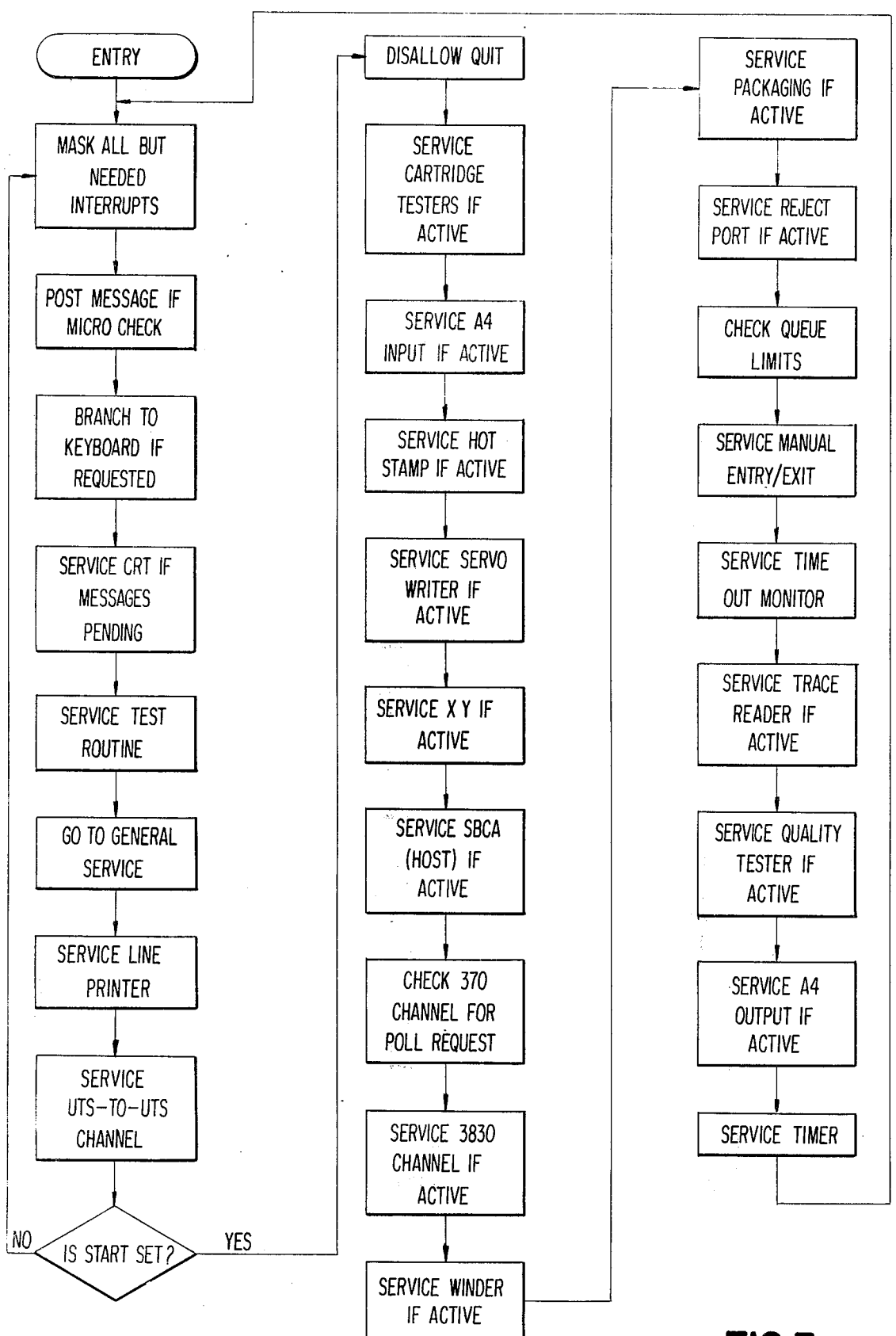
FIG. 3 is a flow diagram of the computer control program driver aspects for automatically operating the FIG. 1 illustrated apparatus.

Before going into the details of the program control, control processor 16 is described. The architecture of the processor is as shown in FIG. 3 of U.S. Pat. No. 3,654,617 but using the instruction words and as defined and mnemonics as listed hereinafter, rather than the limited instruction repertoire used in the referenced U.S. Pat. No. 3,654,617. The A and B bus of U.S. Pat. No. 3,654,617 is the X and Y bus of the control processor 16. As described herein, the machine instruction level description, is based upon an assembler language for assemblying the actual numeric instructions (binary 1's and 0's) such that any machine architecture can be employed using the later described microcode elements.

INSTRUCTION WORDS AND MNEMONICS FOR CONTROL PROCESSOR 16

Each instruction word in source language form includes:

Label: Identify machine instructions, etc. (data access). The label is useful when an assembler converts the source statements into machine coding. The label field includes only symbols, defined below:

Storage areas, instructions, and other elements may be given symbolic names for the purpose of referring to them in a program. All symbols must conform to the following rules:

1. The symbol must not consist of more than six characters. The first character must be alphameric. The other characters may be combinations of alphameric and numeric digits.
2. No special characters may be included in a symbol.
3. No blanks are allowed in a symbol.
4. A symbol may be defined only once in an assembly.
5. A symbol used as a name entry in an equate statement is assigned the value designated in the operand field. If the label field is left blank, it is ignored by the assembler. If column 1 contains an asterisk (*), the entire statement is treated as a comment and appears only in a program listing and is not used as a machine instruction.

OPERATION

Each machine instruction has a unique mnemonic operation code associated with it. The mnemonics are indicated below with the various instructions.

Each machine ALU function has been assigned a unique mnemonic. An ALU function may be specified with all instruction mnemonics except BRANCH and BRANCH AND LINK. If an operation mnemonic is coded and no ALU functin mnemonic is coded, the assembler defaults to the PASS X (PX) ALU function. All extended mnemonics have an implied ALU function associated with them, as later described.

OPERAND

The operand field is used to specify subfields in instructions and constants. Operand fields are discussed in Section 6.2.

The comment field appears to the right of the operand field and must be separated from it by at least one blank.

OPERAND FIELDS AND SUBFIELDS

Some symbolic operands are written as a single field, others as a single field with subfields, and still others as multiple fields. Fields and subfields in a symbolic operand may be represented either by symbolic names or by decimal or hexadecimal self-defining terms. Operand fields are separated by a comma. Up to three fields may be coded for some UTS machine operations. Operand subfields must be enclosed in parentheses. Operand fields enclosed in parentheses indicate that indirect addressing is to be used.

When indirect addressing is specified for a register field, it means that the address of the register to be operated on is contained in the register R1.

When a Control Store or Main Store operand field is addressed indirectly, the CS or MS effective address is contained in the register specified in the A1 field.

In this document, operand fields will be numbered left to right, from 1 to 3. An alphabetic character is also used to indicate what type of operand is being specified. The following characters are used:

R = Register Field (in LSR)
I = Immediate Data Field (contained in instruction word)
A = A control Store or Main Store Address Field
X = An Index Register used as an Address Field or as a Subfield
S = A Shift Control Field
N = A decimal or hexadecimal self-defining term

LANGUAGE

The source language to assembler constraints are set forth herein for achieving one machine instruction for each symbolic language instruction.

RELATIVE ADDRESSING

Relative addressing is the technique of addressing instructions or data areas by designating their respective locations in relation to the Control Store Address Register CSAR or to some symbolic location (label). Relative addressing can be effected using the current value of the CSAR by specifying an asterisk as the first character of the operand fields. Data areas can be referred to by their symbolic name + or − some value.

CHARACTER SET

Source language instructions and comments are written using the following characters:

Alphameric: A through Z and $, #, @
Numeric: 0 through 9
Special Characters: + − , * ( ) ' blank In addition, any of the 256 punch combinations may be used anywhere that characters may appear between paired apostrophes and in comments.

INSTRUCTIONS

Instructions in the source language activate the programmable machine to execute one machine instruction. There are three program controlling type instructions:

| Mnemonic | Instruction |
|---|---|
| ORG | Define origin in control store |
| MORG | Define origin in main store |
| END | End of source program |

The ALU functions to be named in an instruction word are as follows:

| Mnemonic | Name | Resulting ALU Output |
|---|---|---|
| XI | X Incremented | The contents of the X register plus 1 |
| XD | X Decremented | The contents of the X register minus 1 |
| ADD | Add | The algebraic sum of the X and Y registers |
| SUB | Subtract | The Y register subtracted from the X register |
| ADC | Add with carry | The algabraic sum of the X and Y registers plus the contents of the carry latch |

-continued

| Mnemonic | Name | Resulting ALU Output |
|---|---|---|
| SBB | Subtract with borrow | The Y register subtracted from the X register minus the contents of the borrow latch |
| SBD | Subtract and decrement | The Y register subtracted from the X register minus 1 |
| TC | Two's complement | The two's complementment of 0001 (FFFF) |
| PX | Pass X | The contents of the X register |
| PY | Pass Y | The contents of the Y register |
| PZ | Pass Zero | Zero |
| AND | AND | The logical "And" of the X and Y registers |
| OR | OR | The logical "Or" of the X and Y registers |
| EOR | Exclusive Or | The logical "Exclusive Or" of the X and Y registers |
| XNY | X and Not Y | The logical "And" of the X register and the one's complement of the Y register |
| YNX | Y and Not X | The logical "And" of the Y register and the one's complement of the X register |

BRANCH AND BRANCH AND LINK INSTRUCTIONS

BRANCH and BRANCH AND LINK instructions are very similar. The only difference between the two is that when a BRANCH AND LINK is specified, the Control Store Address Register CSAR contents are stored in the X register. The instructions operate as follows:

If the BRANCH or BRANCH AND LINK is unconditional or if the condition code implied by the instruction mnemonic matches the condition code of the ALU output at the start of instruction execution, a branch is taken to the effective control store address (EA). If the condition code of the instruction does not match that of the ALU output, the next sequential instruction is executed.

The list below shows the eight BRANCH mnemonics and the eight BRANCH AND LINK mnemonics

| Branch Mnemonic | Branch and Link Mnemonic | Meaning |
|---|---|---|
| B | BAL | Branch Unconditional |
| BO | BALO | Branch on overflow |
| BP | BALP | Branch on plus |
| BN | BALN | Branch on negative |
| BZ | BALZ | Branch on zero |
| BNP | BALNP | Branch on not plus |
| BNN | BALNN | Branch on not negative |
| BNZ | BALNZ | Branch on not zero |

BRANCH and BRANCK AND LINH instructions control store effective addresses (EA) are generated depending on the operand format used.

The following examples illustrate effective address generation for these instructions.

| Example | Label | Operation | ALU | Operand |
|---|---|---|---|---|
| 1 | A symbol or blank | Any valid Branch or Branch and Link Mnemonic | Blank | A1 |
| 2 | | | | A1 (X1) |
| 3 | | | | (X1) |
| 4 | | | | *+N |
| 5 | | | | *−N |
| 6 | | | | *A1 |

Example 1 above shows a "direct" branch to the control store address represented by the value A1. Example 2 is an "indexed" branch. The EA is generated by adding the control storage address A1 to the contents of index register X1. Example 3 is an "indirect" branch to the control store address contained in X1. Examples 3, 4, and 5 are all "displacement" branches. The EA is generated by adding the displacement of +N, −N, or A1 to the current setting of the Control Store Address Register CSAR.

TEST AND BRANCH INSTRUCTIONS

The format of these instructions is:

| LABEL | OPERATION | ALU | OPERAND |
|---|---|---|---|
| A symbol or blank | See below | Any ALU function | R1, I2, A3 |

TEST and BRANCH instructions place either the high order byte or the low order byte of the specified 2-byte (16 bit) register (R1) into the X register and the 8 bits of immediate data (I2) into the Y register. The specified ALU function is performed and the resulting condition code is compared to the condition code of the instruction. The signal contents of registers X and Y are not changed. If the condition codes match, the branch (to A3) it taken. If there is not a match, the next sequential instruction is executed. The displacement of A3 must not be greater than +127 or −128. The TEST and BRANCH mnemonics are:

| High Order Byte | Low Order Byte | Meaning |
|---|---|---|
| THB | TLB | Branch unconditional |
| THBO | TLBO | Branch on overflow |
| THBP | TLBP | Branch on plus |
| THBN | TLBN | Branch on negative |
| THBZ | TLBZ | Branch on zero |
| THBNP | TLBNP | Branch on not plus |
| THBNN | TLBNN | Branch on not negative |
| THBNZ | TLBNZ | Branch on not zero |

READ AND WRITE REGISTER MASKED INSTRUCTIONS

The format of the READ and WRITE REGISTER MASKED instructions is:

| LABEL | OPERATION | ALU | OPERAND |
|---|---|---|---|
| A symbol or blank | See below | Any ALU function | R1, I2, or (R1), I2 |

Both the READ REGISTER MASKED and the WRITE REGISTER MASKED instructions read the contents of the specified register (R1) into either the X or the Y register as indicated by the operation mnemonic. The immediate data (I2) is read into the opposite register (X or Y). The specified ALU function is performed and in the case of the READ REGISTER MASKED instruction, this completes the operation. The WRITE REGISTER MASKED instruction rewrites the specified register (R1) with the output of the ALU completing the operation. If the R1 field of the operand is enclosed in parentheses, it indicates indirect register addressing.

The following operation mnemonics have been defined for the READ and WRITE REGISTER MASKED instructions:

| Mnemonic | Function |
|---|---|
| LDX | Read (load) R1 to X, Mask to Y |
| LDY | Read (load) R1 to Y, Mask to X |
| STX | Read and write (store) R1 to X, Mask to Y |

-continued

| Mnemonic | Function |
|---|---|
| STY | Read and write (store) R1 to Y, Mask to X |

MOVE/MODIFY REGISTER INSTRUCTIONS

The MOVE/MODIFY REGISTER instructions have several variations. The basic form of the MOVE/MODIFY instructions will be explained first. All other forms of the instruction will be explained later. The format of the basic MOVE/MODIFY instructions is

| LABEL | OPERATION | ALU | OPERAND |
|---|---|---|---|
| A symbol or blank | MDX or MDY | Any ALU function | R1, R2, S3 |

These instructions move the contents of the "from" register (R2) into either X or Y register as implied by the operation mnemonic. The specified ALU function is performed and then the specified shift function is done on the output of the ALU. The output of the ALU is then stored in the "To" register (R1). This is the only instruction that has a shift function. A shift, left or right, logical or rotate, from 1 to 4 bit positions may be done. The S3 field of the operand defines the type of the shift to be done. The list below shows the valid forms of the operand shift field.

RLL$\eta$ = Rotate left logical
RRL$\eta$ = Rotate right logical
SLL$\eta$ = Shift left logical
SRL$\eta$ = Shift right logical Note: $\eta$ is a decimal number from 1 to 4.

Indirect addressing is permitted on either the "From" register or the "To" register but not both. If any register is addressed indirectly, no shift function is allowed.

If only the R1 field of the operand is coded, the R1 field becomes both the "From" and the "To" register. The following chart shows all of the valid operand formats for the MDX/MDY instructions.

| OPERAND FORMAT | MEANING |
|---|---|
| R1 | R1 = From and To reg. |
| R1, R2 | R1 ' To reg., R2 = From Reg. |
| R1, S2 | R1 ' From and To Reg. with shift |
| R1, R2, S3 | R1 ' To reg., R2 = From reg. with shift |
| (R1), R2 | R1 = Indirect, R2 = Direct |
| R1, (R2) | R1 ' Direct, R2 = Indirect |

Another form of the MOVE/MODIFY instructions is a MOVE/MODIFY with SWAP. The format of this instruction is:

| LABEL | OPERATION | ALU | OPERAND |
|---|---|---|---|
| A symbol or blank | MDXS or MDYS | Any ALU function | R1 or R1, R2 or (R1), R2 or R1, (R2) |

These MOVE/MODIFY instructions operate the same as the MDX/MDY operations. Then, after the ALU function is performed, bits 0-7 bits 8-15 of the ALU output are swapped. The examples above show all valid operand formats for the MDXS and MDYS instructions. When a shift operand is specified, the shift is done first, then the swap.

The last MOVE/MODIFY instructions are the MOVE/MODIFY DOUBLE and the MOVE/MODIFY DOUBLE with SWAP. Formats for these instructions are:

| LABEL | OPERATION | ALU | OPERAND |
|---|---|---|---|
| A symbol or blank | MDXD MDYD MDXDS MDYDS LDXD LDYD LDXDS LDYDS | or Any ALU or function or | R1 or R1, R2 or R1 or R1, R2 or R1, (R2) or (R1), R2 |

The double forms of the MOVE/MODIFY instructions move the contents of the "From" register (R2) into either the X or Y register as implied by the operation mnemonic. The contents of the "To" register are moved into the opposite register (X or Y). The specified ALU function is performed and in the case of the "Load Double" (LDXD/LDYD) instruction, this completes the operation. If a MOVE DOUBLE SWAP or a LOAD DOUBLE SWAP is coded, bits 0-7 and bits 8-15 of the ALU output are swapped. The MOVE DOUBLE and MOVE DOUBLE SWAP instructions rewrite the resulting ALU output back into the "To" register. Either the "from" or the "To" register may be addressed indirectly, but not both. No shifting is permitted with the MOVE/MODIFY DOUBLE instructions.

WRITE MAIN STORE INSTRUCTIONS

Write main store instructions use any one of three different sources of data. They are:
1. The previous contents of the X and Y registers.
2. Immediate data.
3. An LSR or external register.

The format of the WRITE MAIN STORE instructions that use the previous contents of the X and Y registers is:

| LABEL | OPERATION | ALU | OPERAND |
|---|---|---|---|
| A symbol or blank | WS WSI or WSD | Any ALU function | A1 or A1 (X1) or (X1) (X1) |

In all of the examples above the specified ALU function is performed and the resulting ALU output is stored in the main store effective address EA. The main store EA is generated depending on the format of the operand used. If the operand coded is like the first example above, the main store EA is the main store address represented by A1. In the second example, the EA is the value of A1 plus the contents of the index register X1. If the third example is used, the main store EA is contained in the register S1.

If the WRITE STORAGE and INCREMENT (WSI) or the WRITE STORAGE and DECREMENT (WSD) mnemonic is used, the third operand type (X1) must be used and the contents of the register are incremented or decremented by one after the instruction is executed.

WRITE MAIN STORE MASKED (immediate data) instructions have the following format:

| LABEL | OPERATION | ALU | OPERAND |
|---|---|---|---|
| A symbol | WSM | or Any ALU | (X1), I2 |

| LABEL | OPERATION | ALU | OPERAND |
|---|---|---|---|
| or blank | WSMI WSMD | or function | |

These three instructions place the immediate data (I2) into the Y register. The specified ALU function is performed and the ALU output is stored in the main store EA. In all cases, the main store EA is contained in the register X1. If the WSMI or the WSMD mnemonic is used, the contents of the register R1 will be incremented or decremented after the main store EA is generated.

The third type of write main store instruction uses signals stored in LSR. The formats are:

| LABEL | OPERATION | ALU | OPERAND |
|---|---|---|---|
| A symbol or blank | WSR, LDS | Any ALU function | R1, A1 or R1, (X1) |
| | WSRI, LDSI or WSRD, LDSD | | R1, (X1) |

These instructions load the contents of the specified register (R1) into the Y register. The specified ALU function is performed and the ALU output is stored in the main store EA. The LDS instruction can have a direct main store EA (A1) or an indirect main store EA (contained in X1). The LDSI and LDSD instructions can only have an indirect EA. As with the WSMI and WSMD instructions, the LDSI and LDSD instructions increment or decrement the contents of the register X1 at the end of the instruction.

READ MAIN STORE INSTRUCTIONS

READ MAIN STORE instructions read the contents of the main store effective address into the Y register or through the Y register directly to a LSR. The "Read Storage" instructions shown below have the same effective address generation as their corresponding "Write Storage" instructions.

The format of the READ MAIN STORE to ALU instructions is:

| LABEL | OPERATION | ALU | OPERAND |
|---|---|---|---|
| A symbol or blank | RS | Any ALU | A1 or A1 (X1) or (X1) |
| | RSI or RSD | | (X1) |

The format of the READ MAIN STORE TO REGISTER instructions is:

| LABEL | OPERATION | ALU | OPERAND |
|---|---|---|---|
| A symbol or blank | RSR, STS | Any ALU function | R1, A1 or R1, (X1) |
| | RSRI, STSI or RSRD, STSD | | R1, (X1) |

LEVEL EXIT INSTRUCTION

The LEVEL EXIT instruction is used to exit from an interrupt level. All that is required is an operation mnemonic of LEX.

EXTENDED MNEMONICS

Extended mnemonics make the hardward register (X, Y, and ALU) transparent to the user.

The EXTENDED MNEMONICS fall into three classes. They are:
1. RR — Register to Register Operations.
2. RI — Register/Immediate Operations.
3. RS — Register/Storage Operations.

The format for all extended mnemonics is:

| LABEL | OPERATION | ALU | OPERAND |
|---|---|---|---|
| A symbol or blank | Extended mnemonic | Blank | 1, 2 |

Because of the format indicated above, only the operation and basic operand fields are shown. The class of instruction (RR, RI, or RS) will be shown as well as the equivalent unextended instruction. All indirect addressing rules that are applicable to the basic operand formats are valid for the extended codes.

LOAD INSTRUCTIONS

| Mnemonic | Operand | Class | Equivalent |
|---|---|---|---|
| LR | R1, R2 | RR | MDX PX R1, R2 |
| LRI | R1, I2 | RI | STX PY R1, I2 |
| L | R1, A2 | RS | STS PY R1, A2 |
| LIN | R1, (X2) | RS | STSI PY R1, (X2) |

The LOAD INSTRUCTIONS place the contents of the second operand in the first operand location. The second operand is not changed. The Load and Increment Instruction (LIN) increments the contents of "X2" after the load is performed.

STORE INSTRUCTIONS

| Mnemonic | Operand | Class | Equivalent |
|---|---|---|---|
| ST | R1, A2 | RS | LDS PY R1, A2 |
| STIN | R1, (X2) | RS | LDSI PY R1, (X2) |

The STORE INSTRUCTIONS place the contents of the first operand in the second operand main store location. The first operand is not changed. The Store and Increment Instruction (STIN) increments the contents of "X2" after the store is performed.

COMPARE INSTRUCTIONS

| Mnemonic | Operand | Class | Equivalent |
|---|---|---|---|
| CR | R1, R2 | RR | LDYD SUB R1, R2 |
| CLR | R1, R2 | RR | LDYD EOR R1, R2 |
| CRI | R1, I2 | RI | LDX SUB R1, I2 |
| CLRI | R1, I2 | RI | LDY EOR R1, I2 |

The first operand is compared with the second operand and the result determines the setting of the condition code.

AND INSTRUCTIONS

| Mnemonic | Operand | Class | Equivalent |
|---|---|---|---|
| NR | R1, R2 | RR | MDXD AND R1, R2 |
| NRI | R1, I2 | RI | STX AND R1, I2 |

The second operand is AND'ed with the first operand and the result is placed in the first operand location. The second operand is unchanged.

OR INSTRUCTIONS

| Mnemonic | Operand | Class | Equivalent |
|---|---|---|---|
| OR | R1, R2 | RR | MDXD OR R1, R2 |

| OR INSTRUCTIONS | | | |
|---|---|---|---|
| Mnemonic | Operand | Class | Equivalent |
| ORI | R1, I2 | RI | STX OR R1, I2 |

The second operand is OR'ed with the first operand and the result is placed in the first operand location. The second operand is unchanged.

| EXCLUSIVE OR INSTRUCTIONS | | | |
|---|---|---|---|
| Mnemonic | Operand | Class | Equivalent |
| XR | R1, R2 | RR | MDXD EOR R1, R2 |
| XRI | R1, I2 | RI | STX EOR R1, I2 |

The second operand is exclusive OR'ed with the first operand, and the result is placed in the first operand location. The second operand is unchanged.

| ADD INSTRUCTIONS | | | |
|---|---|---|---|
| Mnemonic | Operand | Class | Equivalent |
| AR | R1, R2 | RR | MDXD ADD R1, R2 |
| ARI | R1, I2 | RI | STX ADD R1, I2 |

The second operand is added to the first operand, and the sum is placed in the first operand location. The sign and magnitude of the sum determine the condition code. The second operand is not changed.

| SUBTRACT INSTRUCTIONS | | | |
|---|---|---|---|
| Mnemonic | Operand | Class | Equivalent |
| SR | R1, R2 | RR | MDYD SUB R1, R2 |
| SRI | R1, I2 | RI | STX SUB R1, I2 |

The second operand is subtracted from the first operand, and the difference is placed in the first operand location. The sign and magnitude of the difference determine the condition code. The second operand is not changed.

| INCREMENT INSTRUCTIONS | | | |
|---|---|---|---|
| Mnemonic | Operand | Class | Equivalent |
| IR | R1, R2 *Note | RR | MDX XI R1, R2 |

The contents of the second operand are incremented by +1 and the result is placed in the first operand location. The second operand is not changed.

| DECREMENT INSTRUCTIONS | | | |
|---|---|---|---|
| Mnemonic | Operand | Class | Equivalent |
| DR | R1, R2 *Note | RR | MDX XD R1, R2 |

The contents of the second operand are decremented by +1 and the result is placed in the first operand location. The second operand is not changed.
*Note: If only the R1 field is coded; that register will be incremented or decremented.

| SHIFT AND ROTATE INSTRUCTIONS | | | |
|---|---|---|---|
| Mnemonic | Operand | Class | Equivalent |
| SIL | R1, I2 | RI | MDX PX R1, SLL$\eta$ |
| SRL | R1, I2 | RI | MDX PX R1, SRL$\eta$ |
| RLL | R1, I2 | RI | MDX PX R1, RLL$\eta$ |

| SHIFT AND ROTATE INSTRUCTIONS | | | |
|---|---|---|---|
| Mnemonic | Operand | Class | Equivalent |
| RRL | R1, I2 | RI | MDX PX R1, RRL$\eta$ |

The contents of the first operand (R1) are shifted or rotated left or right the number of bits specified by the I2 operand. The I2 operand must be a decimal number from 1 to 4.

| SPECIAL INSTRUCTIONS | | | |
|---|---|---|---|
| Mnemonic | Operand | Class | Equivalent |
| SPI | I1 | RI | STX OR 61,X'00X0' |
| DIL | I1 | RI | STX OR 61,X'000X' |
| EIL | I1 | RI | STX AND 61,X'FFFX' |

These three instructions are provided to allow the programmer to manipulate interrupt levels. In all cases, the I1 field is a decimal number 0 to 3 representing interrupt levels 0 to 3.
SPI = Set Programmed Interrupt
DIL = Disable Interrupt Level
EIL = Enable Interrupt Level

MICROCODE FOR CONTROL PROCESSOR 16

Source code is included only for the important operating routines which perform functions not readily apparent or known from the brief description and the present state of related arts. Driver Loop, DR, scans active flags and gives control to later described service routines as needed.

The driver loop is a closed set of microcode instructions which checks various indicators and gives control to service and functional microcode routines as described below.
Service or function steps performed are:
1. Sets channel interrupt mask
2. Detects micro checks
3. Detects operator request
4. Operator display
5. Test routine service
6. General Service
7. Printer Service
8. Cartridge Tester Service
9. A4 Input Port Service
10. Hot Stamp Service
11. Servo Writer Service
12. XY Carriage Service
13. Host Service
14. 370 Channel Poll Service
15. TU Channel Service
16. Winder Service
17. Packaging Service
18. Reject Port Service
19. Queue Limit Service
20. Manual Entry Station Service
21. Device Time Out Service
22. Trace Reader Service
23. Quality On Line Tester Service
24. Special Channel Service
25. A4 Output Port Service (output from unit 10)
26. Timer Service Steps 8 through 26 are executed only if the driver loop is running. START and STOP commands with no operands are used to control the driver loop. For most of the service routines, a check is made of the active flag and if on, control is passed to the requested routine. If the active flag is off, the service is skipped. Each service routine returns control to instruction following the branch to the routine. The active flags are controlled by the START and STOP commands with appropriate operands. The last instruction in the driver loop is an unconditional branch to the top, thus closing the loop.

Items 1, 2, 3, 5, 16, 22, 23, and 24 are not further mentioned because explanation would not further the understanding of the present invention.

FIG. 2 is a flow chart showing the operations of the Driver Loop, DR. The machine instruction level source microcode is shown in the tables below. The remarks in the table ties the flow chart into the table.

```
        TITLE   DRIVER LOOP

DR00    EQU     *
        STX  OR    $RCR1,X'F000'      SELECT PAGE 15
        RSR  PY    R55,CHMASK         LOAD CHAN MASK OF ONLY NEEDED INTERRUPTS
        STX  AND   $RCR1,X'0FFF'      SELECT PAGE 0
        TBBZ AND   $RCR2,X'01',DR25   SKIP IF NO MICRO CHECKS
        MDX  PX    R1,$RCR2           PUT CHECKS INTO R1
        LRI        R2,DR26+9          POINT TO MESSAGE AREA
        BAL        BEXE               CONVERT
        LDX  PX    R1,C' '            LOAD BLANK MASK
        WS   PY    DR26+10            BLANK OUT SECOND HALF
        LRI        R1,DR26            POINT TO MESSAGE
        BAL        PSTMSG             POST
        STX  OR    $RCR3,X'0100'      RESET ERROR
DR25    EQU     *
        LDY  PX    R1,X'0001'         LOAD INT REQ CODE
        RS   EOR   KEYIN              SEE IF OPER REQ SERVICE
        BZ         CON00              GO SERVICE CONSOLE
DR07    EQU     *
        RS   PY    CRTQ               SEE IF ANYTHING IN CRT QUEUE
        BNZ        CRT00              GO SERVICE
DR10    EQU     *
        RSR  PY    R1,TSTPTN          GET ADD OF TEST ROUTINE
        B          (R1)               GO TO TEST ROUTINE
DR15    EQU     *
        B          SRV01              GO TO GENERAL SERVICE ROUTINE
DR17    EQU     *
        B          PRS00              GO SERVICE LINE PRINTER
DR19    EQU     *
        RS   PY    UUACT              SEE IF UTS-UTS CHAN ACTIVE
        BNZ        UU00               SERVICE IF SO
DR23    EQU     *
        RS   PY    START              SEE IF START HAS BEEN SET
        BZ         DR00               IF NOT-DO NOTHING BUT WAIT FOR IT
        WS   PZ    SAVE07             DIS-ALLOW QUIT TILL SAVE DONE
        RS   PY    CTACT              CHECK CART TESTERS
        BNZ        CT00               GO SERVICE IF ACT
DR01    EQU     *
        RS   PY    A4IACT             CHECK A4 INPUT
        BNZ        A4I00              GO SERVICE
DR02    EQU     *
        RS   PY    HSACT              CHECK HOT STAMP
        BNZ        HS00               GO SERVICE
DR03    EQU     *
        RS   PY    SWACT              CHECK SERVO WRITER
        BNZ        SW00               GO SERVICE
DR04    EQU     *
        RS   PY    XYACT              CHECK X-Y MECH
        BNZ        XY00               GO SERVICE
DR05    EQU     *
        RS   PY    SBACT              CHECK SBCA
        BNZ        SB00               GO SERVICE
DR06    EQU     *
        BAL        CHPOLL             CHECH CHAN FOR REQ.
        RS   PY    CHACT              CHECK CHAN
        BNZ        CHS00              GO SERVICE
DR08    EQU     *
        RS   PY    WDACT              CHECK WINDER
        BNZ        WD00               GO SERVICE
DR09    EQU     *
        RS   PY    PKACT              CHECK PACKAGING
        BNZ        PK00               GO SERVICE PACKAGING
DR11    EQU     *
        RS   PY    RJACT              SEE IF REJECT PORT ACTIVE
        BNZ        RJ00               GO SERVICE
```

```
        TITLE     DRIVER LOOP

DR12    EQU       *
        B         QL00             GO CHECK QUEUE LIMITS
DR13    EQU       *
        B         MES00            GO SERVICE MANUAL ENTRY/EXIT
DR14    EQU       *
        B         TOM00            GO SERVICE TIME OUT MONITOR
DR18    EQU       *
        RS    PY  TRACT            SEE IF TRACE READER ACTIVE
        BNZ       TR00             GO TO TRACE READER ROUTINE
DR20    EQU       *
        RS    PY  QUAL02           SEE IF QUALITY TESTER ACTIVE
        BNN       QT00             GO SERVICE IF SO
DR21    EQU       *
        RS    PY  GT09             SEE IF PAKP X STARTED
        BNZ       GT00             GO DOIT IF SO
DR22    EQU       *
        RS    PY  A4OACT           SEE IF A4 OUTPUT IS ACTIVE
        BNZ       A4O00            GO SERVICE IF SO
DR24    EQU       *
        B         TC00             SERVICE TIMER
DR16    EQU       *                TIMER CALL MUST BE AT END OF DRIVER
        B         DR00             CLOSE LOOP
CTACT   DC        *                CART TESTERS ACT FLG
A4IACT  DC        0                A4 INPUT ACT FLG
HSACT   DC        0                HOT STAMP ACT FLG
SWACT   DC        0                SERVO WRITER ACT FLG
XYACT   DC        *                X-Y CARRIAGE ACT FLG
SBACT   DC        *                SBCA ACT FLG
CHACT   DC        *                CHANNEL ACT FLAG(3830'S)
WDACT   DC        0                WINDER ACT FLG
PKACT   DC        0                PACKAGING ACT FLAG
RJACT   DC        0                REJECT PORT ACTIVE FLAG
LPRACT  DC        *                PRINTER ACTIVE FLAG
START   DC        0                SYSTEM START FLAG
TRACT   DC        0                TRACE READER ACTIVE FLAG
UUACT   DC        0                UTS-TO-UTS CHAN ACTIVE FLAG
A4OACT  DC        0                A4 OUTPUT TO NEXT SYS ACTIVE FALG
TSTRTN  DC        DR15             INIT TEST ROUTINE=NOP
ADR15   DC        DR15             RESTORE ADD
CHMASK  DC        X'E140'          LEVEL-0, SUB LEVEL 0,1,2    SBCA
*                                  LEVEL-1, SUB LEVEL 3        PRINTER
*                                  LEVEL-2, SUB LEVEL 1        KEYBOARD
DR26    DC        0                CHAIN WORD
        DC        0                PENDING FLAG
        DC        8                WORD COUNT
        DC        C'MICRO CHECK=XXXX'
```

Input Port Service, A4I, processes cartridges from input conveyor 20 into apparatus 10.

Control is received from the driver loop DR if the driver loop DR and input port are active (START and START A). Control is returned to the driver DR if no move queue elements are available. If the input conveyor 20 is not on-line, then the service is made inactive, a message is posted and control returned to driver DR. If no, then a cartridge is at the input port, control is returned to the driver DR. For a cartridge present at the port, the following is done:

1. Input port pause is checked and if set, control is returned to the driver DR.
2. Moves pending to cell or hot stamp will cause return to the driver.
3. A cartridge is dequeued from the conveyor queue.
4. A move is requested to a cell or to the hot stamp if immediately available.
5. For an even system number, cartridge is placed in the testing queue. For odd system number, cartridge is placed in the hot stamp queue.

The above functions are illustrated in source microcode in the tables below.

```
        TITLE     CONVEYOR INPUT TO A4 SERVICE

*
        *
        *                              A4DI - INPUT CONVEYOR D/I REGISTER
        *                                     BIT-8  ONLINE
        *                                         9  CONV INPUT CHUTE
        *                                        10  CONV TO A4 FULL
        *                                        11  CART AT A4 IN GATE
```

TITLE    CONVEYOR INPUT TO A4 SERVICE

```
*                                       12 CART AT A4 INPUT PORT
*                                       13 SPARE
*                                       14 INTERVENTION REQUIRED
*                              A4DO - INPUT CONVEYOR D/O REGISTER
*                                  BIT-4  GO/STOP
*
A4DI      EQU    R51                D/I REG
A4DO      EQU    R35                D/O REGISTER
A4I00     EQU    *
          RS   PY  MVEFR            SEE IF MOVE QUEUE ELE AVAIL
          BZ       DR02             RETURN TO DRIVER IF NOT
          TLBZ AND A4DI,X'80',A4I04 BR IF ONLINE MISSING
          TLBZ AND A4DI,X'08',A4I01 RETURN IF NO CART AT PORT
          RS   PY  A4IPAU           SEE IF PAUSED
          BNZ      DR02             RETURN IF SO
          RS   PY  A4IXY            SEE IF MOVE REQUESTED TO XY
          BNZ      DR02             RETURN TO DRVR
          RS   PY  A4IHS            SEE IF MOVE REQUESTED TO HOT STAMP
          BNZ      DR02             RETURN IF SO
          RS   PY  CONVQ            SEE IF CART'S LOGICALLY IN QUEUE
          BZ       DR02             RETURN IF NOT
          LRI      R1,CONVQ         POINT TO Q CONTROL
          BAL      DEQUE            GO GET QUEUE ELE
          RS   PY  HSACT            SEE IF HOT STAMP ACTIVE
          BZ       A4I02            IF NOT SKIP DIRECT MOVE
          RS   PY  HSPAUS           SEE IF HOT STAMP PAUSED
          BNZ      A4I02            IF SO SKIP
          RS   PY  B4HSQ            SEE IF QUEUE BEFORE HS IS EMPTY
          BNZ      A4I02            NO-MOVE TO CELL
          RS   PY  XYHS             SEE IF MOVE FROM CELL TO HS PENDING
          BNZ      A4I02            YES-MOVE TO CELL
          TBBNZ AND HSDI,X'40',A4I02 CHECK HOT STAMP IN PORT
          TBBZ  AND HSDI,X'80',A4I02 CHECK IF HOT STAMP ONLINE
*
*                                   EVERYTHING OK-MOVE DIRECTLY TO HS
*
          BAL      MILLON           SEE IF MILLIONTH CARTRIDGE
          WSR  PY  R2,A4IHS         POST A4 IN TO HS MOVE
          LRI      R4,A4IHS         ADD OF ADD OF QUEUE ELE
          LRI      R5,HSQ           POINT TO HOT STAMP QUEUE
          RSR  PY  R7,HSI           TO X-Y ADD
          B        A4I03            GO COMPLETE MOVE REQ
A4I02     EQU    *
          WSR  PY  R2,A4IXY         POST MOVE REQ
          LRI      R4,A4IXY         POINT TO ADD OF ADD OF CART QUEUE ELE
          LRI      R5,B4HSQ         LOAD ADD OF DEST QUEUE
          RS   PY  SYSEVN           SEE IF EVEN SYSTEM NUMBER
          BZ       *+2              SKIP IF NOT
          LRI      R5,B4CTQ         POINT TO TESTER QUEUE
          RS   PY  3(R2)            GET TO X-Y
          MDX  PY  R7               PUT IN R7
A4I03     EQU    *
          RSR  PY  R6,A4I           LOAD X-Y ADD OF A4 IN PORT
          BAL      MOVEIT           GO POST MOVE REQ
          NOP                       AVOID SKIP
A4I01     B        DR02             RETURN TO DRIVER
*
*
A4I04     EQU    *
          WS   PZ  A4IACT           SET INACTIVE
          WS   TC  A4IPAU           SET APUSE
          STX  AND A4DO,X'F7FF'     DROP GO BIT
          LRI      R1,A4I06         POINT TO MESSAGE
          BAL      PSTMSG           POST
          LRI      R1,A4I07         POINT TO 'STOPPED' MESSAGE
          BAL      PSTMSG           POST
          B        DR02             RETURN TO DRIVER
A4I06     DC       0                CHAIN WORD
          DC       0                PENDING FLAG
          DC       13               WORD COUNT
          DC       C'INPUT CONVEYOR NOT ONLINE.'
```

```
TITLE       CONVEYOR INPUT TO A4 SERVICE

A4107  DC        0
       DC        0
       DC        9
       DC        C'A4 INPUT STOPPED.'
```

Hot stamp service, HS, processes cartridges into and out of the hot stamp unit 11.

Control is received from the driver DR if the driver loop DR and hot stamp unit 11 are active (START and START H). The hot stamp unit 11 is made inactive, a message issued and control returned to the driver if on-line is not present. If manual intervention required is present, a message is issued to CRT display or the printer, the hot stamp unit 11 made inactive. Control is returned to the driver DR. The cartridge move queue (later described) is checked and if no elements are available, control is returned to the driver. The remaining service is unique for the input pot and the output port.

For the input port of hot stamp unit 11:

1. If no cartridges are waiting to be hot stamped or the hot stamp unit 11 is paused, control is given to the output port service (later described).
2. If a cartridge is present at the hot stamp input port (not shown), control is given to the output service.
3. If no XY carriage (not shown) moves are pending, a cartridge is dequeued and a move requested to the input port of hot stamp unit 11.
4. The assigned serial number is checked and if the next number will be an even million, the hot stamp unit 11 is paused and a message requesting manual indexing is issued.
5. If more move queue elements are available, then control is given to the output service; if not, control is returned to the driver DR.

For the output port of hot stamp unit 11:

1. If no cartridge is at the output port, the timer is allowed and control is returned to the driver DR.
2. If a cartridge is present at the output port, the following is done:
   A. The timer is held.
   B. If the cartridge is a calibration cartridge, it is moved to the manual exit station, MES (not shown).
   C. If no I/O queue elements for supervisory processor 17 are available, control is returned to driver DR.
   D. If cartridge is a reject, it is moved to the reject port 14 or reject queue if XY carriage (not shown) move is not pending.
   E. For a good cartridge, checks are made of any XY carriage moves pending, if so, control is returned to driver DR.
   F. Good and bad cartridges are reported to the yield/throughput routine which sends the information to supervisory processor 17.
   G. If a visual check command, a good cartridge will be sent to the manual exit station, MES (not shown).
   H. Good cartridges will be moved to a apparatus 10 storage cell or to servo writer 12, if immediately available.
3. After a move is posted, control is returned to the driver DR.

The above functions are detailed at the machine introduction source microcode level below.

```
          TITLE        HOT STAMP SERVICE
      *
      *                                 HOT STAMP D/I REGISTER
      *                                 BIT-0-ONLINE
      *                                     1-CARTRIGGE AT INPUT PORT
      *                                     2-CARTRIDGE AT OUTPUT PORT
      *                                     3-REJECT
      *                                     4-INTERVENTION REQUIRED
      *
      *
      *                                 HOT STAMP D/O REGISTER
      *                                 BIT-0-GO/STOP
      *
      HSDI   EQU     R52                HOT STAMP D/I REG
      HSDO   EQU     R36                HOT STAMP D/O REG
      HSOO   EQU     *
*****************************************************************
*                            SERVICE INPUT PORT                 *
*****************************************************************
             THBZ   AND  HSDI,X'80',HS28   CHECK IF RDY AND ONLINE
             THBNZ  AND  HSDI,X'08',HS23   CHECK IF INTERVENTION REQUIRED
             RS     PY   MVEFR             CHECK IF FREE MOVE QUEUE ELE AVAIL
             BZ          DR03              RETURN TO DRIVER IF NOT
             RS     PY   B4HSO             SEE IF CART'S AVAIL FOR HOT STAMP
             BZ          HSO1              CHECK OUT IF NOT
             RS     PY   HSPAUS            SEE IF PAUSED
             BNZ         PSO1              YES TRY OUTPUT ONLY
             THBNZ  AND  HSDI,X'40',HSO1   BR IF CART AT HS INPUT PORT
             RS     PY   XYHS              SEE IF MOVE REQUESTED
             BNZ         PSO1              BR IF SO
             RS     PY   A4IRS             SEE IF DIRECT MOVE PENDING
             BNZ         HSO1              SKIP IF SO
             LRI         R1,P4HSQ          POINT TO QUEUE CONTROL
             BAL         DEQUE             GO GET QUEUE ELEMENT
             BAL         MILLON            SEE IF MILLIONTH CARTRIDGE
             WSR    PY   R2,XYHS           PUT IN MOVE REQ
             LRI         R4,XYHS           POINT TO ADD OF ADD OF CART QUEUE ELE
```

TITLE    HOT STAMP SERVICE

```
                LRI           R5,HSQ              POINT TO DEST QUEUE
                RS      PY    3(R2)               GET FROM X-Y
                MDX     PY    R6                  PUT IN R6
                RSR     PY    R7,HSI              X-Y ADD OF HOT STAMP IN PORT
                BAL           MOVEIT              POST MOVE REQ
HS02            B             DR03                RETURN IF NO MORE QUEUE ELE'S
                B             HS01                GO SERVICE OUTPUT PORT
HS28            EQU           *
                WS      PZ    HSACT               SET INACTIVE
                WS      TC    HSPAUS              SET PAUSE
                WS      TC    SRV147              ALLOW 'EMPTY' MESSAGE
                STX     AND   HSDO,X'7FFF'        DROP GO BIT
                LRI           R1,HS30             POINT TO MESSAGE
                BAL           PSTMSG              POST
                LRI           R1,HS26             POINT TO 'STOPPED' MESSAGE
                BAL           PSTMSG              PSOT
                B             DR03                RETURN TO DRVR
                PAGE
****************************************************************************
*                                    SERVICE OUTPUT PORT                   *
****************************************************************************
HS14            EQU           *
                WS      PZ    TOHS+1              ALLOW TIMING
                B             DR03                RETURN TO DRVR
HS01            EQU           *
                TRBZ    AND   HSDI,X'20',HS14     CHECK CART AT OUTPUT
                WS      TC    TOHS+1              HOLD TIMER
                RS      PY    HSQ                 SEE IF CART LOGICALLY IN HOT STAMP
                BZ            DR03                RETURN TO DRIVER IF NOT
                RS      PY    CALC01+8            SEE IF THIS A CAL CART
                BNZ           HS24                HANDLE IF SO
                RS      PY    TSBQ                SEE IF SBCA QUEUE ELEMENTS AVAIL
                BZ            DR03                RETURN TO DRVR IF NONE
                WS      PZ    REJCDE              CLEAR REJECT CODE
                TRBNZ   AND   HSDI,X'10',HS04     SEE IF THIS IS A REJECT
                RS      PY    HSXY                SEE IF MOVE REQUESTED
                BNZ           DR03                RETURN TO DRIVER IF SO
                RS      PY    HSSW                SEE IF MOVE PEND HS TO SW
                BNZ           DR03                RETURN TO DRVR IF SO
                RS      PY    HSREJ               SEE IF MOVE PENDING HS TO REJ
                BNZ           DR03                RETURN IF SO
                RS      PY    HSMES               SEE IF HS TO MES MOVE PENDING
                BNZ           DR03                RETURN IF SO
                LRI           R1,HSQ              POINT TO QUEUE CONTROL
                WS      PY    TOHS+1              CANCEL TIMER
                BAL           DEQUE               GET QUEUE ELE
                MDX     PX    R16,R2              SAVE POINTER
                DB            R21                 COUNT THIS CART OUT HOT STAMP
                RS      PY    1(R2)               GET FIRST WORD OF SER NUM
                BN            HS10                REJECT IF HIGH BIT ON
                LRI           R28,HSYLD           POINT TO HOT STAMP YIELD TABLE
                BAL           YLDG                REPORT GOOD CART
                MDX     PX    R21                 SEE IF VISUAL CHECK DUE
                BP            HS11                NO-SKIP
                RS      PY    MESREQ              YES-SEE IF CART OUT OF SYS
                BNZ           HS12                YES-GO COMPLAIN
                WSL     PY    R2,MESREQ           POST REQUEST
                WS      PZ    HSCOM               CLEAR COMPLAINED WORD
                LDX     PX    R2,B4SWQ            POINT TO SW QUEUE AS DEST
                WS      PY    MFSREQ+1            TELL MES SERVICE
                WSR     PY    R2,HSMES            POST MOVE REQUEST
                WS      TC    VISU23              POST VISUAL CHECK PENDING
                B             HS27                SKIP SERIAL NUMBER INTO MESSAGE
                MDX     XI    R27,R2              POINT TO SERIAL NUMBER
                LRI           R28,HS13+17         POINT TO MESSAGE AREA
                BAL           SECVRT              CONVERT
HS27            EQU           *
                RS      PY    HS13+1              SEE IF REQUEST PENDING
                BNZ           HS22                SKIP IF SO
                LRI           R1,HS13             POINT TO MESSAGE
                LRI           R2,CRTQ             POINT TO CRT QUEUE
                BAL           ENQUE               POST REQUEST
```

TITLE     HOT STAMP SERVICE

```
          WS     TC   HS13+1              POST PENDING
HS22      EQU         *
          LRI         R4,HSMFS            ADD OF ADD OF QUEUE ELE
          LRI         R5,MESQ             DESTINATION QUEUE
          RSR    PY   R6,HSO              X-Y ADD OF HOT STAMP OUT PORT
          RSR    PY   R7,MESOU            X-Y ADD OF MES EXIT (TO)
          BAL         MOVEIT              POST MOVE REQ
          NOP                              AVOID SKIP
          RSR    PY   R21,HSVER           RESET VISUAL CHECK LIMIT
          B           DR03                RETURN TO DRVR
HSCOM     DC          0                   COMPLAINT REGISTERED FLAG
HS23      B           HS06                GO TO ERROR PRINT
HS12      EQU         *
          STX    AND  HSDO,X'7FFF'        TURN OFF GO BIT
          WS     TC   HSPAUS              PAUSE HOT STAMP
          WS     PZ   HSACT               TURN HOT STAMP OFF
          WS     TC   SRV147              ALLOW 'EMPTY' MESSAGE
          RS     PY   HSCOM               SEE IF COMPLAINT REGISTERED
          BNZ         HS11                MOVE CART TO CELL SO
          WS     TC   HSCOM               POST COMPLAINT
          LRI         R1,HSERR2           POINT TO MESSAGE
          BAL         PSTMSG              POST THIS REQUEST
          LRI         R1,HS26             POINT TO 'STOPPED' MESSAGE
          BAL         PSTMSG              POST
          MDX    PX   R2,R16              GET SAVED QUEUE POINTER
HS11      EQU         *
          RS     PY   XYSW                SEE IF CELL TO SERVO WRITER MOVE
          BNZ         HS07                YES-MOVE TO CELL
          THBNZ  AND  SWDI,X'40',HS07     MOVE TO CELL IF CART AT SW IN PORT
          THBZ   AND  SWDI,X'80',HS07     SEE IF SERVO WRITER IS ONLINE
          RS     PY   SWACT               SEE IF SERVO WRITER ACTIVE
          BZ          HS07                IF NO SKIP DIRECT MOVE
          RS     PY   SWPAUS              SEE IF SERVO WRITER PAUSED
          BNZ         HS07                SKIP IF SO
          RSR    PY   R8,SWQ              GET COUNT OF CATRS IN SERVO WRTR
          LDX    SUB  R8,3                SEE IF 4 ALREADY
          BP          HS07                SKIP IF SO
          WSR    PY   R2,HSSW             MOVE DIRECTLY TO SW IN PORT
          LRI         R4,HSSW             ADD OF ADD OF QUEUE ELE
          LRI         R5,SWQ              PUT IN SERVO WRITER QUEUE
          RSR    PY   R7,SWI              SERVO WRITER IN PORT X-Y ADD
          B           HS05                COMPLETE MOVE REQUEST
HS07      EQU         *
          WSR    PY   R2,HSXY             POST MOVE REQ
          LRI         R4,HSXY             ADD OF ADD OF CART QUEUE ELE
          LRI         R5,B4SWQ            ADD OF DEST QUEUE
HS09      EQU         *
          RS     PY   3(R2)               GET TO X-Y
          MDX    PY   R7                  PUT IN R7
HS05      RSR    PY   R6,HSO              X-Y ADD OF HOT STAMP OUT PORT
          BAL         MOVEIT              POST MOVE RE
          NOP                              AVOID SKIP
          B           DR03                RETURN TO DRIVER
HS04      RS     PY   HSREJ               SEE IF MOVE REQUESTED
          BNZ         DR03                RETURN TO DRIVER IF IF YES
          RS     PY   HSXY                SEE IF HOT STAMP TO XY REQUESTED
          BNZ         DR03                RETURN TO DRVR IF SO
          LDX    PX   R1,1                SET REJECT CODE OF 1
          WS     PY   REJCDE              SAVE IT
          LRI         R1,HSQ              POINT TO QUEUE CONTROL
          WS     PY   TOHS+1              CANCEL TIMER
          BAL         DEQUE               GO GET QUEUE ELE
          LRI         R28,HSYLD           POINT TO HOT STAMP YIELD TABLE
          BAL         YLDB                REPORT REJECT CART
          DR          R21                 COUNT THIS CART OUT OF HS
HS10      EQU         *
          NOP         2                   WAS TEST OF REJAV
          RS     PY   RJACT               SEE IF REJECT ACTIVE
          BZ          HS08                MOVE TO CELL IF NOT
          WS     TC   REJAV               YES-MAKE NOT AVAIL
          DR          R22                 COUNT THIS CART TO REJECT PORT
          LRI         R5,CLPOOL           RETURN TO FREE POOL
```

TITLE    HOT STAMP SERVICE

```
                RSR     PY      R7,REJ1                 REJECT PORT X-Y ADD
                WSR     PY      R2,HSREJ                POST MOVE REQ
                LRI             R4,HSREJ                ADD OF ADD OF CART QUEUE ELE
                B               HS05                    GO COMPLETE MOVE REQ
HS06            EQU             *
                WSR     PY      R2,HSXY                 POST MOVE TO CELL REQUEST
                LRI             R4,HSXY                 ADD OF ADD OF QUEUE ELE
                LRI             R5,REJQ                 PUT IN REJECT QUEUE
                B               HS09                    COMPLETE MOVE TO CELL
HS06            EQU             *
                WS      PZ      HSACT                   SET HOT STAMP INACTIVE
                STX     AND     HSDO,X'7FFF'            DROP GO BIT
                WS      TC      HSPAUS                  SET HOT STAMP PAUSE
                WS      TC      SRV147                  ALLOW 'EMPTY' MESSAGE
                LRI             R1,HSERR1               POINT TO ERROR MESSAGE
                BAL             PSTMSG                  POST THIS REQUEST
                LRI             R1,HS26                 POINT TO 'STOPPED' MESSAGE
                BAL             PSTMSG                  POST
                B               DR03                    RETURN TO DRVR
HS24            EQU             *
                RS      PY      MESREQ                  SEE IF CART OUT OF SYSTEM
                BNZ             HS25                    SKIP IF SO
                RSR     PY      R7,MESOU                X-Y ADDRESS OF MES OUTPUT
                LRI             R5,MPSDUM               POINT TO DUMMY QUEUE
                LRI             R1,HSQ                  POINT TO HOT STAMP QUEUE
                WS      PY      TOHS+1                  CANCEL TIMER
                BAL             DEQUE                   REMOVE QUEUE ELEMENT
                WSR     PY      R2,HSMES                POST MOVE REQUEST
                WS      PZ      CALC01+8                REMOVE CAL CART IND
                LRI             R4,HSMES                POINT TO MOVE IN PROGRESS
                RS      PY      CT20+1                  SEE IF MESSAGE PENDING
                BNZ             HS05                    SKIP IF SO
                WS      TC      CT20+1                  POST PENDING
                LRI             R1,CT20                 POINT TO MESSAGE
                LRI             R2,CPTQ                 POINT TO CRT QUEUE
                BAL             ENQUE                   POST REQUEST
                B               HS05                    COMPLETE MOVE REQUEST
HS25            EQU             *
                RS      PY      CT63                    SEE IF MESSAGE SET
                BNZ             DR03                    OUT IF SO
                WS      TC      CT63                    SET MESSAGE SENT
                LRI             R1,CT64                 POINT TO 'SYS WAIT FOR CART' MESSAGE
                BAL             PSTMSG                  POST MESSAGE
                B               DR03                    RETURN TO DRVR
HSERR1  DC              0                               CHAIN WORD
        DC              0                               PENDING FLAG
        DC              17                              WORD COUNT
        DC              C'INTERVENTION REQUIRED ON HOT STAMP'
HSERR2  DC              0                               CHAIN WORD
        DC              0                               PENDING FLAG
        DC              20                              WORD COUNT
        DC              C'VISUAL CHECK DUE BUT CART OUT OF SYSTEM.'
HS13    DC              0                               CHAIN WORD
        DC              0                               PENDING FLAG
        DC              20                              WORD COUNT
        DC              C'HS    VISUAL CHECK TO MANUAL EXIT STATION.'
HSVER   DC              100                             HOT STAMP VISUAL CHECK LIMIT
HS26    DC              0                               CHAIN WORD
        DC              0                               PENDING
        DC              9                               WORD COUNT
        DC              C'HOT STAMP STOPPED.'
HS30    DC              0
        DC              0
        DC              11
        DC              C'HOT STAMP NOT ONLINE.'
```

Since hot stamp is a first function in the manufacturing operation, it provides a convenient point to count the inputted cartridges. Included with this operation is a subroutine of the hot stamp service that checks for the millionth cartridge. That subroutine is illustrated below in the machine instruction level source code chart.

1. When intervention required is detected, the next cartridge to be processed out of the servo writer 12 is removed. A message is sent to the operator (console) requesting that the offending cartridge be removed.

2. Only three cartridges are permitted in the servo writer 12 at a given time.

```
       TITLE      CHECK FOR EACH MILLIONTH CARTRIDGE INTO HOT STAMP

MILLON EQU         *
       MDY   XI    R15                SAVE LINK ADDRESS
       MDX   PX    R14,R2             SAVE R2
       LRI         R1,10000           DIVIDE BY 10,000
       RS    PY    1(R2)              GET HIGH ORDER OF SERIAL
       MDX   PY    R3                 PUT IN R3
       RS    PY    2(R2)              GET LOW ORDER OF SERIAL
       MDX   PY    R4                 PUT IN R4
       STX   AND   R3,X'7FFF'         REMOVE REJECT BIT IF SET
       STX   ADD   R4,1               CONSIDER NEXT SERIAL NUMBER
       STX   ADC   R3,0               PUT IN CARRY TOO
       BAL         DVD                GO DIVIDE
       LDX   PX    R4                 TEST REMAINDER
       BNZ         MIL01              NOT ZERO-SKIP OUT
       MDX   PX    R4,R3              GET QUOTIENT IN LOWER
       MDX   PZ    R3                 ZERO HIGH
       LRI         R1,100             DIVIDE BY 100 -(100*10,000=MILLION)
       BAL         DVD                DIVIDE
       LDX   PX    R4                 TEST REMAINDER
       BNZ         MIL01              NOT ZERO SKIP
       WS    TC    HSPAUS             IS MILLIONTH-PAUS HOT STAMP
       RS    PY    MIL02+1            SEE IF MESSAGE PENDING
       BNZ         MIL01              YES-SKIP
       WS    TC    MIL02+1            MARK PENDING
       LRI         R1,MIL02           POINT TO MESSAGE
       LRI         R2,CRTQ            POINT TO CRT QUEUEUE
       BAL         ENQUE
MIL01  EQU         *
       MDX   PX    R2,R14             RESTORE R2
       B           (R15)              RETURN TO CALLER
MIL02  DC          0                  CHAIN WORD
       DC          0                  PENDING FLAG
       DC          19                 WORD COUNT
       DC          C'MANUAL INDEXING OF HOT STAMP REQUIRED'
```

SERVO WRITER SERVICE, SW, processes cartridges into and out of the servo writer 12.

Control is received from the driver DR if the driver and the servo writer 12 are both active (START and START S). The servo writer 12 is handled in the same manner as the hot stamp unit 11 with the following exceptions:

3. The reject code is encoded for processor 17. A message is issued for ID/SERVO LOW LEVEL REJECT.

4. Cartridges are not processed directly into the next device TU.

The machine instruction level source code is listed below.

```
       TITLE      SERVO WRITER CONTROL

*
*                                     SERVO WRITER D/I REGISTER
*                                     BIT-0-ONLINE
*                                         1-CARTRIDGE AT INPUT PORT $$$$
*                                         2-CARTRIDGE AT OUTPUT PORT
*                                         3-REJECT
*                                         4-RETRY REJECT
*                                         5-8 SPARES
*                                         9-SERVO/ID LOW LEVEL REJECT
*                                         10-TIMED THREAD REJECT
*                                         11-INTERVENTION REQUIRED
*                                     SERVO WRITER D/O REGISTER
*                                     BIT-0-GO/STOP
*
AOD1   EQU         R52                OUTPUT TO NEXT A4 DI REGISTER BIT-13
SWDI   EQU         R53                SERVO WRITER D/I
SWDO   EQU         R37                SERVO WRITER D/O
SW00   EQU         *
```

TITLE    SERVO WRITER CONTROL

```
****************************************************************
*                          SERVICE INPUT PORT                   *
****************************************************************
        THBZ    AND SWDI,X'80',SW30    TEST READY AND ONLINE
        TLBNZ   AND SWDI,X'10',SW29    CHECK IF INTERVEN REQUIRED
        RS      PY  MVEPR              SEE IF MOVE QUEUE ELE'S AVAIL
        BZ          DRO4               RETURN TO DRIVER IF NONE AVAIL
        RS      PY  B4SWQ              SEE IF CART'S AVAIL TO SERVO WRT
        BZ          SW01               IF NOT CHECK OUTPUT PORT
        RS      PY  SWPAUS             SEE IF PAUSED
        BNZ         SW01               DO OUTPUT ONLY IF SO
        THBNZ   AND SWDI,X'40',SW01    BR IF CART AT INPUT PORT ΣΣΣ
        RS      PY  XYSW               SEE IF MOVE REQUESTED
        BNZ         SW01               BRANCH IF YES
        RS      PY  HSSW               SEE IF DIRECT MOVE PENDING
        BNZ         SW01               SKIP IF SO
        RSB     PY  R8,SWQ             LOAD COUNT OF CARTS IN SERVO WRITER
        LDX     SUB R8,2               SEE IF 3 ALREADY
        BP          SW01               SKIP IF SO
        LRI         R1,B4SWQ           POINT TO QUEUE CONTROL
        BAL         DEQUE              GO GET QUEUE ELE
        WSB     PY  R2,XYSW            POST MOVE REQ
        LRI         R4,XYSW            ADD OF ADD OF CART QUEUE ELE
        LRI         R5,SWQ             ADD OF DEST QUEUE
        RS      PY  3(R2)              GET FROM X-Y
        MDX     PY  R6                 PUT IN R6
        RSB     PY  R7,SWI             X-Y ADD OF SERVO WRITER IN PORT
        BAL         MOVEIT             POST MOVE REQ
SW02    B           DRO4               RETURN IF NO MORE QUEUE ELE AVAIL
        B           SW01               GO SERVICE OUTPUT PORT
SW29    EQU         *
        B           SW06               GO SET INT REQUIRED
SW30    EQU         *
        WS      PZ  SWACT              SET INACTIVE
        WS      TC  SWPAUS             SET PAUSE
        WS      TC  SPV150             ALLOW 'EMPTY' MESSAGE
        STX     AND SWDO,X'7FFF'       DROP GO BIT
        LRI         R1,SW32            POINT TO MESSAGE
        BAL         PSTMSG             POST
        LRI         R1,SW18            POINT TO 'STOPPED' MESSAGE
        BAL         PSTMSG             POST
        B           DRO4               RETURN TO DRVR
        PAGE
****************************************************************
*                          SERVICE OUTPUT PORT                  *
****************************************************************
SW14    EQU         *
        WS      PZ  TOSW+1             ALLOW TIMING
        B           DRO4               RETURN TO DRVR
SW01    EQU         *
        THBZ    AND SWDI,X'20',SW14    SEE IF CART AT OUT PORT
        WS      TC  TOSW+1             HOLD TIMER
        RS      PY  SWQ                SEE IF CART IS LOGICALLY IN SERVO WRITER
        BZ          DRO4               RETUR TO DRIVER IF NOT
        RS      PY  CALCO1+9           SEE IF THIS IS CAL CART
        BNZ         SW15               HANDLE IF SO
        RS      PY  TSBQ               SEE IF SBCA QUEUE ELEMENTS AVAIL
        BZ          DRO4               RETURN TO DRVR IF NONE
        WS      PZ  REJCDE             CLEAR REJECT CODE
        THBNZ   AND SWDI,X'10',SW04    SEE IF THIS IS A REJECT
        RS      PY  SWXY               SEE IF MOVE REQUESTED
        BNZ         DRO4               RETURN TO DRIVER IF SO
        RS      PY  SWAO               SEE IF MOVE PENDING TO NEXT A4
        BNZ         DRO4               RETURN TO DRIVER IF SO
        RS      PY  SWMES              SEE IF SW OUT TO MES MOVE PENDING
        BNZ         DRO4               RETURN TO DRVR IF SO
        LRI         R1,SWQ             POINT TO QUEUE CONTROL
        WS      PY  TOSW+1             CANCEL TIMER
        BAL         DEQUE              GET QUEUE ELE
        LRI         R28,SWYLD          POINT TO SERVO WRITER YIELD TBLE
        WS      PZ  SPV110+9           SAVE REJECT CODE
        BAL         YLDG               REPORT GOOD CART
        MDX     PX  R16,F2             SAVE QUEUE ELEMENT POINTER
```

TITLE       SERVO WRITER CONTROL

```
        RSR   PY   R8,SWVIS            LOAD VISU CHK COUNT
        MDX   XD   R8                  DECREMENT
        WSR   PY   R8,SWVIS            SAVE BACK
        BP         SW26                SKIP IF NOT DUE
        RS    PY   MESREQ              SEE IF CART OUT OF SYSTEM
        BNZ        SW27                HOLLER IF SO
        WSR   PY   R2,MESREQ           POST MES REQUEST
        LDX   PX   R1,B4CTQ            RETURN TO CT QUEUE
        WS    PY   MESREQ+1            TELL MES SERVICE
        WSR   PY   R2,SWMES            POST MOVE REQUEST
        WS    TC   VISU23              POST VISUAL CHECK PENDING
        LRI        R1,SW28             POINT TO MESSAGE
        BAL        PSTMSG              POST
        LRI        R4,SWMES            ADD OF QUEUE ELEMENT
        LRI        R5,MESQ             DESTINATION QUEUE
        RSR   PY   R6,SWO              XY ADDRESS OF SW OUTPUT
        RSR   PY   R7,MESOU            XY ADDRESS OF MAN EXIT STATION
        BAL        MOVEIT              MAKE MOVE REQUEST
        NOP                            AVOID SKIP
        RS    PY   SWVFR               LOAD CHK FREQUENCY
        WS    PY   SWVIS               RESTORE
        B          DR04                RETURN TO DRVR
SW27    EQU        *
        STX   AND  SWDO,X'7FFF'        DROP SW GO BIT
        WS    TC   SWPAUS              PAUS SERVO WRITER
        WS    PZ   SWACT               SET INACTIVE
        WS    TC   SRV150              ALLOW 'EMPTY' MESSAGE
        LRI        R1,HSERR2           POINT TO 'CART OUT OF SYS' MESSAGE
        BAL        PSTMSG              POST
        LRI        R1,SW18             POINT TO 'SW STOPPED' MESSAGE
        BAL        PSTMSG              POST
        MDX   PX   R2,R16              RESTORE QUEUE ELEMENT POINTER
SW26    EQU        *
        RSR   PY   R8,B4CTQ            LOAD NUMBER OF CARTS IN TESTER QUEUE
        LDX   SUB  R8,16               SEE IF AT LEAST 16
        BNP        SW25                SKIP IF NOT
        RS    PY   A4OACT              SEE IF NEXT A4 OUT ACTIVE
        BZ         SW25                SKIP IF NOT
        RS    PY   UUI23+4             SEE IF LAST TRANS STILL PENDING
        BNZ        SW25                SKIP IF SO
        RS    PY   XYAO                SEE IF CELL TO A4 OUT MOVE PENDING
        BNZ        SW25                SKIP IF SO
        TLBNZ AND  AODI,X'04',SW25     SKIP IF CART IN A4 OUTPUT PORT
        WSR   PY   R2,SWAO             POST MOVE PENDING TO NEXT A4
        LRI        R4,SWAO             POINT TO ADD OF QUEUE ELEMENT
        LRI        R5,UUCQ             POINT TO QUEUE TO NEXT A4
        RSR   PY   R7,A4OU             LOAD XY ADDRESS OF PORT
        B          SW05                COMPLETE MOVE REQUEST
SW25    EQU        *
        WSR   PY   R2,SWXY             POST MOVE REQUEST
        LRI        R4,SWXY             ADD OF ADD OF CART QUEUE ELE
        LRI        R5,B4CTQ            ADD OF DEST QUEUE
SW09    EQU        *
        RS    PY   3(R2)               GET TO X-Y
        MDX   PY   R7                  PUT IN R7
SW05    RSR   PY   R6,SWO              X-Y ADD OF SERVO WRITER OUT PORT
        BAL        MOVEIT              POST MOVE REQ
        NOP                            AVOID SKIP
        B          DF04                RETURN TO DRIVER
SW04    RS    PY   SWREJ               SEE IF MOVE REQUESTED
        BNZ        DR04                RETURN TO DRIVER IF YES
        RS    PY   SWXY                SEE IF MOVE REQ TO CELL
        BNZ        DR04                RETURN TO DRVR IF SO
        LRI        R28,8               ASSUME SERVO/ID LOW LEVEL REJ
        TLBNZ AND  SWDI,X'40',SW24     SKIP IF LOW LEVEL
        MDX   PZ   R28                 CLEAR R28
        THBZ  AND  SWDI,X'08',*+2      SEE IF RETRY REJECT
        STX   ADD  R28,1               SET IT
        TLBZ  AND  SWDI,X'20',*+2      TIMED THREAD?
        STX   ADD  R28,2               SET IT
        LDX   PX   R28                 TEST
        BNZ        *+2                 SKIP IF NOT ZERO
        LRI        R28,50              SET REJECT OF 50
        B          SW11                SKIP
```

TITLE    SERVO WRITER CONTROL

```
SW24    EQU     *
        LRI     R1,SW10             POINT TO 'LOW LVL REJ' MESSAGE
        BAL     PSTMSG              POST
SW11    EQU     *
        WSR  PY R28,REJCDE          SET REJECT CODE
        WS   PY SRV110+9            SAVE REJECT CODE
        LRI     R1,SWQ              POINT TO QUEUE CONTROL
        WS   PY TOSW+1              CANCEL TIMER
        BAL     DEQUE               GET QUEUE ELE
        LRI     R28,SWYLD           POINT TO SERVO WRITER YIELD TABLE
        BAL     YLDB                REPORT REJECT CART
        RS   PY RTST25              SEE IF RETEST ACTIVE
        BZ      SW23                NO-SKIP
        RS   PY 1(R2)               LOAD HIGH SERIAL
        MDX  PY R27                 PUT IN R27
        STX  ADD R27,X'1000'        INCREMENT RETEST COUNT
        WS   ADD 1(R2)              STORE BACK
        STX  AND R27,X'7000'        ISOLATE RETEST COUNT
        MDXS PX R27,R27,SRL4        MOVE TO LOWER BYTE
        LDX  PX R27                 LOAD RETRY COUNT IN 'X'
        RS   SUB RTST26             SEE IF RETEST COUNT SATISFIED
        BP      SW23                REJECT FROM SYSTEM IF SO
        WSR  PY R2,SWXY             POST MOVE TO CELL
        LRI     R4,SWXY             POINT TO COMPLETION FLAG
        LRI     R5,B4SWQ            POINT TO B4 SERVO WRITER QUEUE
        B       SW09                COMPLETE MOVE
SW23    EQU     *
        NOP     2                   WAS CHECK OF REJAV
        RS   PY RJACT               SEE IF REJECT ACTIVE
        BZ      SW08                MOVE TO CELL IF NOT
        WS   TC REJAV               MAKE NOT AVAIL
        DR      R22                 COUNT THIS CART TO REJECT
        LRI     R5,CLPOOL           RETURN CELL TO FREE POOL
        RSR  PY R7,REJ1             X-Y ADD OF REJECT PORT(TO)
        WSR  PY R2,SWREJ            POST MOVE REQ
        LRI     R4,SWREJ            ADD OF ADD OF CART QUEUE ELE
        B       SW05                GO FINISH MOVE REQ
SW08    EQU     *
        LRI     R5,FRJQ             POINT TO REJECT QUEUE
        WSR  PY R2,SWXY             POST SW OUT PORT TO CELL MOVE REQ
        LRI     R4,SWXY             ADD OF ADD OF QUEUE ELE
        B       SW09                COMPLETE MOVE TO CELL
SW06    EQU     *
        RS   PY CALC01+9            SEE IF CAL CART IN SERVO WRITER
        BNZ     SW21                SKIP OUT IF SO
        RS   PY TSBQ                SEE IF SBCA QUEUE ELEMENTS AVAIL
        BZ      DR04                SKIP BACK TO DRVR IF NONE
        RS   PY SWQ                 SEE IF CARTS IN SERVO WRITER
        BZ      SW16                ERROR IF NONE
        WS   PZ SWACT               SET SERVO WRITER INACTIVE
        WS   1C SRV150              ALLOW 'EMPTY' MESSAGE
        STX  AND SWDO,X'7FFF'       DROP GO BIT
        WS   TC SWPAUS              SET PAUSE IND
        LRI     R1,SWQ              POINT TO SERVO WRITER QUEUE
        BAL     DEQUE               GET A QUEUE ELEMENT
        LRI     R28,4               SET INTERVENTION REQUIRED REJECT CODE
        TRBZ AND SWDI,X'08',*+2     SEE IF ALSO RETRY
        STX  ADD R28,1              SET IT
        TLBZ AND SWDI,X'20',*+2     TIMED THREAD ALSO?
        STX  ADD R28,2              SET IT
        WSR  PY R28,REJCDE          SET REJECT CODE
        WS   PY SRV110+9            SAVE REJECT CODE
        LRI     R28,SWYLD           POINT TO SERVO WRITER YIELD TABLE
        BAL     YLDB                REPORT BAD CART
        MDX  XI R27,R2              GET ADDRESS OF SERIAL NUMBER
        LRI     R28,SW17+10         POINT TO MESSAGE AREA
        MDX  PX R1,R2               POINT TO CART QUEUE
        LRI     R2,CLPOOL           POINT TO FREE CART QUEUE
        BAL     ENQUE               RETURN QUEUE ELEMENT TO FREE QUEUE
        BAL     SRCVRT              CONVERT SERIAL NUMBER INTO MESSAGE
SW22    EQU     *
        WS   TC SW33                SET 'INT REQ' IND
```

TITLE     SERVO WRITER CONTROL

```
              LRI       R1,SWERR1            POINT TO MESSAGE
              BAL       PSTMSG               POST MESSAGE
              LRI       R1,SW17              POINT TO MESSAGE
SW20   EQU              *
              BAL       PSTMSG               POST MESSAGE
              LRI       R1,SW18              POINT TO 'STOPPED' MESSAGE
              BAL       PSTMSG               POST MESSAGE
              B         DR04                 RETURN TO DRVR
SW15   EQU              *
              RS    PY  MESREQ               SEE IF MES REQUEST ACTIVE
              BNZ       DR04                 SKIP OUT IF SO
              RSR   PY  R7,MESOU             GET X-Y ADDRESS OF MES OUTPUT
              LRI       R5,MESDUM            POINT TO DUMMY QUEUE
              LRI       R1,SWQ               POINT TO SERVO WRITER QUEUE
              WS    PY  TOSW+1               CANCEL TIMER
              BAL       DEQUE                REMOVE QUEUE ELEMENT
              WSR   PY  R2,SWMES             POST MOVE REQUEST
              LRI       R4,SWMES             POINT TO MOVE PENDING FLAG
              WS    PZ  CALCO1+9             REMOVE CAL CART IND
              RS    PY  CT20+1               SEE IF MESSAGE PENDING
              BNZ       SW05                 SKIP IF SO
              WS    TC  CT20+1               POST PENDING
              LRI       R1,CT20              POINT TO MESSAGE
              LRI       R2,CRTQ              POINT TO CRT QUEUE
              BAL       ENQUE                POST MESSAGE
              B         SW05                 COMPLETE MOVE REQUEST
SW16   EQU              *
              RS    PY  HSSW                 SEE IF HOT STAMP-SERVO WRTR MOVE PENDING
              BNZ       DR04                 WAIT FOR IT TO COMPLETE
              RS    PY  XYSW                 SEE IF CELL-SERVO WRTR MOVE PENDING
              BNZ       DR04                 ALLOW COMPLETION
              WS    PZ  SWACT                SET SERVO WRITER INACTIVE
              STX   AND SWDO,X'7FFF'         DROP GO BIT
              WS    TC  SWPAUS               SET PAUSE IND
              LRI       R1,SW19              POINT TO MESSAGE
              B         SW20                 COMPLETE MESSGAGE REQUEST
SW21   EQU              *
              RS    PY  SWQ                  SEE IF CART IN QUEUE
              BZ        DR04                 SKIP OUT IF NOT
              LRI       R1,SWQ               POINT TO SERVO WRITER QUEUE
              BAL       DEQUE                REMOVE QUEUE ELEMENT
              WS    PZ  CALCO1+9             CLEAR CAL CART FROM DEVICE
              LRI       R1,SW17+10           POINT TO MESSAGE AREA
              WSMI  PY  (R1),C'CA'           SAY
              WSMI  PY  (R1),C'L '           CAL
              WSMI  PY  (R1),C'CA'           CART
              WSM   PY  (R1),C'RT'
              WS    PZ  SWACT                SET SERVO WRITER INACTIVE
              B         SW22                 GO PROCESS MESSAGES
SW17   DC               0                    CHAIN WORD
       DC               0                    PENDING FALG
       DC               20                   WORD COUNT
       DC               C'REMOVE SERIAL NNNNNNNN FROM SERVO WRITER'
SW19   DC               0                    CHAIN WORD
       DC               0                    PENDING FLAG
       DC               20                   WORD COUNT
       DC               C'INT REQ ON SERVO WRTR,BUT NO CARTS IN SW'
SWERR1 DC               0                    CHAIN WORD
       DC               0                    PENDING FLAG
       DC               19                   WORD COUNT
       DC               C'INTERVENTION REQUIRED ON SERVO WRITER'
SW18   DC               0                    CHAIN WORD
       DC               0                    PENDING FLAG
       DC               11                   WORD COUNT
       DC               C'SERVO WRITER STOPPED.'
SW10   DC               0
       DC               0
       DC               19
       DC               C'SERVO/ID LOW LEVEL REJ ON SERVO WRTR.'
SWVFR  DC               100                  SERVO WRITER VISUALCHECK FREQUENCY
SWVIS  DC               0                    VISUAL CHECK COUNT
SW28   DC               0
       DC               0
       DC               20
```

TITLE    SERVO WRITER CONTROL

```
         DC      C'SW VISUAL CHECK TO MANUAL EXIT STATION.'
SW32     DC      0
         DC      0
         DC      12
         DC      C'SERVO WRITER NOT ONLINE.'
SW33     DC      0                              INT REQ IND
```

Cartridge tester service, CT, processes cartridges into the out of the cartridge tester, TU's.

Control is received from driver loop DR if the driver loop DR and the testers are active. (START and START C). Checks are made first for the input ports then for the output ports. For the input ports:

1. Move queue elements available; if none are available, return to driver.
2. Cartridges waiting to test; if not, try output ports.
3. All testers paused (PAUS C), try output ports.
4. All tester input ports are checked for availability.
5. The pause and active indicator is checked for all testers.
6. All testers are checked for a move pending to the input port.
7. A check is made for cartridge present at input.
8. If steps 4 through 7 are satisfied for tester, it is marked available.
9. A cartridge is dequeued and the cell address is taken from the queue for the nearest available tester.
10. Considering only the X value, the nearest available tester is found.
11. A move is requested from the cell to the tester input port and posted pending.
12. If more move queue elements are available, control is passed to the output port service, otherwise control is returned to the driver loop DR.

For the output ports:

1. The output port sensor register is tested and if no cartridges are present, all tester timers are started and control is returned to the driver loop DR.
2. Each output port is tested for a cartridge. If none, the tester is skipped.
3. If a cartridge is present, the following is done:
   A. Timer is held
   B. Move pending tests are made, if any pending, tester is skipped.
   C. If tester is not active, it is skipped.
   D. If calibration cartridge, then it is sent to manual exit station (MES) (not shown).
   E. If cartridge is a reject, then retest is performed by placing cartridge back in servo writer 12 queue if eligible for retest.
   F. If cartridge is good and a visual check is pending, then cartridge is sent to the manual exit station.
   G. Good and bad cartridges are reported to the yield/throughput collection routine.
   H. Good cartridges go to packaging queue if not visual checked. Bad cartridges go to reject port or reject queue if not retested.
4. After a move is requested, a check is made for more available move queue elements. If none are available, the next tester is considered. Control is returned to the driver loop when all testers have been tried. If no move queue elements are available, then control is returned to the driver DR.

The above listed functions are described in machine instruction level source microcode in the tables below.

TITLE    CARTRIDGE TESTER CONTROL

```
*                                       CTI -BIT 0-7 CT0-7 INPUT
*                                       CTO -BIT 0-7 CT0-7 OUTPUT
*
         CTI     EQU     R44            C/T INPUT PORT REGISTER
         CTO     EQU     R55            C/T OUTPUT PORT REGISTER
         CTNUM   EQU     8              NUMBER OF CART TESTERS
         CT00    EQU     *
*
*                                       MAIN STORE FOR CART TESTERS
*
         CT02    DC      0              QUEUE ELEMENT ADDRESS
         CTOPU   DC      *              C/TO PAUS FLAG
                 DC      *              1
                 DC      *              2
                 DC      *              3
                 DC      *              4
                 DC      *              5
                 DC      *              6
                 DC      *              7
         CT07    DC      0              CT0 AVAILABLE
                 DC      0
                 DC      0
                 DC      0
                 DC      0
                 DC      0
                 DC      0
                 DC      0              CT7 AVAILABLE
```

TITLE    CARTRIDGE TESTER CONTROL

```
CTOACT  DC              0                       CTO ACTIVE FLAG
        DC              0                       1
        DC              0                       2
        DC              0                       3
        DC              0                       4
        DC              0                       5
        DC              0                       6
        DC              0                       7
*
********************************************************************
*                                        SERVICE INPUT PORTS        *
********************************************************************
        RS      PY      MVEFP                   SEE IF MOVE QUEUE ELE'S AVAIL
        BZ              DR01                    RETURN TO DRIVER IF NOT
        RS      PY      B4CTQ                   SEE IF CART'S IN QUEUE
        BZ              CT11                    TRY OUT PORT IF NOT
        RS      PY      CTPAUS                  SEE IF ALL PAUSED
        BNZ             CT11                    TRY OUT PORT IF YES
        MDX     PX      R8,CTI                  GET INPUT PORT IND
        LRI             R11,0                   ZERO AVAIL COUNT
        MDX     PZ      R9                      ZERO TO R9
        LRI             R14,CTOQ                POINT TO TESTER QUEUES
CT05    EQU             *
        WS      PZ      CT07(R9)                SET NOT AVAILABLE
        TRBZ    AND     R8,X'80',CT06           SEE IF PORT AVAIL
        RS      PY      XYCT(R9)                SEE IF MOVE PENDING
        BNZ             CT06                    MOVE PENDING-FORGET IT
        RS      PY      CTOPU(R9)               CHECK PAUSE INDICATOR
        BNZ             CT06                    FORGET IT IF PAUSED
        RS      PY      (R14)                   SEE IF CART ALREADY IN TESTER INPUT
        BNZ             CT06                    SKIP IF SO
        RS      PY      CTOACT(R9)              SEE IF ACTIVE
        BZ              CT06                    SKIP IF NOT
        B               CT69                    ROOM FOR PATCH $$$$$$$$$$$$$$$$$$$$$$$
        RS      PY      CHTEST(R9)              SEE IF CART IN TEST ----------------
*                                               CODE TO DEFEAT QUEUEING OF CARTS |
        BNZ             CT06                    SKIP IF CART IN TEST ------------
CT69    EQU             *
        LDX     PX      R9                      TESTER NUMBER INTO 'X'
        RS      EOR     QUAL02                  SEE IF THIS IS QUALITY TESTER
        BZ              CT06                    SKIP IF SO
        WS      TC      CT07(R9)                ALL OK-MARK AVAILABLE
        IR              R11                     COUNT IT
CT06    EQU             *
        STX     ADD     R14,3                   POINT TO NEXT TESTER QUEUE
        MDX     PX      R8,R8,SLL1              SHIFT TO NEXT C/T
        MDX     XI      R9                      COUNT
        TLBNZ   EOR     R9,CTNUM,CT05           LOOP FOR ALL TESTERS
        LDX     PX      R11                     TEST COUNT OF AVAIL C/T'S
        BZ              CT11                    TRY OUT PORT IF NONE AVAIL
        LRI             R1,B4CTQ                POINT TO QUEUE
        BAL             DEQUE                   GET A QUEUE ELEMENT
        WSR     PY      R2,CT02                 SAVE QUEUE ELE ADD
        RS      PY      3(R2)                   GET CELL LOCATION
        MDX     PY      R8                      PUT IN R8
        STX     AND     R8,X'00FF'              MASK ALL BUT 'X' VALUE
        STX     SUB     R8,150                  SUB 150 CELLS (ZERO REFERENCE)
        MDX     PX      R8,R8,SRL4              DIVIDE BY 16
        RS      PY      CTNN(R8)                GET ADDRESS OF NEAREST TESTER TABLE
        MDX     PY      R8                      PUT IN REG 8
        LRI             R9,CTNUM                LOAD NUMBER OF C/T'S
CT10    RSR     PY      R10,(R8)                GET C/T ADDRESS
        RS      PY      CT07(R10)               SEE IF AVAILABLE
        BNZ             CT09                    YES-QUIT LOOKING
        IR              R8                      TRY NEXT NEAREST
        DR              R9                      COUNT
        BNZ             CT10                    LOOP
CT09    EQU             *
*                                               R10 NOW CONTAINS ADD OF NEAREST
*                                               AVAILABLE CART TESTER
        RSR     PY      R2,CT02                 GET SAVED QUEUE ADD
        WS      PY      XYCT(R10)               PUT REQ IN MOVE TABL
```

TITLE      CARTRIDGE TESTER CONTROL

```
           RS     PY    CTMSK(R10)         GET INPUT PORT LATCH MASK
           MDX    AND   CTI,CTI            TURN OFF INPUT PORT LATCH FOR C/T
           MDI    PX    R4,R10             R10 INTO R4
           STX    ADD   R4,XYCT            COMPUTE ADD OF ADD OF QUEUE ELE
           MDX    PX    R5,R10,SLL1        R5=R10*2
           MDXD   ADD   R5,R10             R5=2*R10+R10=3*R10
           STX    ADD   R5,CTOQ            COMPUTE ADD OF DEST QUEUE
           RS     PY    3(R2)              GET FROM X-Y
           MDX    PY    R6                 PUT IN R6
           RS     PY    CTOI(R10)          GET TO X-Y ADDRESS
           MDX    PY    R7                 PUT IN R7
           BAL          MOVEIT             SET UP MOVE REQ
CT12       B            DR01               RETURN TO DRIVER IF NO QUEUE ELE AV
           B            CT11               PROCESS OUTPUTS
           PAGE
***************************************************************
*                          SERVICE OUTPUT PORTS                *
***************************************************************
CT17       EQU          *
           LRI          R9,TOCTO+1         POINT TO TIME OUT CONTROL
           MDX    TC    R8                 -1 TO R8
CT18       EQU          *
           MDX    XI    R8                 COUNT
           RS     PY    (R9)               SEE IF CANCEL OUTSTANDING
           BP           CT61               SKIP IF SO
           WS     PZ    (R9)               ALLOW TIMING
CT61       EQU          *
           STX    ADD   R9,7               NEXT TESTER
           TLBNZ  EOR   R8,7,CT18          LOOP FOR ALL TESTERS
           B            DR01               RETURN TO DRIVER
CT11       EQU          *
           THBZ   OR    CTO,0,CT17         RETURN IF NO CARTS AT OUT PORT
           MDX    PX    R10,CTO            GET OUT PORT BITS
           LRI          R9,CTOUT           POINT TO OUT PORT ARRAY
           LRI          R4,CTXY            POINT TO MOVE REQ ARRAY
           MDX    TC    R8                 -1 TO R8
           LRI          R28,CTOYLD         POINT TO FIRST YLD TABLE
           LRI          R23,QUTBLE         POINT TO QUALITY TABLE
           LRI          R11,TOCTO+1        POINT TO TIME OUT CONTROL
CT13       EQU          *
           IX           R8                 NEXT
           THBZ   AND   R10,X'80',CT14     TEST IF THIS CT OUT HAS CART
           WS     TC    (R11)              HOLD TIMER
           RS     PY    (R4)               SEE IF MOVE REQUESTED
           BNZ          CT14               FORGET IF SO
           RS     PY    CTRJ(R8)           SEE IF MOVE REQUESTED TO REJECT PORT
           BNZ          CT14               FORGET IF SO
           RS     PY    (R9)               SEE IF CART LOGICALLY THERE
           BZ           CT14               FORGET IT IF NOT
           RS     PY    CTOACT(R8)         SEE IF TESTER ACTIVE
           BZ           CT14               SKIP IF NOT
           RS     PY    CALCO1(R8)         SEE IF IN CALIBRATE
           BNZ          CT19               YES-HANDLE SPECIAL
           RS     PY    (R9)               NO-GET DATA BACK
           BN           CT15               IF SIGN BIT SET THEN REJECT
           RS     PY    QUAL17             SEE IF QUALITY PAUSED
           BNZ          CT59               SKIP IF SO
           RS     PY    QUAL02             SEE IF QUALITY TESTER SET
           BN           CT59               SKIP IF NOT
           RS     PY    2(R23)             SEE IF IN CONSEC. MODE
           BZ           CT60               SKIP IF NOT
           LDY    PX    R1,5               5 IN X
           RS     EOR   (R23)              SEE IF FIVE SENT
           BZ           CT59               SKIP IF SO
           WS     XI    (R23)              COUNT THIS ONE
           B            CT56               GO DOIT
CT60       EQU          *
           RSE    PY    R14,(R23)          GET COUNT SINCE LAST
           LDX    PX    R14                PUT IN 'X'
           RS     EOR   QUAL10             SEE IF CHECK DUE
           BZ           CT56               YES-DOIT
           WS     XI    (R23)              INCREMENT AND SAVE COUNT
```

TITLE    CARTRIDGE TESTER CONTROL

```
CT59    EQU     *
        RS    PY  VISU06+6         SEE IF VISUAL CHECK DUE
        BZ        CT50             NO-SKIP
        RS    PY  VISU06+7         SEE IF 'FORCE CHECK' ON
        BNZ       CT65             SKIP IF SO
        LDX   PY  R8               TESTER NUMBER INTO 'X'
        RS    EOR VISU06+5         SEE IF FOR THIS TESTER
        BNZ       CT50             NO-SKIP OUT
CT65    EQU     *
        RS    PY  MESREQ           SEE IF CART OUT OF SYSTEM
        BNZ       CT51             YES-GO COMPLAIN
        WS    PZ  CT52             CLEAR COMPLAINED FLAG
        RS    PY  (R9)             GET QUEUE ELEMENT POINTER
        WS    PY  MESREQ           POST REQUEST
        WS    PY  (R4)             POST MOVE ACTIVE
        MDX   PY  R2               PUT POINTER IN R2
        LDX   PX  R1,B4PKQ         POINT TO B4 PACKING QUEUE
        WS    PY  MESREQ+1         SET
        WS    TC  SAVE34           ALLOW SAVE
        BAL       YLDG             REPORT GOOD CART
        MDX   PX  R17,R4           SAVE R4
        MDX   XI  R27,R2           POINT TO SERIAL NUMBER
        WS    TC  VISU23           POST VISUAL CHECK PENDING
        WS    PZ  VISU06+6         CLEAR DONE IND
        WS    PZ  VISU06+7         CLEAR 'FORCE CHECK'
        B         CT68             SKIP SERIAL NUMBER IN MESSAGE
        WSR   PY  R28,CT66         SAVE R28
        LRI       R28,CT53+17      POINT TO MESSAGE
        BAL       SECVRT           CONVERT
        RSR   PY  R28,CT66         RESTORE R28
CT68    EQU     *
        RS    PY  CT53+1           SEE IF PENDING
        BNZ       CT54             YES-SKIP
        LRI       R1,CT53          POINT TO MESSAGE
        LRI       R2,CRTQ          POINT TO CRT QUEUE
        BAL       ENQUE            POST REQUEST
        WS    TC  CT53+1           POST PENDING
        MDXS  PX  R14,R8           SWAP TESTER NUMBER
        STX   OR  R14,X'F040'      STIK IN ZONE AND BLANK
        WSR   PY  R14,CT53+4       PUT IN MESSAGE
CT54    EQU     *
        MDX   PX  R4,R17           RESTORE R4
        LRI       R5,MESQ          POINT TO DESTINATION QUEUE
        RSR   PY  R7,MESOU         X-Y ADDRESS OF MES EXIT
        B         CT16             GO COMPLETE MOVE REQUEST
CT51    EQU     *
        RS    PY  CT52             SEE IF ALREADY COMPLAINED
        BNZ       CT14             YES-SKIP OUT
        RS    PY  HSERR2+1         SEE IF MESSAGE PENDING
        BNZ       CT14             YES-SKIP OUT
        WS    TC  CT52             POST COMPLAINED
        WS    TC  HSERR2+1         SET MESSAGE PENDING
        LRI       R1,HSERR2        POINT TO MESSAGE
        LRI       R2,CRTQ          POINT TO CRT QUEUE
        BAL       ENQUE            POST REQUEST
        B         CT14             CONTINUE
CT50    EQU     *
CT66    DC      0                  SAVE REG AREA
CT52    DC      0                  COMPLAINED FLAG
CT53    DC      0                  CHAIN WORD
        DC      0                  PENDING FLAG
        DC      20                 WORD COUNT
        DC      C'CTX VISUAL CHECK TO MANUAL EXIT STATION.'
        RS    PY  (R9)             GET POINTER BACK
        WS    PY  (R4)             SAVE IN MOVE REQ ARRAY
        MDX   PY  R2               PUT INTO R2
        BAL       YLDG             REPORT GOOD
        RS    PY  3(R2)            GET X-Y CELL LOCATION
        MDX   PY  R7               PUT IN R7 (TO)
        WS    TC  SAVE34           MARK PACK QUEUE CHANGED
        LRI       R5,B4PKQ         POINT TO PACKAGING QUEUE
```

TITLE    CARTRIDGE TESTER CONTROL

```
CT16      RS      PY    CT00(R8)           GET CT OUT PORT X-Y
          MDX     PY    R6                 PUT IN R6 (PROM)
          WS      PZ    (P9)               CLEAR CRTOUT
          WSR     PY    R11,(R11)          CANCEL TIMER
          BAL           MOVEIT             GO POST MOVE REQ
          B             DR01               RETURN TO DRVR IF NO MOVE QUEUE ELE
CT14      EQU           *
          STX     ADD   R23,3              NEXT QUALITY POINTER
          STX     ADD   R11,7              POINT TO NEXT TESTER
          STX     ADD   R28,7              POINT TO NEXT TESTER YIELD TABLE
          IR            R9                 NEXT
          IR            R4                 NEXT
          MDX     PX    R10,R10,SLL1       CONSIDER NEXT OUT PORT
          TLBNZ   EOR   R8,CTNUM-1,CT13    TEST IF DONE
          B             DR01               RETURN TO DRVR
CT15      EQU           *                  REJECT CART
          MDX     PY    R2                 PUT ADD IN R2
          STX     AND   R2,X'7FFF'         KILL SIGN BIT
          BAL           YLDB               REPORT BAD CART
          RS      PY    3(R2)              GET 'TO' ADDRESS
          MDX     PY    R7                 PUT IN R7
          RS      PY    RTST13             RETEST ACTIVE?
          BZ            CT55               NO-SKIP
          RS      PY    1(R2)              GET SERIAL HIGH ORDER
          MDX     PY    R27                SAVE IN R27
          BNN           CT55               SKIP IF RETEST NOT SET
          STX     ADD   R27,X'1000'        INCREMENT RETEST COUNT
          STX     AND   R27,Y'7FFF'        REMOVE RETEST OK BIT
          WS      AND   1(R2)              SAVE BACK
          STX     AND   R27,X'7000'        ISOLATE RETEST COUNT
          MDXS    PX    R27,R27,SRL4       PUT IN LOW DIGIT
          LDX     PX    R27                PUT IN 'X'
          RS      SUB   RTST24             SEE IF MORE RETEST TO DO
          BP            CT55               NO-REJECT FROM SYSTEM
          LRI           R5,B4SWQ           PUT BACK IN SERVO WRITER QUEUE
          RS      PY    RTST38             SEE IF SERVO WRITER BYPASSED IN RETEST
          BZ            *+2                SKIP IF NOT
          LRI           R5,B4CTQ           POINT TO TESTER QUEUE
          RS      PY    SYSEVN             SEE IF EVEN SYSTEM NUMBER
          BZ            *+2                SKIP IF NOT
          LRI           R5,B4CTQ           PUT BACK IN CART TEST QUEUE IF EVEN SYSTEM
          WSR     PY    R2,(R4)            POST MOVE PENDING
          B             CT16               FINISH
CT55      EQU           *
          RS      PY    RJACT              SEE IF REJECT ACTIVE
          BZ            CT67               SKIP IF NOT
          LDX     PX    R2                 REG 2 INTO 'X'
          WS      PX    CTRJ(R8)           SAVE MOVE REQUEST TO REJECT PORT
          MDX     XD    R22                COUNT THIS CART TO REJECT
          WSR     PY    R4,CT66            SAVE R4
          MDX     PX    R4,R8              LOAD TESTER NUMBER
          STX     ADD   R4,CTRJ            COMPUTE ADDRESS OF MOVE REQUEST
          LRI           R5,CLPOOL          RETURN CELL TO FREE POOL
          WS      IC    REJAV              MARK REJECT PORT IN USE
          RS      PY    CT00(R8)           LOAD XY ADDRESS OF CT OUT PORT
          MDX     PY    R6                 INTO R6
          WS      PZ    (R9)               REMOVE CART FROM OUTPUT
          WSR     PY    R11,(R11)          CANCEL TIMER
          RSR     PY    R7,REJ1            LOAD XY ADDRESS OF REJECT PORT
          BAL           MOVEIT             POST MOVE REQUEST
          B             DR01               RETURN TO DRIVER IF NO MOVE QUEUE ELE
          RSR     PY    R4,CT66            RESTORE R4
          B             CT14               CONTINUE
CT67      EQU           *
          WSR     PY    R2,(R4)            POST MOVE ACTIVE
          LRI           R5,RRJQ            CART TO REJECT QUEUE
          B             CT16               GO FINISH MOVE REQ
CT19      EQU           *
          RS      PY    CALC0(R8)          SEE IF A CALC AUTO QUE ADDR
          BNZ           CT70               EXISTS. YES,GO DO IT
          RS      PY    MESREQ             SEE IF CART OUT OF SYSTEM
          BNZ           CT62               FORGET THIS IF SO
          WS      PZ    CT63               ALLOW MESSAGE IF NEEDED
```

TITLE          CARTRIDGE TESTER CONTROL

```
          RSR    PY    R7,MESOU           ADDRESS OF MES EXIT
          LRI          R5,MESDUM          POINT TO DUMMY QUEUE
          LDY    PX    R1,X'7FFF'         LOAD MASK FOR SIGN BIT
          RS     PY    (R9)               GET QUEUE ELE ADDRESS
          WS     AND   (R4)               POST MOVE REQUEST-REMOVE SIGN
          WS     PZ    CALC01(R8)         CLEAR CAL CART IND
          RS     PY    CT20+1             SEE IF MESSAGE PENDING
          BNZ          CT16               FORGET IF SO
          WS     TC    CT20+1             POST PENDING
          LRI          R1,CT20            POINT TO MESSAGE
          LRI          R2,CRTQ            POINT TO CRT QUEUE
          BAL          ENQUE              POST REQUEST
          B            CT16               FINISH MOVE REQUEST
CT56      EQU          *
          LDX    PX    R8                 TESTER NUMBER INTO 'X'
          RS     EOR   QUAL02             SEE IF QUALITY TESTER
          BZ           CT59               SKIP IF SO
          RS     PY    QUALFQ             SEE IF FREE QUEUE ELEMENTS AVAIL
          BZ           CT57               BAD NEWS IF NOT
          BAL          YLDG               REPORT THIS GOOD CART
          WS     PZ    (R23)              CLEAR SINCE LAST QUAL CHECK
          LRI          R1,QUALFQ          POINT TO FREE QUEUE
          BAL          DEQUE              GET A QUEUE ELEMENT
          MDX    XI    R14,R2             INCREMENT AND SAVE POINTER
          RS     PY    (R9)               GET CART QUEUE POINTER
          MDX    PY    R17                INTO R17
          WS     PY    (R4)               POST MOVE REQUEST
          WSI    PY    (R14)              PUT IN QUAL QUEUE ELEMENT
          WSRI   PY    R8,(R14)           TESTER NUMBER INTO ELEMENT
          MDX    PX    R12,R8,SLL3        TESTER NUMBER*8
          MDX    PX    R13,R8,SLL2        *4
          MDXD   ADD   R12,R13            *12
          MDX    PX    R13,R8,SLL1        *2
          MDXD   ADD   R12,R13            TESTER NUMBER * 14
          RS     PY    CHSCT0+10(R12)     GET FIRST MODE WORD
          WSI    PY    (R14)              PUT IN QUAL QUEUE ELEMENT
          RS     PY    CHSCT0+11(R12)     GET SECOND MODE WORD
          WS     PY    (R14)              PUT IN QUEUE ELEMENT
          MDX    PX    R1,R2              POINT TO ELEMENT
          LRI          R2,QUALQ           POINT TO QUALITY QUE
          BAL          ENQUE              POST REQUEST
          WSR    PY    R17,(R4)           POST MOVE PENDING
          RS     PY    3(R17)             GET CELL X-Y
          MDX    PY    R7                 INTO R7
          LRI          R5,B4QULQ          POINT TO B4 QUALITY QUEUE
          B            CT16               COMPLETE MOVE REQUEST
CT57      EQU          *
          RS     PY    CT58+1             SEE IF MESSAGE PENDING
          BNZ          CT59               SKIP IF SO
          WS     TC    CT58+1             POST PENDING
          LRI          R1,CT58            POINT TO MESSAGE
          LRI          R2,CRTQ            POINT TO CRT QUEUE
          BAL          ENQUE              POST MESSAGE
          B            CT59               RESUME
CT62      EQU          *
          RS     PY    CT63               SEE IF MESSAGE POSTED ALREADY
          BNZ          CT14               SKIP IF SO
          RS     PY    CT64+1             SEE IF MESSAGE PENDING
          BNZ          CT14               SKIP IF SO
          WS     TC    CT63               SAY POSTED
          WS     TC    CT64+1             SET PENDING
          LRI          R1,CT64            POINT TO MESSAGE
          LRI          R2,CRTQ            CRT QUEUE
          BAL          ENQUE              POST MESSAGE
          B            CT14               BACK TO IT
CT70      MDX    PY    R5                 SAVE THE INTO ADDR FOR A MOVE
          RS     PY    (R9)               GET THE QUEUE ELEM. ADDR.
          MDX    PY    R2                 PLACE INTO WORK REG R2
          STY    AND   R2,X'7FFF'         MASK OFF SIGN BIT
          RS     PY    3(R2)              EXTRACT THE TO ADDRESS.
          MDX    PY    R7                 PUT INTO R7 FOR THE MOVE
          WSR    PY    R2,(R4)            POST MOVE PENDING
```

TITLE    CARTRIDGE TESTER CONTROL

```
        WS     PZ     CALCO(R8)              RESET THE QUEUE VALUE
        WS     PZ     CALCO1(R8)             CLEAR CAL CART INDIC
        B             CT16                   GO COMPLETE THE MOVE
CT63    DC            0                      POSTED FLAG
CT64    DC            0                      CHAIN WORD
        DC            0                      PENDING FLAG
        DC            20                     WORD COUNT
        DC            C'SYSTEM WAITING FOR CARTRIDGE TO BE INPUT.'
CT58    DC            0                      CHAIN WORD
        DC            0                      PENDING FLAG
        DC            13                     WORD COUNT
        DC            C'QUALITY TESTER QUEUE FULL.'
CTMSK   DC            X'7FFF'                LATCH RESET MASK FOR C/T-0
        DC            X'BFFF'                                       1
        DC            X'DFFF'                                       2
        DC            X'EFFF'                                       3
        DC            X'F7FF'                                       4
        DC            X'FBFF'                                       5
        DC            X'FDFF'                                       6
        DC            X'FEFF'                                       7
CT20    DC            0                      CHAIN WORD
        DC            0                      PENDING FLAG
        DC            10                     WORD COUNT
        DC            C'CAL CARTRIDGE TO MES'
```

Retest, RTST, CT, CHS, provides retest functions for the cartridge testers, TU's.

Control is received from the console service for the RETEST command. The command allows the operator to enable/disable retest, specify retest count, specify reject codes, and control reservo writing. The command processor builds a table of reject codes and sets indicators and retest count. When the 3830 Channel Service (CHS) reads the summary data, if retest is active, the reject code is tested for retest. If eligible, the high order bit is set in the serial number. The cartridge testers service (CT) tests the retest bit and if set, increments the retest count which is carried in the next three bits of the serial number. If more retests are required, then the cartridge is moved to a storage cell in unit 10 and placed in the servo writer 12 queue or tester TU queue according to the reservo indicator.

Packaging service, PK, processes cartridges from unit 10 via conveyor 15 to the packaging system (not shown).

Control is received from the driver loop DR after packaging is started (START P). The on-line indicator (not shown) is checked, and if not present, a message is issued and the packaging system stopped. When operating in a normal mode (START P), even counts of 10 are processed. Checks are made of the output port sensors (not shown), if neither is available, control is returned to the driver DR. If a port is available, then a cartridge is dequeued from the packaging queue. The X address is checked and a move is posted to the nearest port available. The cartridge queue element is returned to the free queue.

The machine instruction level source microcode is shown below.

TITLE    PACKAGING SERVICE

```
*                                           PACKAGING OUTPUT PORT1,X=LOW
*                                           PACKAGING OUTPUT PORT2,X=HIGH
*
*                                           OUTPUT SYSTEM D/I REGISTER
*                                           BIT-8-ON LINE
*                                               9-PKG PORT 1 CHUTE FULL
*                                               10-PKG PORT 2 CHUTE FULL
*                                               11-PKG PORT1/2 CHUTE FULL
*                                               12-CONV TO PKG MACH FULL
*                                               13-A4 OUTPUT PORT NOT AVAILABLE
*                                               14-INTERVENTION REQUIRED
*                                           PACKAGING D/O REGISTER
*                                           BIT-4-GO
*
*                                           CONVEYOR OUT D/O REGISTER
*                                           BIT-0-GO/STOP
*
        PKDI   EQU    R52                   OUTPUT SYSTEM D/I REGISTER
        PKDO   EQU    R38                   OUTPUT SYSTEM D/O REGISTER
        CODO   EQU    R36                   CONVEYOR OUT D/O REGISTER
        PK00   EQU    *
               TLBZ   AND  PKDI,X'80',PK25  SET MESSAGE IF NOT ONLINE
               RS     PY   PKPAUS           SEE IF PAUSED
```

TITLE    PACKAGING SERVICE

```
            BNZ        DR11                    RETURN TO DRVR IF SO
            B          *+2                     SKIP PACK FULL CHECK
            TLBNZ  AND PKDI,X'08',PK14         SET MESSAGE IF PACK FULL
            RS     PY  MVEFR                   CHECK IF MOVE QUEUE ELE'S AVAIL
            BZ         DR11                    RETURN TO DRVR IF NOT
            LRI        R9,0                    ZERO IN R9
            TLBNZ  AND PKDI,X'40',PK01         CHECK IF PORT 1 EMPTY
            RS     PY  XYPK1                   YES-CHECK IF MOVE REQUESTED
            BNZ        PK01                    YES-TRY NEXT
            WS     TC  PK1AV                   MARK AVAILABLE
            IR         R9                      COUNT IT
PK01        EQU        *
            TLBNZ  AND PKDI,X'20',PK06         CHECK IF PORT 2 EMPTY
            RS     PY  XYPK2                   YES-CHECK IF MOVE REQUESTED
            BNZ        PK06                    BR IF NOT
            WS     TC  PK2AV                   MARK AVAIL
            IR         R9                      COUNT
PK06        EQU        *
            LDX    PX  R9                      TEST COUNT
            BZ         DR11                    RETURN IF NONE AVAIL
            RS     PY  PK20                    SEE IF ODD IND SET
            BNZ        PK02                    SKIP OUT IF SO
            RS     PY  PKFST                   CHECK FIRST
            BZ         PK02                    NOT FIRST
PK11        EQU        *
            RSR    PY  R8,B4PKQ                GET NUMBER IN PACK QUEUE
            STX    SUB R8,10                   SUBTRACT 10
            BN         PK03                    BR IF NOT 10 REMAINING
            WS     PZ  PKFST                   SET NOT FIRST
PK02        EQU        *
            TLBZ   OR  R9,0,PK16               QUIT IF NO PORTS AVAILABLE
            RS     PY  B4PKO                   SEE IF CARTS IN PACK QUEUE
            BZ         PK03                    QUIT IF NOT
            LRI        R1,B4PKO                POINT TO PACK QUEUE
            BAL        DEQUE                   GET QUEUE ELE
            WSR    PY  R2,PK05                 SAVE ELE ADD
            RS     PY  3(R2)                   GET CELL X-Y ADD
            MDX    PY  R8                      PUT IN R8
            STX    AND R8,X'00FF'              MASK ALL BUT X ADD
            STX    SUB R8,199                  SEE WHICH END OF LIBRARY
            BP         PK07                    UPPER-TRY PK2 FIRST
            RS     PY  PK1AV                   SEE IF PK1 AVAIL
            BZ         PK07                    NO USE PK2
PK13        EQU        *
            DR         R9                      COUNT THIS
            WS     PZ  PK1AV                   MARK NOT AVAIL
            WSR    PY  R2,PK05                 GET SAVED ADD
            WS     PY  XYPK1                   MARK MOVE REQUESTED
            LRI        R4,XYPK1                ADD OF ADD OFELE
            RSR    PY  R7,PK1                  GET X-Y ADD OF PORT 1
PK08        EQU        *
            LRI        R5,PKPRTO               PUT CART IN PACK PRINT QUEUE
            LRI        R5,CLPOOL               POINT TO FREE POOL
            RS     PY  3(R2)                   GET FROM X-Y ADD
            MDX    PY  R6                      PUT IN R6
            BAL        MOVEIT                  POST MOVE REQ
            NOP                                AVOID SKIP
PK19        EQU        *
            RS     PY  PK20                    SEE IF IN 'ODD' MODE
            BNZ        PK24                    SKIP IF SO
            RSR    PY  R8,PK09                 GET 10 COUNT
            DR         R8                      COUNT THIS MOVE
            BNZ        PK10                    BR IF MORE
            LRI        R8,10                   GET 10
            WSR    PY  R8,PK09                 PUT 10 BACK
            B          PK11                    SEE IF 10 MORE TO PACK
PK10        EQU        *
            WSR    PY  R8,PK09                 PUT BACK COUNT-1
PK24        EQU        *
            LDX    PX  R9                      TEST PORTS AVAILABLE
            BZ         DR11                    RETURN IF NONE
            RS     PY  MVEFR                   SEE IF MOVE QUEUE ELE'S AVAIL
```

TITLE     PACKAGING SERVICE

```
            BZ          DR11                    RETURN TO DRVR IF NONE AVAIL
            B           PK02                    TRY TO POST ANOTHER MOVE
PK07        EQU         *
            RS     PY   PK2AV                   SEE IF PORT 2 AVAIL
            BZ          PK12                    NO-TEST PK1
            DR          R9                      YES-COUNT IT
            WS     PZ   PK2AV                   SET PORT 2 NOT AVAIL
            RSB    PY   R2,PK05                 GET SAVED ADD.
            WSB    PY   R2,XYPK2                POST MOVE REQUEST
            LRI         R4,XYPK2                ADD OF ADD OF CART QUEUE ELE
            RSB    PY   R7,PK2                  X-Y ADD OF PORT 2
            B           PK08                    GO COMPLETE MOVE REQUEST
PK12        EQU         *
            RS     PY   PK1AV                   SEE IF PORT 1 AVAIL
            BZ          DR11                    NO-RETURN TO DRVR
            B           PK13                    MOVE TO PORT 1
PK03        EQU         *
            WS     PZ   PKACT                   SET PACKAGING INACTIVE
            WS     TC   PK23                    SET 'FORCE PACK PRINT'
            WS     TC   PKFST                   RESET FIRST
            RS     PY   PK20                    SEE IF 'ODD' MODE
            BZ          PK21                    SKIP IF NOT
            WS     PZ   PK20                    CLEAR IND
            LRI         R1,PK22                 POINT TO 'EMPTY' MESSAGE
            BAL         PSTMSG                  POST MESSAGE
            B           DR11                    RETURN TO DRIVER
PK21        EQU         *
            RS     PY   PKERR1+1                SEE IF MESSAGE PENDING
            BNZ         DR11                    RETURN IF SO
            WS     TC   PKERR1+1                MARK PENDING
            LRI         R1,PKERR1               POINT TO MESSAGE
PK15        EQU         *
            LRI         R2,CRTQ                 POINT TO CRT QUEUE
            BAL         ENQUE                   POST THIS REQUEST
PK16        EQU         *
            B           DR11                    RERURN TO DRVR
*
PKERR1 DC               0                       CHAIN WORD
       DC               0                       PENDING IND
       DC               20                      COUNT
       DC               C'PACKAGING COMPLETE-LESS THAN 10 IN QUEUE.'
PKFST  DC               *                       FIRST IND
PK23   DC               0                       FORCE PRINT IND
PK05   DC               0                       SAVE QUEUE ELE ADD
PK09   DC               10                      10 AT A TIME COUNTER
PK1AV  DC               0                       AVAILABILITY FLAG-PORT 1
PK2AV  DC               0                       AVAILABILITY FLAG-PORT 2
PK20   DC               0                       'ODD' IND
PK22   DC               0                       CHAIN WORD
       DC               0                       PENDING FLAG
       DC               16                      WORD COUNT
       DC               C'PACKAGING COMPLETE-QUEUE EMPTY.'
PK14        EQU         *
            WS     PZ   PKACT                   SET PACKAGING INACTIVE
            WS     TC   PKPAUS                  SET PAUSE
            RS     PY   PKERR2+1                SEE IF MESS PENDING
            BNZ         DR11                    RETURN TO DRVR IF SO
            LRI         R1,PKERR2
            WS     TC   PKERR2+1                MARK PENDING
            B           PK15                    GO COMPLETE REQUEST
PK25        EQU         *
            LRI         R1,PK27                 POINT TO MESSAGE
            BAL         PSTMSG                  POST
            LRI         R1,PK28                 POINT TO 'STOPPED' MESSAGE
            BAL         PSTMSG                  POST
            WS     PZ   PKACT                   SET INACTIVE
            WS     TC   PKPAUS                  SET PAUSE
            STX    AND  PKDO,X'7FFF'            DROP GO BIT
            STX    AND  CODO,X'7FFF'            DROP GO BIT
            B           DR11                    RETURN TO DRVR
PK17        EQU         *
            WS     PZ   START                   KILL DRIVER LOOP
            WS     PZ   CLPOOL                  ZERO FREE POOL COUNT
```

TITLE    PACKAGING SERVICE

```
          LRI         R1,KB04+6         POINT TO COMMAND LIST
          LRI         R2,NUMCMD-3       SET COUNT
          WSI    PZ   (R1)              KILL COMMAND
          WSI    PZ   (R1)              KILL COMMAND
          MDX    XD   R2                COUNT
          BNZ         *-3               LOOP
          LRI         R1,PK18           POINT TO MESSAGE
          BAL         PSTMSG            POST MESSAGE
          WS     PZ   RJACT             SET REJECT INACTIVE
          B           DR12              RETURN TO DRIVER
  PK18    DC          0                 CHAIN WORD
          DC          0                 PENDING FLAG
          DC          12                WORD COUNT
          DC          C'LIBRARY FLUSH COMPLETE.'
  PKERR2  DC          0                 CHAIN WORD
          DC          0                 PENDING FLAG
          DC          11                WORD COUNT
          DC          C'PACKAGING SYSTEM FULL.'
  PK27    DC          0
          DC          0
          DC          15
          DC          C'PACKAGING SYSTEM NOT ON LINE.'
  PK28    DC          0
          DC          0
          DC          13
          DC          C'PACKAGING SYSTEM STOPPED.'
```

Manual entry service, MES, processes requests from the unit 10 manual entry station 14A (MES).

MES 14A enables removal and reinsertion of cartridges at various manufacturing levels. This feature enables visual checking and off-line listing and evaluation of partially completed cartridges.

Control is received from the driver loop DR. If no device end has been received from the manual entry station 14A, control is returned to the driver loop DR. When a device end is outstanding, if a move is pending, then the request is neglected. If no move is pending, then a move is posted back to a cell if a cartridge is out of the system, or to the manual exit station. An error message is issued in the second case.

Reject service, RJ, processes cartridges to the reject port 14.

Control is received from the driver loop DR if reject is active (START R). If cartridges are in the reject queue and no moves are pending, a move is requested from a cell to the reject port. Control is returned to the driver loop DR. Cartridges are counted and if the count exceeds the capacity of the reject port, a message is issued and the reject service is stopped.

The reject service is detailed at the machine instruction level in the two charts below.

TITLE    REJECT PORT SERVICE

```
  RJ00    EQU         *
          RS     PY   PLUS22            SEE IF 'FLUSH' SET
          BNZ         RJ02              HANDLE IF SO
          LDX    PX   R22               CHECK REJECT COUNT VALUE
          BP          RJ02              IF POSITIVE STILL ROOM
          WS     PZ   RJACT             BUCKET FULL-SET INACTIVE
          WS     TC   REJAV             MARK PORT NOT AVAIL
          RSR    PY   R22,REJCT         START COUNT AGAIN
          RS     PY   RJERR1+1          SEE IF MESS PENDING
          BNZ         DR12              RETURN TO DRVR IDP SO
          WS     TC   RJERR1+1          MARK PENDING
          LRI         R1,RJERR1         POINT TO MESSAGE
          LRI         R2,CRTQ           POINT TO CRT QUEUE
          BAL         ENQUE             POST REQUEST
          B           DR12              RETURN TO DRVR
  RJ02    EQU         *
          RS     PY   HSREJ             SEE IF MVE PEND HS TO REJ
          BNZ         DR12              RETURN IF SO
          RS     PY   SWREJ             SEE IF MVE PEND SW TO REJ
          BNZ         DR12              RETURN ID SO
          RS     PY   XYREJ             SEE IF MOVE PENDING CELL TO REJ
          BNZ         DR12              RETURN IF SO
          WS     PZ   REJAV             NOTHING PENDING-MARK AVAIL
          RS     PY   MVEPR             SEE IF MVE QUEUE ELE AVAIL
          BZ          DR12              RETURN IF NOT
          RSR    PY   R1,REJQ           SEE IF CART IN REJECT QUEUE
```

TITLE    REJECT PORT SERVICE

```
         BNZ          RJ03                SKIP IF CARTS
         RS    PY     PLUS22              SEE IF 'FLUSH' SET
         BNZ          PR17                HANDLE IF SO
         B            DR12                RETURN TO DRIVER
RJ03     EQU          *
         RS    PY     PLUS22              SEE IF 'FLUSH'
         BZ           RJ04                SKIP IF NOT
         LRI          R2,KB03+17          POINT TO INPUT AREA
         BAL          BINE                CONVERT QUEUE COUNT
         LRI          R1,X'0500'+20       LINE 5, 20 WORDS
         LRI          R2,KB03             POINT TO INPUT AREA
         BAL          CRT                 SET COUNT ON SCREEN
RJ04     EQU          *
         DR           R22                 COUNT THIS CART TO RFJ BUCKET
         WS    TC     RFJAV               MARK REJ PORT NOT AVAIL
         LRI          R1,REJQ             POINT TO REJ QUEUE
         BAL          DEQUE               GET QUEUE ELE
         WSB   PY     R2,YTRPJ            POST MOVE REQ
         LRI          R4,XTREJ            ADD OF ADD OF QUEUE ELE
         LRI          R5,CLPOOL           RETURN CELL TO FREE POOL
         RS    PY     3(R2)               GET FROM X-Y ADD
         MDX   PY     R6                  PUT IN R6
         RSE   PY     R7,RFJ1             X-Y ADD OF REJECT PORT
         BAL          MOVEIT              POST MOVE REQ
         NOP                              AVOID SKIP
RJ01     EQU          *
         B            DR12                RETURN TO DRVP
RJERR1   DC           0                   CHAIN WORD
         DC           0                   PENDING FLAG
         DC           15                  WORD COUNT
         DC           C'REJECT BUCKET FULL, STOPPED.'
REJAV    DC           0                   REJECT PORT AVAIL FLAG
```

The microcode routines now described have to do primarily with operation of unit 10, processor 16 and processor 17.

Console service, CON and KB, provides connection to the operators station "console and keyboard".

When the driver loop DR detects that the 'Function Select' key (not shown) on the keyboard has been hit, control is given to the console service routine. The operator action, pending indicator, is cleared for the display service, the alarm is turned off, and the alarm timers are stopped. The bottom line of the CRT is cleared, then the keyboard input routine is called. When the required operator input is complete, control is returned. The first four characters are considered a command and are compared against a valid list. If the command is not in the list, it is posted as illegal and control is given to the general service (SRV) for printing. If the command is valid, two operands are decoded and stored. Operands are separated from the command and other operands by one or more blanks. A command may have none, one or two operands. Control is passed to the routine requested by the command. Control is returned from the command processor to either a normal path or an error path which will cause the command to be marked invalid. Control then goes into the general service routine (SRV) which places the operator input on the printer. Control is then returned to the driver loop DR.

Since microcode and programming for connecting such devices to a programmed control processor 16 is well known, further description is dispensed with.

Display service, CRT, displays messages on the operators station CRT display.

The driver loop DR determines if any messages are in the CRT queue and gives control to the display service CRT. A check is made to determine if operator action is pending due to a previous full screen condition. If so, control is returned to driver loop DR. The next line position is tested for end of display. If the next message will overflow, then the audible alarm is sounded (2 seconds every 30 seconds), operator action pending is set, and control is returned to the driver loop DR. If the previous conditions are correct, a message queue element is removed from the CRT queue (dequeued). If the line printer is active, the queue element is placed on the printer queue (enqueued) to be printed later by the printer service. If the printer is not active, the queue element is marked not pending. The message word count is checked and limited to 20 (one line on display), if necessary. The current line pointer is incremented and the message is placed on the screen by calling the CRT routine. The next line is blanked out, if it is not the bottom line on the display.

Such microcode is well known and is not further described.

General service, SRV, performs general support service.

A branch is taken to the general service routine from the driver loop DR. For each of the services performed, a check is made to see if action is required, the service is provided if required, then the next service is tried. After all services are done, control is returned to the driver loop DR. Services provided are:

1. Print results of YIELD command.
2. Print message for low yield for devices.
3. Print results of CHI SQUARE command.
4. Print results of THROUGHPUT command.
5. Print hex data.
6. Print intervention required messages for cartridge testers TU's.
7. Print message for bad mode word for testers TU.
8. Process device end for manual exit station.
9. Place operator input on printer.
10. Process and print time message.

11. Print TU load or patch error message.
12. Print calibration cartridge data from testers.
13. Print TU sense data.
14. Process trace card reader data.
15. Print online quality test failed.
16. Print results of LAST command.
17. Print trace data and enqueue for SBCA (Host 17).
18. Print mode words from MODE command.
19. Provide bypass service as requested by BYPASS command.
20. Print message for unexpected interrupt.
21. Print tester reject codes as requested by the PRINT command.
22. Process good and bad messages for the AUTO CALIBRATION command.
23. Print serial numbers of cartridges going to packaging.
24. Print reject codes for servo writer as requested by the PRINT command.
25. Print special channel error messages.
26. Print queue empty messages.
27. Print Delta X messages for XY Carriage.

Because of the general nature of this microcode and its peripheral relationship to the present invention, further description is dispensed with. Some items listed above are not explained since they do not pertain to the present invention.

Printer service, PRS, prints messages on a line printer (not shown).

Control is received from the driver loop DR. If the printer is not active (START and STOP control active), a return to the driver loop DR is taken. The printer *busy* flag (signal) is checked and if still busy, control is returned to the driver DR. If *not busy*, a timer is cancelled. If there is an outstanding queue element, it is marked no longer pending. If there are no more queue elements in the printer queue, control is returned to the driver loop. An element is dequeued and requested to be printed if present. The system number is copied into the message before printing. A timer is started, then control is returned to the driver loop DR. If the timer expires before the line is printed, control is received in a timer exit routine from the timer service. An error message is written on the bottom line of the operator display, the alarm turned on, and the timer restarted. Control is then returned to the timer service. All of the above represent typical printer control microcode not requiring further explanation.

370 channel, CH, provides 370 channel protocol for communication between processor 16 and 17.

Control is received from areas requesting data transfer over the 370 channel. The channel protocol of the IBM OEM document A22-6974 is followed. This document is available from IBM at Mechanicsburg, Pa., 17055. All sequences are timed.

Visual check, VISU, verifies the visual (hot stamped) serial number against the magnetic serial number (servo writer 12 written).

Control is received from the console service for the VISUAL command. The visual command allows the operator to specify the check frequency, force a check, and verify a cartridge being checked. Frequence is the number of cartridges for the hot stamp 11 and servo writer 12 and minutes of test for the testers TU. The visual check is done by the device routines. The output service detects that a visual check is due and sends the next good cartridge to the manual exit station. The operator must type in the visual number which is compared to the expected number. If a cartridge is out of the system at check time, the next cartridge will not be sent. The hot stamp or servo writer will be stopped and messages issued. The tester will wait for the cartridge to be entered. A message will be issued.

Time out monitor, TOM, starts timers for devices.

Control is received from the driver loop DR if started. As a cartridge enters the hot stamp 11, servo writer 12 or testers TU, a timer is started. When the cartridge comes out of the device, the timer is stopped. If a cartridge does not come out, due to an error condition in the device, the timer times out and a message is posted. The time out monitor checks to see if the device is active and has a cartridge, then starts a timer. The timers are stopped by the respective device service routine.

Timer service, TC and TCI, provide software timers.

Control is received from the driver loop DR. If no requests are on the timer queue, control is returned to the driver. Each request on the quque is removed and processed. The time/hold/cancel indicator is checked and the proper action taken. For cancel, the element is left off the queue. Hold causes the element to be returned to the queue without timing. For time, the remaining time is decremented by the quantity kept by the interrupt routine. If the remaining time is positive, the element is returned to the queue. If the time period has expired, then the timer exit routine is given control.

During initialization, the timer/counter hardware (not shown) is started for 100 milliseconds. When the 100 milliseconds has elapsed, an interrupt is issued. The interrupt routine increments the time counter and restarts the timer counter.

Host Service, SB, sends data to host or supervisory processor 17.

Control is received from the driver loop DR if the SBCA connection to processor 17 is started (START B). If a request is active, the SBCA status is checked. If still busy, control is returned to the driver DR. If a bad status was returned, ten retries are attempted, then SBCA is stopped. For good status, if the last operation was fetching the date and time, the date and time is copied into the data to be transmitted to processor 17 and the data is sent. Good status following sending data causes the operation to be marked complete and the queue element to be returned to the proper queue. A 10 second timer is started for each operation. The timer exit routine is activated if the 10 seconds expire before the operation is complete. The status is set to x'FFFF', the SBCA is reset and normal handling done.

SBCA (Sensor Based Communication Adaptor) connects processor 16 to processor 17. SBCA is an adapter sold by International Business Machines Corporation (IBM) for connecting a System 7 computer or processor to a host processor, such as a 370/168-3 computer, also sold by IBM.

3830 channel service, CHS, processes host 370 (processor 17) channel supplied data signals to and from the cartridge testers, TU. Each TU includes a 3830 director unit manufactured and sold by IBM which also controls a DRC unit (not shown) used to test the cartridges being manufactured.

Control is received from the driver loop, DR, only if the TU channel is active (START 3). Two basic sections process data from the TU's. The first section checks to see if a TU is through testing a cartridge and has polled in a device end signal. If ending status signals has been presented, then a read command is issued to TU to receive the summary test data. For unit check (error) indicated in the ending status signals, a sense command is issued by processor 16 to TU, a message is built indicating the abort code and any intervention required if present. The read command is then sent to TU (3830). The cartridge serial number sent to the TU is compared to the cartridge serial number returned in the summary data. If the two do not compare, a message is issued and the TU channel and testers are stopped. The summary data is posted to be sent to the host 17 or printed for calibration data. In this regard, at this stage of manufacture, servo writer 12 should have magnetically recorded the cartridge serial number assigned at 21 and imprinted by hot stamp unit 11, onto the magnetic medium of cartridge. All three numbers must match.

The second section finds TU's with cartridges waiting to be tested. The serial number of a successfully tested cartridge is removed from the CT queue element, converted to EBCDIC coding, and sent, along with the modeword, to TU. Unit check (error) conditions are handled for bad modeword or 3830 hardware failure.

370 channel poll, CH, tests for Request In for pending request from devices, as TU's, Hot stamp 11, writer 12, port 14, etc. This routine begins communication between processor 16 and any of the controlled devices.

Control is received from the driver loop DR. The Request In Line is tested and if not active, control is returned to the driver loop DR. If the line is active, the address of the requesting device is taken and compared to an expected list. If the device address is not in the list, an error message is posted and control is returned to driver DR. For legal addresses, control is given to the normal 370 Channel routine where the request is processed.

Yield, YLD, YIEL, REYI, FIYI, gathers, monitors and displays cartridge yield information.

Control is received from any device (hot stamp, etc.) routines for the yield gathering and monitoring functions. The console service gives control to the yield display functions. As a cartridge comes out, each device reports the good/bad status to the yield gathering routine. Tables are maintained of the total cartridges and good cartridges for the long term (since system start) and short term (last ten cartridges) for each device.

The short term yield is monitored and if it drops to 50% or below, a message is issued. For cartridge testers, the serial numbers of good cartridges are saved for the LAST command. For the winder, hot stamp, and servo writer, the reject code is reported to the host. From the information in the tables, the YIEL, REYI, FIYI commands compute and display the total yield, retest yield and first pass yield, respectively.

Throughput, THRU, TRU, maintains cartridge throughput rates for display purposes.

Control is received from the console service for the THRU command from the timer service. A 15 minute timer is started the first time the driver loop DR is started. Each 15 minute time out, control is given to the monitor routine. Using the yield tables, a long term (since last system start) and a short term (last 15 minute) cartridge throughput rate is computed. When the THRU command is issued, the rates are posted on the CRT and printer.

The routine is detailed at the machine instruction level in the source code below.

```
          TITLE      THROUGH-PUT MONITOR

TRUEXT  EQU             *
  TRU00   EQU             *
          MDY      XI    R3                   SAVE RETURN ADDRESS
          MDX      PX    R4,R2                SAVE R2
          LRI            R10,WNDTRU           POINT TO THRU-PUT TBLE
          LRI            R11,WNDYLD           POINT TO YIELD TABLE
          MDX      TC    R12                  -1 TO R12
  TRU02   EQU             *
          MDX      XI    R12                  COUNT
          RSR      PY    R13,(R11)            GET LATEST TOTAL
          RSI      PY    (R10)                TOTAL UP TO LAST 15 MINUTES
          MDX      PX    R13                  TOTAL INTO X REG
          WS       PX    -1(R10)              SAVE TOTAL
          WS       SUB   (R10)                COMPUTE NUMBER IN LAST 15 MINUTES
          BNN            TRU03                NOT NEGATIVE=OK
          LDY      PX    R1,32767             LOAD CORRECTION
          RSR      ADD   R13,(R10)            CORRECT FOR OVERFLOW
          WSR      XI    R13,(R10)            STORE CORRECTED
  TRU03   EQU             *
          MDX      XI    R10                  NEXT
          STX      ADD   R11,7                NEXT
          TLBNZ    EOR   R12,10,TRU02         LOOP TILL DONE
          LRI            R1,TRU0              POINT TO PARMS
          LRI            R2,TIMEPQ            POINT TO TIMER QUEUE
          WS       PZ    1(R1)                ALLOW TIMING
          LDY      PX    R1,9000              15 MINUTES INTO X REG
          WS       PY    2(R1)                SET TIME
          WS       TC    4(R1)                POST PENDING
          BAL            ENQUE                PUT BACK ON QUEUE
          MLX      PX    R2,R4                RESTORE R2
          RS       PY    START                SEE IF SYSTEM STOPPED
          BZ             (R3)                 YES-RETURN
          LDY      PX    R1,1                 1 INTO X REG
          RS       PY    TRU01                GET PRESENT 15 MINUTE COUNT
          WS       ADD   TRU01                UPDATE
          RSR      PY    R1,CHI17             LOAD 15 MINUTE COUNT
```

TITLE    THROUGH-PUT MONITOR

```
         WS    ADD   CHI17                INCREMENT AND SAVE
         LDX   EOR   R1,3                 SEE IF 1 HOUR UP
         BNZ         (R3)                 RETURN IF NOT
         LRI         R1,CTOT7             POINT TO LAST TIME PERIOD
CHI19    EQU         *
         MDX   PZ    R10                  CLEAR COUNTER
CHI18    EQU         *
         RS    PY    (R1)                 LOAD TOTAL
         WS    PY    16(R1)               MOVE DOWN ONE TIME PERIOD
         RS    PY    1(R1)                LOAD GOOD COUNT
         WS    PY    17(R1)               MOVE DOWN
         WS    PZ    (R1)                 CLEAR MOVED DATA
         WS    PZ    1(R1)                AGAIN
         STX   ADD   R1,2                 POINT TO NEXT TESTER
         MDX   XI    R10                  COUNT
         TLBNZ EOR   R10,8,CHI18          LOOP FOR 8 TESTERS
         STX   SUB   R1,32                UP TO PREVIOUS TIME PERIOD
         LDX   SUB   R1,CTOT1             SEE IF DONE
         BNN         CHI19                LOOP IF NOT
         WS    PZ    CHI17                CLEAR 15 MINUTE COUNTER
         B           (R3)                 RETURN
CHI17    DC          0                    15 MINUTE COUNT
WNDTRU   DC          0                    LONG TERM TOTAL (UPDTE AT 15 MINS)
         DC          0                    SHORT TERM (LAST 15 MINS ONLY)
ESTRU    DC          0
         DC          0
SWTRU    DC          0
         DC          0
CT0TRU   DC          0
         DC          0
CT1TRU   DC          0
         DC          0
CT2TRU   DC          0
         DC          0
CT3TRU   DC          0
         DC          0
CT4TRU   DC          0
         DC          0
CT5TRU   DC          0
         DC          0
CT6TRU   DC          0
         DC          0
CT7TRU   DC          0
         DC          0
TRU01    DC          0                    NUMBER OF 15 MINUTES EXPIRED
TRU0     DC          0                    TIMER QUEUE ELEMENT FOR THRU-PUT
         DC          0                    ALLOW TIMING
         DC          9000                 15 MINUTES
         DC          TRUEXT               EXIT ROUTINE ADDRESS
         DC          0                    PENDING FLAG
```

Queueing, QU, provides queue chaining (queue manage).

Control is received from any microcode area requiring queue service. Two functions are performed. The enqueue routine places elements on a queue chain and the dequeue routine removes elements.

The machine instruction level source code in the charts below show the controlling microcode (two charts), the XY carriage move enqueue (one chart), the cartridge move request words (two charts), cartridge queue areas (CARTQS — seven charts), the queue limit source (description plus three charts) and an example of free cell identifications (eight charts). The latter identifies where a cartridge received by unit 10 from conveyor 20 can be stored (empty cell). Once a cartridge is assigned to a cell, it is always returned to that same cell in any all queuing during the manufacturing process.

TITLE    QUEUE MANAGER ROUTINE - QU

```
ENQUE    EQU         *                    ENTRY TO ENQUE
*
*                                         CALL SEQUENCE
*        LRI         R1,QUELE             LOAD ADD OF QUEUE ELEMENT
*        LRI         R2,QCNTL             LOAD ADD OF QUEUE CONTROL AREA
*        BAL         ENQUE                GO ENQUE THIS ELEMENT
*
*
```

TITLE    QUEUE MANAGER ROUTINE - QU

```
*                                       QUEUE CONTROL AREA
*QCNTL  DC              0               COUNT OF ELE'S IN QUEUE-INIT=0
*       DC              0               ADD OF 1ST ELEMENT-INIT=0
*       DC              QCNTL+1         ADD OF LAST ELE-INIT=A(A(FIRST))
*
QU01    EQU             *
        MDY     XI      R0              SAVE LINK ADD
        LDX     PX      R2              TEST QUEUE CONTROL POINTER
        BALNP           HANG            HANG IF NOT POSITIVE
        L               R18,(R2)        GET COUNT
        LDX     PX      R18             PUT IN X REG
        WSI     XI      (R2)            CNT+1 TO COUNT
        BALNP           HANG            HANG IF NOT POSITIVE
        IR              R2              POINT TO LAST ADD
        RSR     PY      R20,(R2)        GET ADD OF LAST
        WSR     PY      R1,(R2)         PUT THIS ADD AS LAST
        BALNP           HANG            HANG IF NOT POSITIVE
        WSR     PY      R1,(R20)        CHAIN TO THIS ONE
        WSM     PY      (R1),0          ZERO CHAIN ADD (LAST)
        B               (R0)            RETURN TO CALLER
DEQUE   EQU             *               ENTRY TO DEQUE
*
*                                       CALL SEQUENCE
*       LRI             R1,QCNTL        LOAD ADD OF QUEUE CONTROL AREA
*       BAL             DEQUE           GO GET A QUEUE ELEMENT
*                                       R2 CONTAINS ADDRESS OF QUE ELEMENT
*
QU02    EQU             *
        MDY     XI      R0              SAVE LINK ADD
        L               R18,(R1)        GET COUNT
        LDX     PX      R18             GET IN X REG
        WSI     XD      (R1)            CNT-1 TO COUNT
        BALN            HANG            GO HANG IF NEGATIVE
        BNZ             QU03            SKIP IF NOT LAST
        LDY     PX      R1              VALUE IN R1 TO Y REG
        WS      PY      1(R1)           PUT IN ADD OF LAST ON QUEUE
QU03    EQU             *
        RSR     PY      R2,(R1)         GET ADD OF FIRST ON QUEUE
        BALNP           HANG            HANG IF NOT POSITIVE
        RSR     PY      R18,(R2)        GET CHAIN ADD
        WSR     PY      R18,(R1)        CHAIN DOWN
        WSM     PY      (R2),0          CLEAR CHAIN WORD
        B               (R0)            RETURN TO CALLER
        LIST            ON              QUEUE MANAGER ROUTINE
```

TITLE    ROUTINE TO ENQUE MOVES FOR THE X-Y CARRIAGE

```
*
*       CALLING SEQUENCE
*
*       LRI             R4,XYSW         ADD OF ADD OF CART QUEUE ELE
*       LRI             R5,SWQ          ADD OF DESTINATION QUEUE
*       RSR     PY      R6,(R2)         X-Y ADD OF FROM
*       RSR     PY      R7,SWI          X-Y ADD OF TO
*       BAL             MOVEIT          GO ENQUE A MOVE
*
*                                       SERVO WRITER INPUT USED AS AN EXAM
MOVEIT  EQU             *
        MDY     XI      R3              SAVE LINK ADDRESS
        LRI             R1,MVFR         LOAD ADD OF MOVE FREE QUEUE CONTROL
        BAL             DEQUE           GO GET A MOVE QUEUE ELE
        MDX     XI      R14,R2          INCREMENT POINTER, SAVE ORIG
        WSRI    PY      R4,(R14)        PUT ADD OF ADD OF CART QUEUE ELE
        WSRI    PY      R5,(R14)        PUT ADD OF DEST QUEUE
        WSRI    PY      R6,(R14)        PUT FROM X-Y ADD
        WSR     PY      R7,(R14)        PUT TO X-Y ADD
        LR              R1,R2           LOAD ADD OF FROM QUEUE CONTROL
        LRI             R2,MVFO         POINT TO MOVE REQUEST QUEUE CONTROL
        BAL             ENQUE           POST THIS MOVE REQUEST
        RS      PY      MVFR            CHECK IF MORE QUEUE ELE'S AVAIL
        BZ              MOV01           NO-DON'T BUMP RET ADD
        IR              R3              MORE AVAIL, BUMP RET ADD
MOV01   B               (R3)            RETURN TO CALLER
```

```
        TITLE     MOVE REQUEST WORDS

A4IXY   DC    0                   A4 INPUT TO XY REQ
XYHS    DC    0                   XY TO HOT STAMP REQ
HSXY    DC    0                   HOT STAMP TO XY REQ
XYSW    DC    0                   XY TO SERVO WRITER REQ
SWXY    DC    0                   SERVO WRITER TO XY REQ
XYCT    DC    0                   XY TO CART TESTER REQ
        DC    0
        DC    0
        DC    0
        DC    0
        DC    0
        DC    0
CTXY    DC    0                   CART TESTER TO XY REQ
        DC    0
        DC    0
        DC    0
        DC    0
        DC    0
        DC    0
CTRJ    DC    0                   CTO OUT PORT TO REJECT MOVE REQUEST
        DC    0                      1
        DC    0                      2
        DC    0                      3
        DC    0                      4
        DC    0                      5
        DC    0                      6
        DC    0                      7
XYPK1   DC    0                   XY TO PACK1 REQ
XYPK2   DC    0                   XY TO PACK2 REQ
HSREJ   DC    0                   HOT STAMP TO REJECT REQ
SWREJ   DC    0                   SERVO WRITER TO REJECT REQ
MESXY   DC    0                   MES ENTRY TO XY REQ
XYMES   DC    0                   XY TO MES EXIT REQ
A4IHS   DC    0                   A4 INPUT TO HOT STAMP MVE REQ
HSSW    DC    0                   HOT STAMP TO SERVO WRITER MVE REQ
XYREJ   DC    0.                  CELL XY TO REJECT MVE REQ
HSMES   DC    0                   HOT STAMP TO MES EXIT REQ
MESIO   DC    0                   MES ENTRY TO EXIT MOVE REQUEST
SWAO    DC    0                   SERVO WRITER TO A4 OUTPUT REQUEST
SWMES   DC    0                   SERVO WRITER TO MES REQUEST
XYAO    DC    0                   XY TO A4 OUTPUT REQUEST

TITLE     CARTRIDGE QUEUE CONTROL AREAS (CARTQS)

MORG  12500-1300
SAVORG  DS    0
MESREQ  DC    0                   QUEUE ELE ADD OF CART TO MES
        DC    0                   DEST QUEUE ADD AFTER RETURN TO A4
SERHI   DC    0                   SERIAL NUMBER HIGH BITS
SERLO   DC    0                   SERIAL NUMBER LOW BITS
WD11    DC    0                   SERIAL HIGH FOR TRACE
        DC    0                   SERIAL LOW FOR TRACE
*
*
*                                 QUEUES FOR CARTRIDGES
*
*
*                                 QUEUE FORMAT-
*       DC    CCCC                +0   CHAIN WORD
*       DC    SSSS                +1   SERIAL NUM HIGH BITS
*       DC    SSSS                +2   SERIAL NUM LOW BITS
*       DC    ZYXX                +3   X-Y-Z CELL LOCATION
*
*                                 EMPTY CELL QUEUE
*
CLPOOL  DC    CELLAV              TOTAL FREE CELLS AVAIL
        DC    CELL01              FIRST ON QUEUE
        DC    CELLXX              LAST ON QUEUE
```

TITLE    CARTRIDGE QUEUE CONTROL AREAS (CARTQS)

```
*
*                              CART'S ON CONVEYOR INTO A4
*
CONVQ   DC      0
        DC      0
        DC      CONVQ+1
*
*                              CART'S TO BE HOT STAMPED
*
B4HSQ   DC      0
        DC      0
        DC      B4HSQ+1
*
*                              CART'S IN HOT STAMP
*
HSQ     DC      0
        DC      0
        DC      HSQ+1
*
*                              CART'S TO BE SERVO WRITTEN
*
B4SWQ   DC      0
        DC      0
        DC      B4SWQ+1
*
*                              CART'S IN SERVO WRITER
*
SWQ     DC      0
        DC      0
        DC      SWQ+1
*
*                              CART'S TO BE TESTED
*
B4CTQ   DC      0
        DC      0
        DC      B4CTQ+1
*
*                              CARTRIDGE TESTER QUEUES
*
CT0Q    DC      0
        DC      0
        DC      CT0Q+1
*
CT1Q    DC      0
        DC      0
        DC      CT1Q+1
*
CT2Q    DC      0
        DC      0
        DC      CT2Q+1
*
CT3Q    DC      0
        DC      0
        DC      CT3Q+1
*
CT4Q    DC      0
        DC      0
        DC      CT4Q+1
*
CT5Q    DC      0
        DC      0
        DC      CT5Q+1
*
CT6Q    DC      0
        DC      0
        DC      CT6Q+1
*
CT7Q    DC      0
        DC      0
        DC      CT7Q+1
*
*                              CART'S TO BE PACKAGED
*
```

TITLE     CARTRIDGE QUEUE CONTROL AREAS (CARTQS)

```
B4PKQ    DC       0
         DC       0
         DC       B4PKQ+1
*
*                                       REJECT QUEUE
*
REJQ     DC       0
         DC       0
         DC       REJQ+1
*
*                                       CARTS TO NEXT SYSTEM QUEUE
*
UUCQ     DC       0
         DC       0
         DC       UUCQ+1
*
*
*                                       TRACE READER QUEUE
*
TRQ      DC       0
         DC       0
         DC       TRQ+1
*
*                                       TRACE READER FREE QUEUE
*
TRFRQ    DC       6
         DC       TRFRQ1
         DC       TRFRQ6
*
TRFRQ1   DC       TRFRQ2
         DS       TRQLN
TRFRQ2   DC       TRFRQ3
         DS       TRQLN
TRFRQ3   DC       TRFRQ4
         DS       TRQLN
TRFRQ4   DC       TRFRQ5
         DS       TRQLN
TRFRQ5   DC       TRFRQ6
         DS       TRQLN
TRFRQ6   DC       0
         DS       TRQLN
*
*
*                                       QUALITY TESTER FREE QUEUE
*        FORMAT:
*
*QUAL1   DC       0                     CHAIN WORD
*        DC       X                     CART QUEUE ELEMENT POINTER
*        DC       X                     FROM TESTER NUMBER
*        DC       X                     MODE WORD ONE
*        DC       X                     MODE WORD TWO
*
QUALQT   DC       0                     CARTS IN QUALITY QUEUE
         DC       0
         DC       QUALCT+1
*
QUALFQ   DC       0                     COUNT ON QUEUE
         DC       0                     POINTER TO FIRST ON QUEUE
         DC       QUALFQ+1              POINTER TO LAST ON QUEUE
*
QUTBLE   DC       0                     SINCE LAST QUAL CHECK-TESTER 0
         DC       0                     SINCE LAST QUAL FAIL-TESTER 0
         DC       0                     CONSEC MODE SET IND-TESTER 0
         DS       21                    FOR TESTERS 1-7
*
*
*                                       CARTRIDGES WAITING FOR QUALITY TESTER
*
B4QULQ   DC       0                     COUNT
         DC       0                     FIRST
         DC       B4QULQ+1              LAST
*
```

TITLE    CARTRIDGE QUEUE CONTROL AREAS (CARTQS)

```
QUALQ   DC      0                       COUNT
        DC      0                       FIRST
        DC      QUALQ+1                 LAST
*
QUFREE  DS      50+50+50+50+50          50 QUEUE ELEMENTS
*
*                                       LAST 25 CART'S THROUGH EACH TESTER
*
CT0LAQ  DC      0
        DC      0
        DC      CT0LAQ+1
CT1LAQ  DC      0
        DC      0
        DC      CT1LAQ+1
CT2LAQ  DC      0
        DC      0
        DC      CT2LAQ+1
CT3LAQ  DC      0
        DC      0
        DC      CT3LAQ+1
CT4LAQ  DC      0
        DC      0
        DC      CT4LAQ+1
CT5LAQ  DC      0
        DC      0
        DC      CT5LAQ+1
CT6LAQ  DC      0
        DC      0
        DC      CT6LAQ+1
CT7LAQ  DC      0
        DC      0
        DC      CT7LAQ+1
*
LASTC   DS      600                     LAST QUEUE AREA
*
CTOT1   DC      0                       TOTAL FOR TIME PERIOD 1
        DC      0                       GOOD FOR TIME PERIOD 1
CT1T1   DS      2                       TESTER 1, TIME 1
CT2T1   DS      2
CT3T1   DS      2
CT4T1   DS      2
CT5T1   DS      2
CT6T1   DS      2
CT7T1   DS      2
CTOT2   DS      16
CTOT3   DS      16
CTOT4   DS      16
CTOT5   DS      16
CTOT6   DS      16
CTOT7   DS      16
CTOT8   DS      16
BSADD0  DS      0                       END OF CARTQS
```

Queue Limit Service, QL, controls the size of cartridge queues.

Control is received from the driver loop DR if active. Cartridge counts are tested for the queues before hot stamp 11, servo writer 12, cartridge testers TU and packaging (not shown). Default limits are set as desired.

Any set limits may be modified by the ALTER command from the keyboard. If a queue is over the limit, the device processing into the queue is paused (no move cartridges to be sent to the paused device). For example, if the queue before the cartridge testers has 1901 cartridges, the servo writer 12 will be paused and a message issued. When the count drops to 20 below the limit, a message is issued. The operator can then start the paused device (send more cartridges to it).

TITLE     QUEUE LIMIT CONTROL

```
Q0LIM   EQU         1275                    QUEUE LIMIT BEFORE HOT STAMP
Q1LIM   EQU         1275                    QUEUE LIMIT BEFORE SERVO WRITER
Q2LIM   EQU         900                     QUEUE LIMIT BEFORE CARTRIDGE TESTERS
Q3LIM   EQU         10000                   QUEUE LIMIT BEFORE PACKAGING
QL00    EQU         *
        MDX   TC    R8                      -1 INTO R8
QL01    EQU         *
        IR          R8                      NEXT
        RS    PY    QOFF(R8)                SEE IF THIS QUEUE LIMITED NOW
        BNZ         QL02                    YES
        RS    PY    AQUES(R8)               GET ADD OF QUEUE
        MDX   PY    R9                      PUT IN R9
        RSR   PY    R10,(R9)                GET QUEUE COUNT
        LDX   PX    R10                     PUT IN X
        RS    SUB   QLIMU(R8)               SUBTRACT LIMIT
        BN          QL03                    OK-CONSIDER NEXT
        RS    PY    QL05(R8)                GET QUEUE NAME
        WS    PY    QLERR1+7                PUT IN MESSAGE
        RS    PY    QL05-1(R8)              LOAD NAME OF DEVICE PAUSED
        WS    PY    QLERR1+17               IN MESSAGE
        LDX   PX    R1,C' '                 BLANK MASK
        WS    PY    QLERR1+16               CLEAR
        WS    TC    QOFF(R9)                MARK QUEUE LIMITED
        RS    PY    QACTF(R8)               GET ADD OF PAUS FLAG
        MDX   PY    R9                      PUT IN R9
        WS    TC    (R9)                    PAUS THIS DEVICE
        RS    PY    SYSEVN                  SEE IF EVEN SYSTEM
        BZ          QL06                    SKIP IF NOT
        LRI         R1,QLERR1+16            POINT TO MESSAGE AREA
        WSM   PY    (R1),C' A'              SAY 'A4I'
        WSM   PY    (R1),C'4I'
        WS    TC    A4IPAU                  PAUSE A4 INPUT
QL06    EQU         *
        RS    PY    QLERR1+1                SEE IF MESS PENDING
        BNZ         QL03                    YES-DON'T POST MORE
        WS    TC    QLERR1+1                POST PENDING
        LRI         R1,QLERR1               POINT TO MESSAGE
QL04    EQU         *
        LRI         R2,CRTQ                 POINT TO CRT QUEUE
        BAL         ENQUE                   POST THIS REQUEST
        B           QL03                    GO TO END
QL02    EQU         *
        RS    PY    AQUES(R8)               GET ADD OF QUEUE
        MDX   PY    R9                      PUT IN R9
        RSR   PY    R10,(R9)                GET QUEUE COUNT
        LDX   PX    R10                     R10 INTO 'X'
        RS    SUB   QLIML(R8)               SUBTRACT LOWER LIMIT
        BP          QL03                    STILL TOO FULL
        RS    PY    QL05(R8)                GET QUEUE NAME
        WS    PY    QLERR2+7                PUT IN MESSAGE
        WS    PZ    QOFF(R8)                CLEAR LIMITED FLAG
        RS    PY    QLERR2+1                SEE IF MESSAGE POSTED
        BNZ         QL03                    YES
        WS    TC    QLERR2+1                POST PENDING
        LRI         R1,QLERR2               POINT TO MESSAGE
        B           QL04                    FINISH MESSAGE REQUEST
QL03    EQU         *
        TLBNZ EOR   R8,QLNUM-1,QL01         LOOP IF NOT DONE
        B           DR13                    FINISHED-RETURN TO DRIVER
QLNUM   EQU         4                       NUMBER OF QUEUE'S BEING LIMITED
AQUES   DC          B4HSQ                   BEFORE HOT STAMP QUEUE
        DC          B4SWQ                   BEFORE SERVO WRITER QUEUE
        DC          B4CTQ                   BEFORE CARTRIDGE TESTER QUEUE
        DC          B4PKQ                   BEFORE PACKAGING QUEUE
QOFF    DC          0                       QUEUE 0 LIMITED
        DC          0                       QUEUE 1 LIMITED
        DC          0                       QUEUE 2 LIMITED
        DC          0                       QUEUE 3 LIMITED
QLIMU   DC          Q0LIM                   QUEUE 0 UPPER LIMIT
        DC          Q1LIM                   QUEUE 1 UPPER LIMIT
        DC          Q2LIM                   QUEUE 2 UPPER LIMIT
        DC          Q3LIM                   QUEUE 3 UPPER LIMIT
```

```
        TITLE     QUEUE LIMIT CONTROL

QLIML   DC        Q0LIM-20                QUEUE 0 LOWER LIMIT
        DC        Q1LIM-20                QUEUE 1 LOWER LIMIT
        DC        Q2LIM-20                QUEUE 2 LOWER LIMIT
        DC        Q3LIM-20                QUEUE 3 LOWER LIMIT
QACTF   DC        WDPAUS                  ADD OF WINDER PAUS FLAG
        DC        HSPAUS                  ADD OF HOT STAMP PAUS FLAG
        DC        SWPAUS                  ADD OF SERVO WRITER PAUS FLAG
        DC        CTPAUS                  ADD OF CARTRIDGE TESTER PAUS FLAG
QLERR1  DC        0                       CHAIN WORD
        DC        0                       PENDING FLAG
        DC        19                      WORD COUNT
        DC        C'QUEUE B4XX LIMIT EXCEEDED,  XX PAUSED.'
QLERR2  DC        0                       CHAIN WORD
        DC        0                       PENDING FLAG
        DC        14                      WORD COUNT
        DC        C'QUEUE B4XX NOW WITHIN LIMIT.'
        DC        C'WN'
QL05    DC        C'HSSWCTPK'

TITLE     FREE CELL LOCATIONS     (END)

MORG      12500
JCMS01  DC        0                       BET CODE OF EXEC ADD
        DC        0                       CS WORD COUNT
        DC        0                       CSLOAD ADD
        DC        0                       MS WORD COUNT
        DC        0                       MS LOAD ADD
        DC        0                       SPARE
        DC        0                       SPARE
        DC        0                       SPARE
MSDAT0  DC        0                       NUMBER OF CELLS AVAIL
        DC        0                       FIRST ON QUEUE
        DC        0                       LAST ON QUEUE
CELL01  DS        0
        DC        CELL01+00004
        DS        2
        DC        X'00DF'                 X=223,Y= 0,Z=0
        DC        CELL01+00008
        DS        2
        DC        X'20DF'                 X=223,Y= 0,Z=1
        DC        CELL01+00012
        DS        2
        DC        X'01DF'                 X=223,Y= 1,Z=0
        DC        CELL01+00016
        DS        2
        DC        X'21DF'                 X=223,Y= 1,Z=1
        DC        CELL01+00020
        DS        2
        DC        X'02DF'                 X=223,Y= 2,Z=0
        DC        CELL01+00024
        DS        2
        DC        X'22DF'                 X=223,Y= 2,Z=1
        DC        CELL01+00028
        DS        2
        DC        X'03DF'                 X=223,Y= 3,Z=0
        DC        CELL01+00032
        DS        2
        DC        X'23DF'                 X=223,Y= 3,Z=1
        DC        CELL01+00036
        DS        2
        DC        X'04DF'                 X=223,Y= 4,Z=0
        DC        CELL01+00040
        DS        2
        DC        X'24DF'                 X=223,Y= 4,Z=1
        DC        CELL01+00044
        DS        2
        DC        X'05DF'                 X=223,Y= 5,Z=0
        DC        CELL01+00048
        DS        2
        DC        X'25DF'                 X=223,Y= 5,Z=1
```

TITLE    FREE CELL LOCATIONS    (END)

```
DC      CELL01+00052
DS      2
DC      X'06DF'              X=223,Y= 6,Z=0
DC      CELL01+00056
DS      2
DC      X'26DF'              X=223,Y= 6,Z=1
DC      CELL01+00060
DS      2
DC      X'07DF'              X=223,Y= 7,Z=0
DC      CELL01+00064
DS      2
DC      X'27DF'              X=223,Y= 7,Z=1
DC      CELL01+00068
DS      2
DC      X'08DF'              X=223,Y= 8,Z=0
DC      CELL01+00072
DS      2
DC      X'09DF'              X=223,Y= 9,Z=0
DC      CELL01+00076
DS      2
DC      X'0ADF'              X=223,Y=10,Z=0
DC      CELL01+00080
DS      2
DC      X'0BDF'              X=223,Y=11,Z=0
DC      CELL01+00084
DS      2
DC      X'0CDF'              X=223,Y=12,Z=0
DC      CELL01+00088
DS      2
DC      X'0DDF'              X=223,Y=13,Z=0
DC      CELL01+00092
DS      2
DC      X'0EDF'              X=223,Y=14,Z=0
DC      CELL01+00096
DS      2
DC      X'0FDF'              X=223,Y=15,Z=0
DC      CELL01+00100
DS      2
DC      X'10DF'              X=223,Y=16,Z=0
DC      CELL01+00104
DS      2
DC      X'11DF'              X=223,Y=17,Z=0
DC      CELL01+00108
DS      2
DC      X'12DF'              X=223,Y=18,Z=0
DC      CELL01+00112
DS      2
DC      X'13DF'              X=223,Y=19,Z=0
DC      CELL01+00116
DS      2
DC      X'14DF'              X=223,Y=20,Z=0
DC      CELL01+00120
DS      2
DC      X'34DF'              X=223,Y=20,Z=1
DC      CELL01+00124
DS      2
DC      X'15DF'              X=223,Y=21,Z=0
DC      CELL01+00128
DS      2
DC      X'35DF'              X=223,Y=21,Z=1
DC      CELL01+00132
DS      2
DC      X'16DF'              X=223,Y=22,Z=0
DC      CELL01+00136
DS      2
DC      X'36DF'              X=223,Y=22,Z=1
DC      CELL01+00140
DS      2
DC      X'17DF'              X=223,Y=23,Z=0
DC      CELL01+00144
DS      2
DC      X'37DF'              X=223,Y=23,Z=1
```

TITLE    FREE CELL LOCATIONS    (END)

```
DC      CELL01+00148
DS      2
DC      X'18DF'              X=223,Y=24,Z=0
DC      CELL01+00152
DS      2
DC      X'38DF'              X=223,Y=24,Z=1
DC      CELL01+00156
DS      2
DC      X'19DF'              X=223,Y=25,Z=0
DC      CELL01+00160
DS      2
DC      X'39DF'              X=223,Y=25,Z=1
DC      CELL01+00164
DS      2
DC      X'1ADF'              X=223,Y=26,Z=0
DC      CELL01+00168
DS      2
DC      X'3ADF'              X=223,Y=26,Z=1
DC      CELL01+00172
DS      2
DC      X'1BDF'              X=223,Y=27,Z=0
DC      CELL01+00176
DS      2
DC      X'3BDF'              X=223,Y=27,Z=1
DC      CELL01+00180
DS      2
DC      X'00DE'              X=222,Y= 0,Z=0
DC      CELL01+00184
DS      2
DC      X'20DE'              X=222,Y= 0,Z=1
DC      CELL01+00188
DS      2
DC      X'01DE'              X=222,Y= 1,Z=0
DC      CELL01+00192
DS      2
DC      X'21DE'              X=222,Y= 1,Z=1
DC      CELL01+00196
DS      2
DC      X'02DE'              X=222,Y= 2,Z=0
DC      CELL01+00200
DS      2
DC      X'22DE'              X=222,Y= 2,Z=1
DC      CELL01+00204
DS      2
DC      X'03DE'              X=222,Y= 3,Z=0
DC      CELL01+00208
DS      2
DC      X'23DE'              X=222,Y= 3,Z=1
DC      CELL01+00212
DS      2
DC      X'04DF'              X=222,Y= 4,Z=0
DC      CELL01+00216
DS      2
DC      X'24DE'              X=222,Y= 4,Z=1
DC      CELL01+00220
DS      2
DC      X'05DE'              X=222,Y= 5,Z=0
DC      CELL01+00224
DS      2
DC      X'25DE'              X=222,Y= 5,Z=1
DC      CELL01+00228
DS      2
DC      X'06DE'              X=222,Y= 6,Z=0
DC      CELL01+00232
DS      2
DC      X'26DE'              X=222,Y= 6,Z=1
DC      CELL01+00236
DS      2
DC      X'07DE'              X=222,Y= 7,Z=0
DC      CELL01+00240
DS      2
DC      X'27DE'              X=222,Y= 7,Z=1
```

TITLE    FREE CELL LOCATIONS    (END)

```
DC      CELL01+00244
DS      2
DC      X'08DE'                 X=222,Y= 8,Z=0
DC      CELL01+00248
DS      2
DC      X'09DE'                 X=222,Y= 9,Z=0
DC      CELL01+00252
DS      2
DC      X'0ADE'                 X=222,Y=10,Z=0
DC      CELL01+00256
DS      2
DC      X'0BDE'                 X=222,Y=11,Z=0
DC      CELL01+00260
DS      2
DC      X'0CDE'                 X=222,Y=12,Z=0
DC      CELL01+00264
DS      2
DC      X'0DDE'                 X=222,Y=13,Z=0
DC      CELL01+00268
DS      2
DC      X'0EDE'                 X=222,Y=14,Z=0
DC      CELL01+00272
DS      2
DC      X'0FDE'                 X=222,Y=15,Z=0
DC      CELL01+00276
DS      2
DC      X'10DE'                 X=222,Y=16,Z=0
DC      CELL01+00280
DS      2
DC      X'11DE'                 X=222,Y=17,Z=0
DC      CELL01+00284
DS      2
DC      X'12DE'                 X=222,Y=18,Z=0
DC      CELL01+00288
DS      2
DC      X'13DE'                 X=222,Y=19,Z=0
DC      CELL01+00292
DS      2
DC      X'14DE'                 X=222,Y=20,Z=0
DC      CELL01+00296
DS      2
DC      X'34DE'                 X=222,Y=20,Z=1
DC      CELL01+00300
DS      2
DC      X'15DE'                 X=222,Y=21,Z=0
DC      CELL01+00304
DS      2
DC      X'35DE'                 X=222,Y=21,Z=1
DC      CELL01+00308
DS      2
DC      X'16DE'                 X=222,Y=22,Z=0
DC      CELL01+00312
DS      2
DC      X'36DE'                 X=222,Y=22,Z=1
DC      CELL01+00316
DS      2
DC      X'17DE'                 X=222,Y=23,Z=0
DC      CELL01+00320
DS      2
DC      X'37DE'                 X=222,Y=23,Z=1
DC      CELL01+00324
DS      2
DC      X'18DE'                 X=222,Y=24,Z=0
DC      CELL01+00328
DS      2
DC      X'38DE'                 X=222,Y=24,Z=1
DC      CELL01+00332
DS      2
DC      X'19DE'                 X=222,Y=25,Z=0
DC      CELL01+00336
DS      2
DC      X'39DE'                 X=222,Y=25,Z=1
DC      CELL01+00340
DS      2
```

TITLE    FREE CELL LOCATIONS   (END)

```
          DC      X'1ADE'              X=222,Y=26,Z=0
          DC      CELL01+00344
          DS      2
          DC      X'3ADE'              X=222,Y=26,Z=1
          DC      CELL01+00348
          DS      2
          DC      X'1BDE'              X=222,Y=27,Z=0
          DC      CELL01+00352
          DS      2
          DC      X'3BDE'              X=222,Y=27,Z=1
          DC      CELL01+00356
          DS      2
          DC      X'00F0'              X=224,Y= 0,Z=0
          DC      CELL01+00360
          DS      2
          DC      X'20F0'              X=224,Y= 0,Z=1
          DC      CELL01+00364
          DS      2
          DC      X'01F0'              X=224,Y= 1,Z=0
          DC      CELL01+00368
          DS      2
          DC      X'21F0'              X=224,Y= 1,Z=1
          DC      CELL01+00372
          DS      2
          DC      X'02F0'              X=224,Y= 2,Z=0
          DC      CELL01+00376
          DS      2
          DC      X'22F0'              X=224,Y= 2,Z=1
          DC      CELL01+00380
          DS      2
          DC      X'03F0'              X=224,Y= 3,Z=0
          DC      CELL01+00384
          DS      2
          DC      X'23F0'              X=224,Y= 3,Z=1
          DC      CELL01+00388
          DS      2
          DC      X'04F0'              X=224,Y= 4,Z=0
          DC      CELL01+00392
          DS      2
          DC      X'24F0'              X=224,Y= 4,Z=1
CELLXX    DS      0
          DC      0
          DS      2
          DC      X'05F0'              X=224,Y= 5,Z=0
CELLAV    EQU     00099                TOTAL CELLS = 099
          LIST    ON                   FREE CELLS
          S1X  PY R33,X'FFFF'          SET ALL BITS ON IN REG 33(X'21')
          STX  OR R33,0                OR IN NOTHING
          MDX  PX SPDI,R33             PUT R33 IN TO DISPLAY
          NOP
          B       *-4                  LOOP
          NOP
          NOP     100                  PLENTY OF PATCH ROOM
LASTMS    DC      0                    LAST MAIN STORE ADDRESS
          END     INIT00
```

XY carriage service, XY, processes requested carriage moves to the carriage control hardware (not shown) of article storage and retrieval unit 10, and performs error recovery with respect thereto.

The microcode removes a move request from the move queue (infra) and sends the move request to the control circuits (not shown) of unit 10, then wait for ending status signals to be returned from unit 10. The ending status signals are analyzed and if good, the move request is posted as completed.

The routine is divided into two basic sections. The first section sends the moves to the library and the second section analyzes ending status.

The first section removes all move queue elements if any are present. A sort is performed to determine the nearest "from" X (horizontal address or location) address in the outstanding move requests to the last 'To' "X" address. The resultant optimum move is then sent to unit 10. The initial status of unit 10 is checked for channel end only. Any initial errors are handled here.

The second section waits for the device (unit 10) end signal indicating the successful end of a move. If no errors occured, the move is marked complete and the cartridge is posted to the destination queue. Unit check (error) conditions are handled here.

```
        TITLE      X-Y CARRIAGE SERVICE

XY00    EQU        *
        RS    PY   XYBUSY              SEE IF CARRIAGE BUSY
        BNZ        XY01                TRY TO CLEAR IF SO
        RS    PY   XY12                SEE IF IN ERROR RECOVER
        BNZ        XY13                YES-HIT IT AGAIN
        RS    PY   XYPAUS              SEE IF XY PAUSED
        BZ         XY96                SKIP IF NOT
        RS    PY   XY97                SEE IF MESSAGE SENT
        BZ         DR05                RETURN TO DRIVER IF SO
        WS    PZ   XY97                SET SENT IND
        LRI        R1,XY98             POINT TO 'NOT BUSY' MESSAGE
        BAL        PSTMSG              POST
        B          DR05                RETURN TO DRVR
XY96    EQU        *
        RS    PY   FRCEMQ              SEE IF MOVES IN MOVE QUEUE
        BZ         XY100               NO-SKIP OUT
        LDX   PX   R1,4                BYTE COUNT TO 4
        WS    PY   XYBYTE              IN S I/O PARMS
        LRI        R8,1                ONE MOVE
        LRI        R9,XYDATA           POINT TO SIO DATA AREA
        LRI        R1,FRCEMQ           POINT TO FORCE MOVE QUEUE
        BAL        DEQUE               GET AN ELEMENT
        B          XY92                MAKE MOVE
XY100   EQU        *
        RS    PY   LIBRO4              SEE IF SINGLE MODE
        BZ         XY81                NO-SKIP
        RSR   PY   R8,MVESRT           SEE IF MOVES IN SORT QUEUE
        BNZ        XY85                YES-GO PROCESS
        RSR   PY   R8,MVREQ            SEE IF MOVES IN MOVE REQUEST QUEUE
        BZ         DR05                NO-RETURN TO DRVR
        LDX   EOR  R8,1                SEE IF ONLY ONE
        BZ         XY04                YES-DOIT
XY83    EQU        *
        LRI        R1,MVREQ            POINT TO MOVE REQUEST QUEUE
        BAL        DEQUE               GET AN ELEMENT
        MDX   PX   R1,R2               POINT TO IT
        LRI        R2,MVESRT           POINT TO SORT QUEUE
        BAL        ENQUE               PUT ON
        MDX   XD   R8                  COUNT
        BNZ        XY83                LOOP TILL ALL MOVES ON SORT QUEUE
        RSR   PY   R8,MVESRT           LOAD COUNT OF MOVES
XY85    EQU        *
        LRI        R9,XYDATA           POINT TO DATA AREA
        LDX   PX   R1,4                4 BYTE COUNT-ONE MOVE
        WS    PY   XYBYTE              SET COUNT
        LDX   EOR  R8,1                SEE IF ONLY ONE MOVE
        BNZ        XY91                SKIP IF NOT
        LRI        R1,MVESRT           POINT TO SORT QUEUE
        BAL        DEQUE               GET ELEMENT
        B          XY92                PROCESS IT
XY91    EQU        *
        LRI        R7,500              X DIFFERENCE REG TO LARGE NUMBER
        MDX   PZ   R12                 QUEUE POINTER TO ZERO
        RSR   PY   R11,XY82            LOAD LAST 'TO' X VALUE
        STX   AND  R11,X'00FF'         KILL Y AND Z
XY86    EQU        *
        LRI        R1,MVESRT           POINT TO SORT QUEUE
        BAL        DEQUE               GET AN ELEMENT
        RS    PY   3(R2)               LOAD FROM X-Y-Z
        MDX   PY   R10                 PUT IN R10
        STX   AND  R10,X'00FF'         KILL Y AND Z
        MDXD  SUB  R10,R11             SUB LAST 'TO' X
        BZ         XY88                MAKE MOVE IF SAME X VALUE
        BP         *+2                 SKIP IF POSITIVE
        STY   SUB  R10,0               COMPLEMENT
        LDXD  SUB  R10,R7              SUB FROM LAST DIFFERENCE
        BP         XY88                SAVE MOVE IF DELTA SMALLER
        MDX   PX   R1,R2               POINT TO QUEUE ELEMENT
        LRI        R2,MVESRT           POINT TO SORT QUEUE
        BAL        ENQUE               REPLACE MOVE
        B          XY89                SKIP
XY88    EQU        *
```

TITLE     X-Y CARRIAGE SERVICE

```
            MDX   PX   R7,R10            SAVE NEW DELTA
            MDX   PX   R10,P2            SAVE QUEUE POINTER
            LDX   PX   R12               TEST IF PRESENT QUEUE POINTER
            BZ         XY90              SKIP IF NOT
            MDX   PX   R1,R12            POINT TO IT
            LRI        R2,MVESR1         POINT TO SORT QUEUE
            BAL        ENQUE             RETURN ELEMENT
XY90        EQU        *
            MDX   PX   R12,R10           POINT TO NEW QUEUE ELEMENT
            LDX   PX   R7                SEE IF DELTA IS ZERO
            BZ         XY99              SKIP IF SO
XY89        EQU        *
            MDX   XD   R8                COUNT
            BNZ        XY86              LOOP FOR ALL QUEUE ELEMENTS
XY99        EQU        *
            MDX   PX   R2,R12            POINT TO QUEUE ELEMENT
            LRI        R8,1              ONE MOVE
            B          XY92              GO DOIT
XY81        EQU        *
            RSR   PY   R6,MVREQ          CHECK MOVE REQ QUEUE
            BZ         DR05              RETURN TO DRVR IF NO REQ PENDING
            LDX   SUB  R8,1              SEE IF MORE THAN ONE MOVE REQ
            BP         XY03              YES-GO DOIT
            RSR   PY   R9,XYPAS          CHECK IF SECOND PASS ON ONE MOVE
            BNZ        XY03              YES-MAKE MOVE
            LDX   PX   R8,1              LOAD 1
            WS    PY   XYPAS             SET SECOND PASS
            B          DR05              RETURN TO DRIVER-TRY FOR MORE MOVES
XY03        EQU        *
            WS    PZ   XYPAS             CLEAR SEC PASS IND
            RS    PY   LIBRO4            CHECK  SINGLE/MULTIPLE IND
            BZ         XY68              SKIP IF MULTIPLE
            LRI        R8,1              ALLOW ONLY ONE MOVE
            B          XY04              SKIP
XY68        EQU        *
            LDX   SUB  R8,8              SEE IF MORE THAN 8 MOVES
            BNP        XY04              NO - DO ALL OF 'EM
            LRI        R8,8              YES - DO ONLY 8
XY04        EQU        *
            MDX   PX   R8,R8,SLL2        MULT BY FOUR
            WSR   PY   R8,XYBYTE         SET BYTE COUNT
            MDX   PX   R8,R8,SRL2        GET WORD COUNT BACK
            LRI        R9,XYDATA         POINT TO DATA AREA
XY05        EQU        *
            LRI        R1,MVREQ          POINT TO MOVE REQ QUEUE
            BAL        DEQUE             GET QUEUE ELE
XY92        EQU        *
            RS    PY   3(R2)             GET FROM X-Y
            WSI   PY   (R9)              PUT IN CHANNEL DATA
            MDX   PY   R1                INTO R1
            STX   AND  R1,X'00FF'        REMOVE Y & Z
            LDX   PX   R1                INTO X REG
            RS    PY   XY92              LOAD LAST 'TO' X
            WS    SUB  XY94              STORE DELTA
            WS    TC   XY95              MARK NEW DELTA
            RS    PY   4(R2)             GET TO X-Y
            WSI   PY   (R9)              PUT IN
            MDX   PY   R1                PUT IN R1
            STX   AND  R1,X'00FF'        REMOVE Y AND Z
            WS    AND  XY82              SAVE
            WS    TC   (R9)              MARK END OF DATA
            LR         R1,R2             POINT TO QUEUE ELE
            LRI        R2,MOVE           POINT TO MOVE QUEUE
            BAL        ENQUE             POST THIS MOVE ACTIVE
            DR         R8                COUNT
            BNZ        XY05              LOOP IF NOT DONE
*
XYSIO       DC         X'0071'           MOVE COMMAND
            DC         0                 DEV-PROCESSOR 1
XYBYTE      DC         0                 BYTE COUNT
XYSTAT      DC         0                 STATUS
            DC         0                 RETURNED BYTE COUNT
```

TITLE    X-Y CARRIAGE SERVICE

```
          DC            XYDATA                  POINT TO DATA
XYDATA    DS            18                      MOVE DATA
XYBUSY    DC            0                       XY CARRIAGE BUSY IND
XYPAS     DC            0                       SEC PASS IND FOR 1 MOVE
XY82      DC            247                     LAST 'TO' X
XY94      DC            0                       DELTA X
XY95      DC            0                       NEW DELTA X IND
*
XY13      EQU           *
          LRI           R1,XYSIO                POINT TO SIO AREA
          WS    PZ      3(R1)                   ZERO OUT PRESENT STATUS
          RS    PY      FAKE05                  SEE IF FAKE IND SET $$$$$$$$$$$$$$$$
          BZ            XY24                    SKIP XY COMMAND $$$$$$$$$$$$$$$$$$$
          BAL           CHSIO                   ISSUE SIO
          RSR   PY      R8,(R1)                 GET INIT STATUS
          TBBNZ AND     R8,X'FF',XY09           CHECK FOR ANY ERRORS
          TLBNZ EOR     R8,X'08',XY09           SHOULD HAVE CHAN END ONLY
XY24      EQU           *
          WS    TC      XYBUSY                  SET XY BUSY
          WS    PZ      XYSTAT                  CLEAR STATUS
          WS    PZ      XY12                    CLEAR RETRY INDICATOR
          B             DR05                    RETURN TO DRIVER
XY12      DC            0                       RETRY INDICATOR
XY09      EQU           *
          MDX   PX      R1,R8                   STATUS TO R1
          LDX   EOR     R1,X'0001'              SEE IF UNIT EXCEPTION
          BZ            XY67                    HANDLE IF SO
          TLBZ  AND     R8,X'10',XY26           SEE IF BUSY
          WS    TC      XY12                    MARK RETRY ACTIVE
          WS    TC      XYBUSY                  MARK BUSY
          WS    PZ      XYSTAT                  CLEAR STATUS
          B             DR05                    RETURN TO DRVR
XY26      EQU           *
          LRI           R2,XY10+14              POINT TO OUTPUT AREA
          BAL           HEXE                    CONVERT TO HEX EBCDIC
          RS    PY      XY10+1                  SEE IF MESSAGE PENDING
          BNZ           XY11                    SKIP IF SO
          WS    TC      XY10+1                  POST PENDING
          LRI           R1,XY10                 POINT TO MESSAGE
          LRI           R2,CRTQ                 POINT TO CRT QUEUE
          BAL           ENQUE                   POST REQUEST
XY11      EQU           *
          TLBZ  AND     R8,X'02',*+2            SKIP SENSE IF NOT UNIT CHECK
          BAL           XY14                    COLLECT AND DISPLAY SENSE
          RSR   PY      R8,XYSTAT               GET STATUS BACK
          TBBNZ AND     R8,X'CE',XY28           CHECK NOT OP,ICC,PE,INVLD ADD,OR TIME OUT
          TLBNZ AND     R8,X'02',XY27           SEE IF UNIT CHECK
          TLBZ  AND     R8,X'04',XY24           SEE IF GOT DEVICE END
XY25      EQU           *
          WS    TC      XY12                    SET RETRY ACTIVE
          B             DR05                    RETURN TO DRIVER
XY27      EQU           *
          RSR   PY      R9,XYSEND               GET FIRST TWO BYTES OF SENSE
          TLBNZ AND     R9,X'40',XY31           SEE IF XY RECONFIGURED
XY32      EQU           *
          TBBNZ AND     R9,X'01',XY25           SEE IF ENVIORNMENTAL DATA
          TLBNZ AND     R9,X'0C',XY30           SEE IF PROCESSOR OR MC/PC
XY28      EQU           *
          WS    PZ      XYACT                   SET XY INACTIVE
          RS    PY      XY29+1                  SEE IF MESSAGE PENDING
          BNZ           XY25                    SKIP IF SO
          WS    TC      XY29+1                  SET PENDIN
          LRI           R1,XY29                 POINT TO MESSAGE
          LRI           R2,CRTQ                 POINT TO CRT QUEUE
          BAL           ENQUE                   POST REQUEST
          B             XY25                    SKIP OUT
XY29      DC            0                       CHAIN WORD
          DC            0                       PENDING FLAG
          DC            6                       WORD COUNT
          DC            C'XY STOPPED.'
XY30      EQU           *
          LDI   PX      R1,1                    1 INTO X
```

TITLE    X-Y CARRIAGE SERVICE

```
            RS      PY   XYSENS+1              GET SENSE DEV NUMBER
            WS      EOR  XYSENS+1              CHANGE TO OTHER PROCESSOR
            RS      PY   XYSIO+1               GET MOVE DEV NUMBER
            WS      EOR  XYSIO+1               CHANGE TO OTHER PROCESSOR
            RS      PY   LOAD51                GET LOAD DEVICE NUMBER
            WS      EOR  LOAD51                SWAP
            B            XY28                  OUT
XY31        EQU          *
            RS      PY   XY33+1                SEE IF MESSAGE PENDING
            BNZ          XY32                  SKIP IF SO
            WS      TC   XY33+1                POST PENDING
            LRI          R1,XY33               POINT TO MESSAGE
            LRI          R2,CRTQ               POINT TO CRT QUEUE
            BAL          ENQUE                 POST REQUEST
            B            XY32                  OUT
XY33        DC           0                     CHAIN WORD
            DC           0                     PENDING FLAG
            DC           8                     WORD COUNT
            DC           C'XY RECONFIGURED.'
XY14        EQU          *
            MDY     XI   R14                   SAVE RETURN ADDRESS
            LRI          R1,XYSENS             POINT TO SENSE COMMAND
            WS      PZ   XYSENS+3              CLEAR STATUS
            BAL          CHSIO                 DOIT
            RSH     PY   R1,XYSENS+3           LOAD STATUS
            LDX     EOR  R1,X'000C'            SHOULD BE CHAN END AND DEV END ONLY
            BNZ          XY61                  ERROR IF NOT
            LRI          R9,XY62+3             POINT TO FIRST OUTPUT AREA
            LRI          R10,XYSEND            POINT TO INPUT AREA
            MDX     PZ   R8                    ZERO TO R8
XY17        EQU          *
            MDX     PX   R2,R9                 POINT TO OUT AREA
            RSRI    PY   R1,(R10)              GET INPUT WORD
            BAL          HEXE                  CONVERT TO HEX EBCDIC
            STX     ADD  R9,2                  NEXT
            MDX     PX   R2,R9                 POINT TO OUT
            RSRI    PY   R1,(R10)              INPUT WORD
            BAL          HEXE                  CONVERT
            STX     ADD  R9,3                  NEXT OUT SKIP ONE
            MDX     PX   R2,R9                 POINT TO OUT AREA
            RSRI    PY   R1,(R10)              LOAD DATA
            BAL          HEXE                  CONVERT INTO MESSAGE
            STX     ADD  R9,2                  NEXT OUT AREA
            MDX     PX   R2,R9                 POINT TO IT
            RSRI    PY   R1,(R10)              LOAD DATA
            BAL          HPXE                  CONVERT INTO MESSAGE
            STX     ADD  R9,16                 POINT TO NEXT MESSAGE AREA
            MDX     XI   R8                    COUNT
            TLBNZ   EOR  R8,4,XY17             LOOP FOR FOUR MESSAGES
            LRI          R1,XY62               POINT TO MESSAGE
            BAL          PSTMSG                POST MESSAGE
            LRI          R1,XY63               POINT TO MESSAGE
            BAL          PSTMSG                POST MESSAGE
            LRI          R1,XY64               NEXT MESSAGE
            BAL          PSTMSG                POST
            LRI          R1,XY65               NPXT
            BAL          PSTMSG                POST
            B            (R14)                 RETURN TO CALLER
XY61        EQU          *
            LRI          R2,XY60+18            POINT TO MESSAGE AREA
            BAL          HEXE                  CONVERT STATUS INTO MESSAGE
            LRI          R1,XY60               POINT TO MESSAGE
            BAL          PSTMSG                POST MESSAGE
            MDX     PZ   R1                    CLEAR R1
XY66        EQU          *
            WS      PZ   XYSEND(R1)            ZERO OUT SENSE DATA
            MDX     XI   R1                    COUNT
            TLBNZ   EOR  R1,16,XY66            LOOP FOR 16 WORDS
            B            (R14)                 RETURN TO CALLER
XY10        DC           0                     CHAIN WORD
            DC           0                     PENDING FLAG
            DC           14                    WORD COUNT
```

TITLE    X-Y CARRIAGE SERVICE

```
           DC            C'LIBRARY SELECT STATUS-XXXX.'
XY06       EQU           *
           TLBNZ   AND   R8,X'01',XY34     SEE IF UNIT EXCEPTION
           MDX     PX    R1,R8             STATUS TO R1
           LRI           R2,XY21+15        POINT TO MESSAGE AREA
           BAL           HEXE              CONVERT STATUS
           RS      PY    XY21+1            SEE IF MESSAGE PENDING
           BNZ           XY22              SKIP IF SO
           WS      TC    XY21+1            POST PENDING
           LRI           R1,XY21           POINT TO MESSAGE
           LRI           R2,CRTQ           POINT TO CRT QUEUE
           BAL           ENQUE             POST REQUEST
XY22       EQU           *
           TLBZ    AND   R8,X'02',XY55     SEE IF NOT UNIT CHECK
           BAL           XY14              COLLECT AND DISPLAY SENSE
           RSR     PY    R8,XYSEND+1       GET SENSE BYTES 2&3
           MDX     PX    R8                PUT IN X REG
           RS      EOR   XYDATA+1          SEE IF SAME AS FIRST 'TO' XY
           BNZ           XY49              NO-SKIP
           MDX     PZ    R8                CLEAR R8-NO MOVES IN PROG,NONE DONE
XY49       EQU           *
           MDXS    PX    R8,R8             SWAP DONE TO HIGH
           MDX     PX    R9,R8             SAVE
           MDX     PX    R10,R8,SRL4       SAVE FOR ACCR 1
           STX     AND   R9,X'000F'        ISOLATE MVE IN PROGRESS
           STX     AND   R10,X'000F'       ISOLATE MVE IN PROGRESS
           MDX     PZ    R11               R11 TO ZERO
           RSR     PY    R23,MOVE          GET MOVE COUNT
XY38       EQU           *
           MDX     XI    R11               COUNT MOVE
           LRI           R1,MOVE           POINT TO MOVE QUEUE
           BAL           DEQUE             GET AN ELEMENT
           THBNZ   AND   R8,X'80',XY39     SEE IF MOVE COMPLETE
           LDXD    EOR   R11,R9            SEE IF ACCR  2 WORKING ON
           BZ            XY40              YES-SAY SO
           LDXD    EOR   R11,R10           SEE IF ACCR  1 WORKING ON
           BZ            XY46              YES-SAY SO
XY48       EQU           *
           MDX     PX    R1,R2             POINT TO QUEUE ELEMENT
           LRI           R2,MVREQ          POINT TO MOVE REQUEST QUEUE
           BAL           ENQUE             PUT BACK IN MOVE REQUEST QUEUE
           B             XY41              CONTINUE
XY55       EQU           *
           B             XY23              CONTINUE
XY39       EQU           *
           MDX     PX    R1,R2             POINT TO ELEMENT
           LRI           R2,MOVE           POINT TO MOVE QUEUE
           BAL           ENQUE             MOVE COMPLETE-PUT BACK IN
           B             XY41              CONTINUE
XY40       EQU           *
           RS      PY    XY42+1            SEE IF MESSAGE PENDING
           BALNZ         HANG              DISASTER-GO HANG
           WS      TC    XY42+1            POST PENDING
           LRI           R16,XY42+13       POINT TO MESSAGE AREA
           BAL           XY44              PUT DATA INTO MESSAGE
           LRI           R1,XY42           POINT TO MESSAGE
           LRI           R2,CRTQ           POINT TO CRT QUEUE
           BAL           ENQUE             POST REQUEST
           MDX     PX    R2,R12            RESTORE R2
           RSR     PY    R1,XYSEND+5       GET SENSE BYTES 10 & 11
           THBNZ   AND   R1,X'81',XY58     OPER ACT IF GAP BLKED OR CART IN PIC
           THBZ    AND   R1,X'04',XY48     BR IF NOT CELL FULL
           B             XY59              SKIP
XY58       EQU           *
           RS      PY    XY47+1            SEE IF MESSAGE PENDING
           BALNZ         HANG              HANG IF SO
           WS      TC    XY47+1            POST PENDING
           MDX     XI    R27,R12           POINT TO ADD OF ADD OF QUEUE ELEMENT
           RSR     PY    R27,(R27)         GET ADD OF ADD OF QUEUE ELEMENT
           RSR     PY    R27,(R27)         GET ADD OF QUEUE ELEMENT
           MDX     XI    R27               POINT TO SERIAL NUMBER
           LRI           R28,XY47+14       POINT TO MESSAGE AREA
```

TITLE    X-Y CARRIAGE SERVICE

```
              BAL        SPCVRT              SERIAL NUMBER INTO MESSAGE
              LRI        R1,XY47             POINT TO MESSAGE
              LRI        R2,CRTQ             POINT TO CRT QUEUE
              BAL        ENQUE               POST REQUEST
XY59   EQU               *
              LDX    PX  R1,X'0096'          PUT 'CELL2' AS FROM ADDRESS
              WS     PY  3(R12)              PUT IN MOVE REQUEST
              MDX    PX  R2,R12              RESTORE ELEMENT POINTER
              B          XY101               PUT IN FORCE MOVE QUEUE
XY44   EQU               *
              MDY    XI  R15                 SAVE RETURN ADDRESS
              MDX    PX  R12,R2              SAVE R2
              MDX    XI  R13,R2              SAVE R2+1
              MDX    TC  R17                 -1 INTO R17
XY45   EQU               *
              MDX    XI  R17                 COUNT
              MDX    PX  R2,R16              POINT TO MESSAGE AREA
              RSK    PY  R1,(R13)            GET DATA
              BAL        HEXE                CONVERT
              STX    ADD R16,2               NEXT OUT AREA
              TLBNZ  EOR R17,3,XY45          LOOP FOR 4 WORDS
              B          (R15)               RETURN TO CALLER
XY46   EQU               *
              RS     PY  XY50+1              SEE IF MESSAGE PENDING
              BALNZ      HANG                HANG IF SO
              WS     TC  XY50+1              POST PENDING
              LRI        R16,XY50+13         POINT TO MESSAGE AREA
              BAL        XY44                PUT DATA IN MESSAGE
              LRI        R1,XY50             POINT TO MESSAGE
              LRI        R2,CRTQ             POINT TO CRT QUEUE
              BAL        ENQUE               POST REQUEST
              RSK    PY  R1,XYSPND+3         GET SENSE BYTES 6 & 7
              MDX    PX  R2,R12              RESTORE R2
              TBBNZ  AND R1,X'81',XY56       OPER ACT IF GAP BLKED OR CART IN PICKER
              TBBZ   AND R1,X'04',XY48       ORIG MOVE IF NOT FULL CELL
              B          XY57                CHANGE 'FROM' TO RESERVE CELL
XY56   EQU               *
              RS     PY  XY51+1              SEE IF MESSAGE PENDING
              BALNZ      HANG                HANG IF SO
              WS     TC  XY51+1              POST PENDING
              MDX    XI  R27,R12             POIN TO SERIAL NUMBER
              RSK    PY  R27,(R27)           ADD OF ADD
              RSK    PY  R27,(R27)           ADD
              MDX    XI  R27                 POINT TO SERIAL NUMBER
              LRI        R28,XY51+14         POINT TO MESSAGE AREA
              BAL        SECVRT              PUT SERIAL NUMBER IN MESSAGE
              LRI        R1,XY51             POINT TO MESSAGE
              LRI        R2,CRTQ             POINT TO CRT QUEUE
              BAL        ENQUE               POST REQUEST
XY57   EQU               *
              LDX    PX  R1,X'0087'          ADD OF 'CELL1'
              WS     PY  3(R12)              PUT IN MOVE REQUEST
              MDX    PX  R2,R12              RESTORE R2
XY101  EQU               *
              MDX    IX  R1,R2               POINT TO QUEUE ELEMENT
              LRI        R2,FRCEMQ           POINT TO FORCE MOVE QUEUE
              BAL        ENQUE               POST
XY41   EQU               *
              MDX    PX  R6,58,SLL1          LOOK AT NEXT MOVE COMPLETE
              ADX    XD  R23                 COUNT DOWN
              BNZ        XY38                LOOP TILL DONE
              WS     IZ  XYACT               SET XY INACTIVE
              RS     PY  YY29+1              SEE IF MESSAGE PENDING
              BNZ        XY52                SKIP IF SO
              WS     TC  XY29+1              POST PENDING
              LRI        R1,XY29             POINT TO MESSAGE
              LRI        R2,CRTQ             POINT TO CRT QUEUE
              BAL        ENQUE               POST REQUEST
XY52   EQU               *
              RS     PY  MOVE                SEE IF ANYTHING IN MOVE QUEUE
              BNZ        XY23                YES-MARK COMPLETED MOVES
              WS     IZ  XYBUSY              CLEAR BUSY
```

TITLE    X-Y CARRIAGE SERVICE

```
         B           DR05                    RETURN TO DRIVER
XY42     DC          0                       CHAIN WORD
         DC          0                       PENDING FLAG
         DC          19                      WORD COUNT
         DC          C'XY MOVE ERROR DATA 'XXXXXXXXXXXXXXXX' '
XY50     DC          0                       CHAIN WORD
         DC          0                       PENDING FLAG
         DC          19                      WORD COUNT
         DC          C'XY MOVE ERROR DATA 'XXXXXXXXXXXXXXXX' '
XY47     DC          0                       CHAIN WORD
         DC          0                       PENDING FLAG
         DC          20                      WORD COUNT
         DC          C'PLACE LEFT ACCR CART 'XXXXXXXX' IN CELL2'
XY51     DC          0                       CHAIN WORD
         DC          0                       PENDING FLAG
         DC          20                      WORD COUNT
         DC          C'PLACE RIGHT ACCR CART'XXXXXXXX' IN CELL1'
XY67     EQU         *                       ENTRY FROM UE IN SELECT STATUS
         WS     TC   XY12                    POST RETRY ACTIVE
XY34     EQU         *
         RS     PY   XY35+1                  SEE IF MESSAGE PENDING
         BNZ         XY37                    YES-SKIP
         WS     TC   XY35+1                  POST PENDING
         LRI         R1,XY35                 POINT TO MESSAGE
         LRI         R2,CRTQ                 POINT TO CRT QUEUE
         BAL         ENQUE                   POST REQUEST
XY37     EQU         *
         WS     TC   XY36                    SET DEVICE END PENDING-EXIT STATION
         WS     PZ   XYACT                   SET XY INACTIVE
XY36     DC          0                       DEVICE END PENDING-EXIT STATION
XY35     DC          0                       CHAIN WORD
         DC          0                       PENDING FLAG
         DC          13                      WORD COUNT
         DC          C'LIBRARY EXIT STATION FULL.'
         RS     PY   XY29+1                  SEE IF MESSAGE PENDING
         BNZ         XY23                    SKIP IF SO
         WS     TC   XY29+1                  POST PENDING
         LRI         R1,XY29                 POINT TO MESSAGE
         LRI         R2,CRTQ                 POINT TO CRT QUEUE
         BAL         ENQUE                   POST REQUEST
         B           XY23                    CONTINUE
XY21     DC          0                       CHAIN WORD
         DC          0                       PENDING FLAG
         DC          15
         DC          C'LIBRARY RESELECT STATUS-XXXX.'
XY54     EQU         *
         B           XY06                    GO TO ERROR RECOVER
XY01     EQU         *
         RSR    PY   R8,XYSTAT               LOAD STATUS
         BZ          DR05                    RETURN TO DRIVER IF STILL ZERO
         RS     PY   XY42+1                  SEE IF MESSAGE PENDING
         BNZ         DR05                    RETURN TO DRIVER IF SO
         RS     PY   XY47+1
         BNZ         DR05
         RS     PY   XY50+1
         BNZ         DR05
         RS     PY   XY51+1
         BNZ         DR05
         WS     PZ   XYBUSY                  CLEAR BUSY IND
         RS     PY   XY12                    SEE IF RETRY ACTIVE
         BNZ         DR05                    RETURN TO DRVR IF SO
         TWBNZ  AND  R8,X'FF',XY54           CHECK FOR ERRORS
         TLBNZ  AND  R8,X'F3',XY54           CHECK FOR ERRORS
XY23     EQU         *
         WS     PZ   XYBUSY                  CLEAR BUSY
         RS     PY   XY12                    SEE IF RETRY ACTIVE
         BNZ         DR05                    RETURN TO DRVR IF SO
XY08     EQU         *
         LRI         R1,MOVE                 POINT TO MOVE QUEUE
         BAL         DEQUE                   GET QUEUE ELE
         MDX    XI   R14,R2                  INCREMENT POINTER BUT SAVE ORIGINAL
         RSRI   PY   R8,(R14)                GET ADD OF ADD OF CART QUEUE ELE
```

TITLE     X-Y CARRIAGE SERVICE

```
           BSH    PY    R9,(R8)           GET ADD OF CART QUEUE ELE
           WSM    PY    (R8),0            MARK MOVE COMPLETE
           KSRI   PY    R10,(R14)         GET ADD OF DEST QUEUE
           LR           R1,R2             POINT TO MOVE QUEUE
           LRI          R2,MVEFR          POINT TO FREE MOVE QUEUE
           BAL          ENQUE             RETURN QUEUE
           LR           R1,R9             POINT TO CART QUEUE ELE
           LR           R2,R10            POINT TO DEST QUEUE
           BZ           *+2               SKIP IF NO DESTINATION QUEUE
           BAL          ENQUE             PUT CART IN DEST QUEUE
           RS     PY    MOVE              SEE IF MORE
           BNZ          XY08              LOOP IF SO
           B            DR05              RETURN TO DRIVER
XYSENS     DC           X'0004'           SENSE COMMAND
           DC           0                 DEV-PROCESSOR
           DC           28                BYTE COUNT
           DC           0                 STATUS
           DC           0                 RETURNED BYTE COUNT
           DC           XYSEND            DATA ADDRESS
XYSEND     DS           17                DATA AREA
XY60       DC           0                 CHAIN WORD
           DC           0                 PENDING FLAG
           DC           17                WORD COUNT
           DC           C'LIBRARY SENSE FAILED, STATUS=XXXX.'
XY62       DC           0                 CHAIN WORD
           DC           0                 PENDING
           DC           20                WORD COUNT
           DC           C'XXXXXXXX  XXXXXXXX LIB SENSE BYTES  0- 7'
XY63       DC           0
           DC           0
           DC           20
           DC           C'YYYYXXXX  XXXYXXXY LIB SENSE BYTES  8-15'
XY64       DC           0
           DC           0
           DC           20
           DC           C'XYXXXXXX  XXXXXXXX LIB SENSE BYTES 16-23'
XY65       DC           0
           DC           0
           DC           20
           DC           C'XXXXXXXX  XXXXXXXX LIB SENSE BYTES 24-27'
XY96       DC           0
           DC           0
           DC           6
           DC           C'XY NOT BUSY.'
XY97       DC           0                 'NOT BUSY' MESS SENT IND
```

In addition to the above described microcode, a practical embodiment would include additional microcode usually associated with programmable systems, such as program loading diagnostics, retries, start-up and initializations from emergency power-off and normal shut downs, additional routines for monitoring and controlling auxilliary apparatus (not shown) not necessary for practicing the present invention, calibration of TU's and the like, mapping cartridge locations in unit 10 (audit and verification of program controls) and intercommunication with parallel production lines. All of the above are omitted for clarity and brevity.

The chart below lists pertinent labels used in the illustrated machine instructions source code listings. The term "command" indicates operater input at the keyboard, KB.

| LABEL | ROUTINE | FUNCTION |
|---|---|---|
| ABOR | Abort Command | Abort test in progress |
| ALTR | Alter Command | Alter limits on queues |
| A4I | Input Port Service | Process cartridges from input conveyor 20 |
| BIT | Bit to EBCDIC | Convert bits to 1's and 0's for printing (tester stripe data) |

-continued

| LABEL | ROUTINE | FUNCTION |
|---|---|---|
| BYPS | Bypass Command | Cartridges bypass devices |
| CH | 370 Channel | Process data transfer over 370 Channel |
| CHAN | 370 Channel Command | Issue stop to Channel |
| CHS | 3830 Channel Service | Process Channel to and from TU |
| COLD | Cold Start Command | Fetch free cell map from host 17 |
| CRT | CRT Display | Place messages on CRT |
| CT | Cartridge Tester Service | Process cartridges in and out of testers |
| DEQUE | Dequene | Remove queue element from queue |
| DISP | Display Command | Display cartridges in queues or devices |
| DR | Driver Loop | Provide processor time to required functions |
| EBCH | EBCDIC to Hex Converter | Convert EBCDIC to Hex |
| EBC | EBCDIC to Binary Converter | Convert EBCDIC to Binary |
| ENQUE | Enqueue | Post queue element to queue |
| FIYI | First Yield Command | Compute and display first time yield |
| HS | Hot Stamp Service | Process cartridges in and out of Hot stamp |
| INIT | Initialization | Initialize various variables |
| INPU | Input Command | Process cartridges from free queue to conveyor 20 |

-continued

| LABEL | ROUTINE | FUNCTION |
|---|---|---|
| KB | Keyboard Service | Read and break down operator input |
| LAST | Last Command | Display serial numbers of last cartridges through testers |
| LIBR | Library Command | Display and change library functions |
| LOAD | Load Command | Load microcode to TU's and Unit 10 |
| MES | Manual Entry Station Service | Service requests from library manual entry station |
| MIL | Million Serial Number Checker | Checks serial numbers into Hot Stamp for even million |
| MODE | Mode Command | Displays and changes mode word |
| MOV | Move | Post move request |
| MSG | Message | Post messages for START, STOP and PAUSE |
| PAUS | Pause Command | Sets pause indicators |
| PK | Packaging | Processes cartridges to packaging |
| PRIN | Print Command | Processes requests to print reject codes or cal data |
| PRS | Line Printer Service | Prints messages on line printer |
| PST | Post Message | Checks pending and posts messages |
| QL | Queue Limit | Monitors queue counts and pauses devices |
| QUIT | Quit | Checks conditions, issues resets and returns processor 17 control to its operating system. |
| RJ | Reject Service | Process unacceptable cartridges to reject port |
| RTST | Retest Command | Enable/disable and set variables for retest |
| SAVE | Save Command | Sends main store queue areas to host 17 |
| SB | SBCA Service | Sends data to host 17 |
| SECV | Serial Number Convert | Converts serial numbers from Binary to EBCDIC |
| SEND | Send Command | Controls sending of cal data to host. |
| SERL | Serial Command | Processes requests for cartridges, also processes serial number for other commands |
| SNUM | Search Numeric | Searches for first numeric in a field |
| SRV | General Service | Provides service for various commands and functions |
| STAR | Start Command | Processes operator start requests |
| STAT | Status Command | Displays status of queues and devices |
| SW | Servo Writer | Processes cartridges in and out of servo writer 12 |
| TCI | Timer/Counter | Handles interrupts for the timer counter |
| TC | Timer Service | Provides software timers |
| THRU | Throughput Command | Computes and displays cartridge rates for devices |
| TIME | Time Command | Displays time and date |
| TOM | Time Out Monitor | Times device for hang conditions |
| TRAC | Trace Command | Processes operator trace data |
| TRU | Throughput Monitor | Maintains 15 minute up-date of throughput |
| TR | Trace Reader | Reads trace data from trace card reader |
| TSTR | Test Register | Displays requested register |
| UNX | Unexpected Interrupt | Handles unexpected interrupts |
| VISU | Visual Command | Processes visual frequency and verification requests |
| WARM | Warm Start Command | Fetches main store queue data from host |
| XY | XY Service | Processes moves to unit 10 |
| YIEL | Yield Command | Computes and displays total Yield |
| YLD | Yield Gathering | Gathers yield numbers |

A better understanding of the manufacturing functions can be gleaned from the following exemplary commands entered into the FIG. 1 illustrated apparatus via the keyboard KB by an operator.

| Command Name: | ABORT |
|---|---|
| Purpose: | To halt processing of a TU |
| Operands: | CN - the cartridge tester address is from zero to seven. |

| Command Name: | ALTER |
|---|---|
| Purpose: | To alter various queue parameters of the FIGURE 1 system. |
| Operands: | Two are required. The first operand must be Qn where n is a number in the range of 0 - 3. The second operand is a decimal number between 0 and 32767 and is the new upper limit for the queue. The new lower limit for the queue is the upper minus 20. Q0 is before Hot Stamp 11 Q1 is before Servo Writer 12 Q2 is before cartridge Testers TU Q3 is before packaging |

| Command Name: | CHANNEL |
|---|---|
| Purpose: | To disconnect a TU from processor 16. |
| Operands | No operand raises an error condition. The operand must be 'S'. Normalluy used to make unit off-line |

| Command Name: | CLEAR |
|---|---|
| Purpose: | Erase the CRT display and set line to the top. |
| Operands: | None |

| Command Name: | COLD |
|---|---|
| Purpose: | To cold start the FIGURE 1 system |
| Operands: | Serial Number of last cartridge processed before this start-up. The actual first assigned or beginning serial will be one greater than the one specified. |

| Command Name: | DISPLAY |
|---|---|
| Purpose: | Display the serial number of cartridges in specific queues or processing machines. |
| Operands: | No operands create an error condition. Qn - first and last serial numbers in queue n. Where n = 0 - waiting to hot stamp 11<br>1 - waiting to servo write 12<br>2 - waiting to test TU<br>3 - waiting to package<br>H - First and last serial number in hot stamp<br>S - List up to 4 cartridge serial numbers in the servo writer<br>A - First and last serial number on input conveyor.<br>Cn - Cartridge at input, in test and at output of tester 0 through 7.<br>M - Cartridge presently out of system (manual entry/exit). |

| Command Name | FIYI — FIRST YIELD |
|---|---|
| Purpose: | To provide the user with the yield value for the first time the cartridges have been tested by a TU or TU's. |
| Operands: | No operand provides data from all the testers TU. Cn where n = 0 - 7 provides data for the tester TU requested only. |

-continued

| Command Name: | INPUT |
|---|---|
| Purpose: | To process a serial number for each new cartridge from conveyor 20. Places all free cells of unit 10 into the conveyor 20 queue. |
| Operands: | An eight character serial number is extracted from the last assigned serial number. This value is incremented by 1 and posted to the conveyor 20 queue. |

| Command Name: | LAST |
|---|---|
| Purpose: | To indicate the last good serial numbered cartridge through a tester. |
| Operands: | Cn where n is a value of 0 - 7. |

| Command Name: | LOAD |
|---|---|
| Purpose: | To load microcode to one or more TU's or the unit 10 from the host 17. |
| Operands: | OP1 = A indicates load all 8 TU's<br>OP1 = 0 - 8 number of TU to load<br>OP1 = L1 indicates to load unit 10<br>OP2 is used for diagnostics. |

| Command Name: | MESSAGE |
|---|---|
| Purpose: | To display any outstanding messages requiring operator action. |
| Operands | None |

| Command Name: | PAUSE |
|---|---|
| Purpose: | To pause processing a device or parts of the system. Cartridges will be processed out of a device but none into. |
| Operands: | No operands imply an illegal command.<br>First operand is used to pause a specific device. The legal characters are:<br>Cn — where n is a cartridge tester TU in the range of 0 - 7.<br>H — Hot Stamp 11<br>P — Packaging<br>S — Servo Writer 12<br>A — A4 input (conveyor 20)<br>W — Winder<br>X — XY Cartridge |

| Command Name: | PRINT |
|---|---|
| Purpose: | To control the printing of TU data or cartridge reject codes. |
| Operand(OP): | 1st operand can be either the character 'C' or 'R'.<br>If OP1 is the character 'C', then OP2 can either be blank or the character string 'OFF'.<br>If OP1 is the character 'R', then OP2 must be either 'S' or 'Cn' where n is between zero and seven. |

| Command Name: | QMVE |
|---|---|
| Purpose: | To move an element from one queue to another (debug tool). |
| Operands: | There are two operands which are a numeric value where 0 OPL 14 and 1 OP2 15 and OP1 OP2.<br>The two operands are used as an index value into a queue control table.<br>0 - Conveyor queue<br>1 - Before Hot Stamp queue<br>2 - Hot Stamp queue<br>3 - Before Servo Writer queue<br>4 - Servo Writer queue<br>5 - Before TU queue<br>6 - TU-0 queue<br>7 - TU-1 queue<br>8 - 13 - TU's 2 - 7 queues<br>14 - Before Packaging queue<br>15 - Reject queue |

-continued

| Command Name: | QUIT |
|---|---|
| Purpose: | Halt processing and return control of processor 17 to its operating system. |
| Operands: | None |

| Command Name: | RESERVO |
|---|---|
| Purpose: | Places all cartridges waiting to be tested back in the Servo Writer queue. |
| Operands: | None |
| | The command is to be used only when it is determined that tapes have been servo written are bad and must be re-written. |

| Command Name: | RETEST |
|---|---|
| Purpose: | To specify retest codes, specify one to six retests, enable/disable retest and check current status of retest. |
| Operands: | OP1 can be any of the following inputs:<br>On - Enable retest mode<br>Off - Disable retest mode<br>Count - To reset the retest count (1-6)<br>Bypass - To bypass or not bypass the servo writer. This also depends if one uses system 1 or 2.<br>N1 -N17 - retest codes<br>OP2: OP2 is used for the count option where it is a numeric value between 1 to 6.<br>(RETEST COUNT n) It is also used when OP1 = BYPASS. Here it must be the characters 'ON' or 'OFF'.<br>(RETEST BYPASS ON) For the retest code option, it must be the character 'C'. |

| Command Name: | SAVE |
|---|---|
| Purpose: | To save the present queues for restarting after power down. |
| Operands: | None |

| Command Name: | SENSE |
|---|---|
| Purpose: | To display sense data of a tester. |
| Operands: | There is one operand which depicts which tester is to be displayed. The operand is a number in the range of 0 - 7. |

| Command Name: | SERIAL |
|---|---|
| Purpose: | To remove cartridge from the system. |
| Operands: | First Operand is an eight digit serial number (must include any leading zeroes). If there is no 2nd operand, the cartridge is delivered to the manual exit station. Only one cartridge is permitted out of the system and must be returned via the manual entry station. If the 2nd operand is an R, the cartridge is rejected out of the system permanently. The search for the serial number is performed only on the queues following the hot stamp 11, servo writer 12, and tester TU, i.e., only on cartridges that have a visual hot stamped number. |

-continued

| Command Name: | START |
|---|---|
| Purpose: | Activate the processing of the system or parts of it. |
| Operands: | No operand means start system |
| | An encoded operand is used to start a specific device. It may be encoded in any of the following options: |
| | Cn - TU where n is in the range of 0 - 7. |
| | If no number is given, then the command applies to all the testers. |
| | 'H' - Activate the hot stamp 11 |
| | 'X' - Activate the X-Y mechanism in 10 |
| | 'P' - Activate the packaging system |
| | 'S' - Activate the servo writer 12 |
| | 'R' - Activate the reject port system 14 |
| | 'A' - Activate the A4 input port from conveyor 20 |
| | 'W' - Activate the winder (not shown) |
| | 'B' - Activate the SBCA (host - 17) |
| | '3' - Activate the TU's |
| | 'L' - Activate the line printer |
| | 'T' - Activate the TRACE READER at 21 |

| Command Name: | STATUS |
|---|---|
| Purpose: | Display status of queues and/or devices |
| Operands: | No operand means display status of queues and devices. |
| | First operand of Q means display cartridge count of various queues in system. |
| | First operand of D means display status (active, stop, pause) of devices in system. |

| Command Name: | STOP |
|---|---|
| Purpose: | To stop processing of the system or parts of it. |
| Operands: | No operand means stop the system. |
| | First operand is used to stop a specific device. The valid key words are the same as for the START command. |

| Command Name: | TIME |
|---|---|
| Purpose: | Display the current date and time. |
| Operands: | None |

| Command Name: | VISUAL |
|---|---|
| Purpose: | To specify a visual check frequency or to verify a valid serial number. |
| Operands: | OP1 can be a 'C' frequency of cartridge testers, 'H' frequency of hot stamp, 'S' frequency of servo writer, or 'V' verification. |
| | OP2 - if OP2 is blank, a visual check is forced on either the hot stamp 11, servo writer 12, or TU's. |
| | OP2 must be a cartridge serial number when verification is requested. |

| Command Name: | YIELD |
|---|---|
| Purpose: | Display the short term (last 10 cartridges) and long term (since system start) yield of processing machines. |
| Operands: | No operand means display yield of winder, hot stamp, servo writer and eight testers on system. |
| | The operand can take on the following forms: |
| | Cn - Yield of tester TU n (0–7) |
| | H - Yield of hot stamp 11 |
| | S - Yield of servo writer 12 |
| | W - Yield of winder (not shown) |

While the invention has been particularly shown and described with reference to preferred embodiments thereof, it will be understood by those skilled in the arts that various changes in form and details may be made therein without departing from the spirit and scope of the invention.

What is claimed is:

1. Article processing apparatus, including in combination:
   a random access article storage and retrieval apparatus having a multiplicity of addressable article storage locations;
   a first article processing unit having an input and output port connected to said article storage apparatus;
   a second article processing unit having an input and output port connection to said article storage and retrieval apparatus;
   a plurality of article test units each individually having input and output ports to said article storage and retrieval apparatus;
   means including an input port to said article storage and retrieval apparatus for receiving articles to be processed;
   input service means for assigning said received article to one of said storage locations throughout the article processing procedures;
   first unit service means for transferring articles from their respective storage locations to and from said first article processing unit;
   second unit service means for selectively transferring articles from their respective storage locations to and from said second unit;
   third unit service means for transferring articles from said respective storage locations to and from one of said plurality of article testing units;
   queue means for assigning articles in a queue for said units while residing in such article storage locations;
   a control processor responsive to said queue means for operating said random access article storage and retrieval apparatus to sequence an article first through said first unit then said second unit and then one of said test units.

2. The article processing apparatus set forth in claim 1 wherein said random access article storage and retrieval apparatus is generally elongated and said processing units being disposed co-extensively therealong in the immediate vicinity thereof whereby said processing units respective input and output port connections are distributed throughout said random access article storage and retrieval unit; and
   said queue means operating independent of the physical locations of said processing units.

3. The article processing apparatus set forth in claim 1 wherein said first and second article processing units process said articles at a relatively high rate of speed;
   said article test units operating with said articles at a relatively slow rate of speed, said plurality of test units being greater than plurality said processing units; and
   said test units being distributed evenly in a co-extensively with respect to said article storage and retrieval apparatus.

* * * * *